(12) United States Patent
Zimmerman

(10) Patent No.: US 12,352,384 B2
(45) Date of Patent: Jul. 8, 2025

(54) LOCKABLE VALVE-ACTUATED SUCTION APPARATUS

(71) Applicant: Israel Harry Zimmerman, Los Angeles, CA (US)

(72) Inventor: Israel Harry Zimmerman, Los Angeles, CA (US)

( * ) Notice: Subject to any disclaimer, the term of this patent is extended or adjusted under 35 U.S.C. 154(b) by 105 days.

(21) Appl. No.: 18/334,500

(22) Filed: Jun. 14, 2023

(65) Prior Publication Data
US 2024/0418313 A1    Dec. 19, 2024

(51) Int. Cl.
*F16M 13/02*  (2006.01)
*F16K 24/00*  (2006.01)
*F16K 35/02*  (2006.01)

(52) U.S. Cl.
CPC ........... *F16M 13/022* (2013.01); *F16K 24/00* (2013.01); *F16K 35/02* (2013.01)

(58) Field of Classification Search
CPC ....... F16M 13/022; F16K 24/00; F16K 35/02; A47G 19/10; A47G 19/2261; A47G 23/0225
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,319,726 A | 5/1943 | Duggan |
| 2,319,727 A | 5/1943 | Duggan |
| 2,542,400 A | 3/1948 | Donofrio |

(Continued)

FOREIGN PATENT DOCUMENTS

| | | |
|---|---|---|
| CN | 1079886 A1 | 12/1993 |
| CN | 203987324 U | 12/2014 |

(Continued)

OTHER PUBLICATIONS

Zimmerman, "List of Patents or Patent Applications Treated as Related", Jul. 17, 2024, 2 pages.

*Primary Examiner* — Eret C McNichols
(74) *Attorney, Agent, or Firm* — Walter W. Duft

(57) ABSTRACT

A lockable valve-actuated suction apparatus includes a resilient anchor member having an inner side arranged to seal against a reference surface, and an outer side. The anchor member includes a vent port extending between its inner and outer sides. A movable member is slidably movable between a sealing position wherein the vent port is blocked and a venting position wherein the vent port is unblocked. A twist-to-lock coupling connection is provided between the movable member and the anchor member. The twist-to-lock coupling connection is operable by rotating the movable member between a locking state and an unlocking state. The locking state of the twist-to-lock coupling connection is characterized by the movable member being locked against the slidable movement relative to the anchor member. The unlocking state of the twist-to-lock coupling connection is characterized by the movable member being unlocked against the slidable movement relative to the anchor member.

20 Claims, 28 Drawing Sheets

(56) References Cited

U.S. PATENT DOCUMENTS

| | | | |
|---|---|---|---|
| 2,565,793 A | 8/1951 | Weismantel | |
| 2,601,279 A | 6/1952 | Hacus | |
| 2,623,369 A * | 12/1952 | Haydu | A47G 19/10 |
| | | | 248/362 |
| 2,740,545 A | 9/1956 | Bates | |
| 2,782,948 A | 2/1957 | Steinberg | |
| 2,839,260 A | 6/1958 | Jacobi, Jr. | |
| 2,895,636 A | 7/1959 | Martin | |
| 2,908,473 A | 10/1959 | Snyder | |
| 2,910,264 A | 10/1959 | Lindenberger | |
| 2,932,119 A | 4/1960 | Borah | |
| 2,936,139 A | 5/1960 | Lindstrom | |
| 2,963,256 A | 12/1960 | Borah | |
| 2,968,888 A | 1/1961 | Borah | |
| 3,094,235 A | 6/1963 | Lunning | |
| 3,159,370 A | 12/1964 | Rubinstein | |
| 3,383,001 A | 5/1968 | Wei | |
| 3,675,886 A | 7/1972 | Kampmier | |
| 3,847,324 A | 11/1974 | Uchanski et al. | |
| 4,040,549 A | 8/1977 | Sadler | |
| 4,127,211 A | 11/1978 | Zerbey | |
| 4,133,575 A | 1/1979 | Mader | |
| 4,137,356 A | 1/1979 | Shoemaker et al. | |
| 4,593,947 A | 6/1986 | Yokum | |
| 4,726,553 A | 2/1988 | Wischusen, III | |
| 4,756,497 A | 7/1988 | Lan | |
| 4,759,525 A | 7/1988 | Cross et al. | |
| 4,760,987 A | 8/1988 | Lan | |
| 4,836,488 A | 6/1989 | Ross | |
| 4,872,721 A | 10/1989 | Sniadach | |
| 4,890,760 A | 1/1990 | Nicoll, Sr. et al. | |
| 4,928,848 A | 5/1990 | Ballway | |
| 4,940,138 A | 7/1990 | Hornstein | |
| 4,941,635 A | 7/1990 | Lan | |
| 4,955,493 A | 9/1990 | Touzani | |
| 4,978,566 A | 12/1990 | Scheurer et al. | |
| 5,040,719 A | 8/1991 | Ballway | |
| 5,065,973 A | 11/1991 | Wang | |
| 5,071,096 A | 12/1991 | Hartman et al. | |
| 5,076,527 A | 12/1991 | Yung-Huei | |
| 5,133,524 A | 7/1992 | Liu | |
| 5,180,132 A | 1/1993 | Pearson et al. | |
| 5,186,350 A | 2/1993 | McBride | |
| 5,190,332 A | 3/1993 | Nagai | |
| 5,192,043 A | 3/1993 | Fa | |
| 5,207,076 A | 5/1993 | Sciarrillo | |
| 5,213,385 A | 5/1993 | Nagai | |
| 5,263,760 A | 11/1993 | Sohol | |
| 5,273,182 A | 12/1993 | Laybourne | |
| 5,282,541 A | 2/1994 | Chen | |
| 5,292,140 A | 3/1994 | Laing | |
| 5,381,990 A | 1/1995 | Belokin | |
| D357,170 S | 4/1995 | Wellsfry | |
| 5,413,302 A | 5/1995 | Ferster | |
| 5,511,752 A | 4/1996 | Trethewey | |
| 5,531,353 A | 7/1996 | Ward et al. | |
| 5,651,520 A | 7/1997 | Belokin et al. | |
| 5,667,180 A | 9/1997 | Duckworth | |
| 5,742,971 A | 4/1998 | Salinger | |
| D397,915 S | 9/1998 | McNaughton | |
| D400,763 S | 11/1998 | Taylor et al. | |
| 5,992,806 A | 11/1999 | Adams | |
| 6,000,575 A | 12/1999 | LaCour et al. | |
| 6,039,206 A | 3/2000 | DeFrancesco | |
| 6,059,138 A | 5/2000 | Labruyere | |
| D439,116 S | 3/2001 | White | |
| 6,264,054 B1 | 7/2001 | Miyake et al. | |
| 6,315,153 B1 | 11/2001 | Osborn | |
| 6,318,683 B1 | 11/2001 | Savoy | |
| 6,367,652 B1 | 4/2002 | Toida et al. | |
| 6,439,418 B1 | 8/2002 | Immerman et al. | |
| 6,491,265 B2 | 12/2002 | Tracy | |
| 6,497,394 B1 | 12/2002 | Dunchock | |
| 6,511,031 B2 | 1/2003 | Lin | |
| 6,520,368 B1 | 2/2003 | Chiu | |
| 6,543,637 B1 | 4/2003 | Osborn | |
| 6,571,976 B1 | 6/2003 | Sonnabend | |
| 6,596,374 B1 | 7/2003 | Adjeleian | |
| 6,648,285 B1 | 11/2003 | Woollen | |
| 6,666,420 B1 | 12/2003 | Carnevali | |
| 6,745,987 B2 | 6/2004 | Rousselet et al. | |
| 6,749,160 B1 | 6/2004 | Richter | |
| 6,776,368 B1 | 8/2004 | Duncan et al. | |
| 6,895,642 B2 | 5/2005 | Huang | |
| 7,090,183 B2 | 8/2006 | Heybl et al. | |
| 7,178,771 B2 | 2/2007 | Richter | |
| 7,201,285 B2 | 4/2007 | Beggins | |
| 7,306,113 B2 | 12/2007 | El-Saden et al. | |
| 7,344,114 B2 | 3/2008 | Richter | |
| 7,455,269 B1 * | 11/2008 | Chien | F16B 47/006 |
| | | | 248/205.8 |
| 7,458,541 B1 | 12/2008 | Chang | |
| 7,481,329 B2 | 1/2009 | Camp, Jr. | |
| 7,708,245 B2 * | 5/2010 | Woo | G09F 7/12 |
| | | | 248/362 |
| 7,726,715 B2 | 6/2010 | Nagasawa et al. | |
| 7,810,777 B2 * | 10/2010 | Paradise | A47J 36/34 |
| | | | 248/205.5 |
| 7,850,133 B2 * | 12/2010 | Carnevali | F16B 47/00 |
| | | | 248/205.8 |
| 7,861,647 B2 * | 1/2011 | So | A47J 43/0727 |
| | | | 220/636 |
| 7,950,422 B2 | 5/2011 | Perlman | |
| 8,025,169 B2 | 9/2011 | Zimmerman | |
| 8,028,850 B2 | 10/2011 | Zimmerman | |
| 8,272,523 B1 | 9/2012 | DeMusis, Sr. | |
| 8,534,633 B2 | 9/2013 | Tell | |
| 8,560,031 B2 | 10/2013 | Barnett | |
| 8,757,418 B2 | 6/2014 | Zimmerman | |
| 9,494,184 B1 | 11/2016 | Lee | |
| 9,521,919 B1 | 12/2016 | Reyes | |
| 9,573,531 B2 | 2/2017 | Zhang | |
| 9,651,229 B1 | 5/2017 | Huang | |
| 9,750,358 B2 * | 9/2017 | Jagger | A47G 19/10 |
| 9,801,483 B2 | 10/2017 | D'Alesio | |
| 9,803,682 B1 | 10/2017 | Chang | |
| 9,814,332 B2 | 11/2017 | Zimmerman | |
| 10,520,009 B2 | 12/2019 | Smith et al. | |
| 10,753,384 B1 | 8/2020 | Chang | |
| 10,774,870 B2 | 9/2020 | Kang | |
| 11,255,482 B1 | 2/2022 | Zimmerman | |
| 11,346,389 B2 * | 5/2022 | Chen | F16B 47/00 |
| 11,415,266 B2 | 8/2022 | Zimmerman | |
| 11,522,988 B2 | 12/2022 | Zimmerman | |
| 11,525,475 B2 | 12/2022 | Zimmerman | |
| 11,542,980 B2 | 1/2023 | Zimmerman | |
| 11,585,371 B2 * | 2/2023 | Huang | F16M 13/022 |
| 11,686,431 B1 * | 6/2023 | Lin | F16M 11/14 |
| | | | 248/205.5 |
| 11,988,242 B2 | 5/2024 | Zimmerman | |
| 12,078,257 B2 * | 9/2024 | Zimmerman | F16B 47/00 |
| 2002/0130133 A1 | 9/2002 | Immerman et al. | |
| 2003/0075666 A1 | 4/2003 | Dunchock | |
| 2003/0102320 A1 | 6/2003 | Park | |
| 2004/0079848 A1 * | 4/2004 | Wu | F16B 47/00 |
| | | | 248/205.5 |
| 2004/0178315 A1 | 9/2004 | Lee | |
| 2004/0238541 A1 | 12/2004 | Camp, Jr. | |
| 2004/0238542 A1 | 12/2004 | Camp, Jr. et al. | |
| 2005/0075666 A1 | 4/2005 | Maas et al. | |
| 2006/0175506 A1 | 8/2006 | Lan | |
| 2006/0284043 A1 * | 12/2006 | Paradise | A47J 47/16 |
| | | | 248/205.5 |
| 2007/0012706 A1 | 1/2007 | Deadman | |
| 2007/0205205 A1 | 9/2007 | Kliewer | |
| 2008/0093370 A1 | 4/2008 | Darsey | |
| 2008/0190948 A1 | 8/2008 | Sayasithsena | |
| 2009/0050758 A1 * | 2/2009 | Carnevali | F16B 47/00 |
| | | | 248/205.8 |
| 2009/0250467 A1 | 10/2009 | Schmidt | |
| 2009/0256043 A1 | 10/2009 | Lan | |
| 2010/0155550 A1 | 6/2010 | Weiss-Vons | |

(56) References Cited

U.S. PATENT DOCUMENTS

| | | | |
|---|---|---|---|
| 2010/0252700 A1* | 10/2010 | Wang | F16M 11/10 |
| | | | 248/206.2 |
| 2012/0112023 A1* | 5/2012 | Tollman | F16B 47/006 |
| | | | 248/205.8 |
| 2012/0287560 A1 | 11/2012 | Fan | |
| 2012/0329534 A1 | 12/2012 | Barnett et al. | |
| 2014/0171157 A1 | 6/2014 | Ho | |
| 2014/0326630 A1 | 11/2014 | Henry | |
| 2015/0230638 A1 | 8/2015 | Jagger | |
| 2015/0240862 A1 | 8/2015 | Shi | |
| 2016/0258471 A1 | 9/2016 | Orban | |
| 2018/0149302 A1 | 5/2018 | Papapanos | |
| 2019/0022874 A1 | 1/2019 | Mutch et al. | |
| 2019/0024699 A1 | 4/2019 | Mutch et al. | |
| 2019/0203759 A1 | 7/2019 | Zimmerman | |
| 2020/0232501 A1 | 7/2020 | McClean et al. | |
| 2020/0400267 A1 | 12/2020 | Garza | |
| 2021/0145195 A1* | 5/2021 | Hakim | A47G 19/2261 |
| 2021/0207647 A1 | 7/2021 | Liao | |
| 2021/0369022 A1* | 12/2021 | Tennick | A47G 19/10 |
| 2022/0056944 A1* | 2/2022 | Huang | F16B 47/00 |
| 2022/0381288 A1 | 12/2022 | Chen | |
| 2023/0091926 A1 | 3/2023 | Zimmerman | |
| 2023/0228290 A1 | 7/2023 | Zimmerman | |
| 2023/0228373 A1 | 7/2023 | Zimmerman | |
| 2024/0102510 A1* | 3/2024 | Woo | F16B 47/00 |
| 2024/0110634 A1 | 4/2024 | Zimmerman | |
| 2024/0191835 A1 | 6/2024 | Zimmerman | |

FOREIGN PATENT DOCUMENTS

| | | | | |
|---|---|---|---|---|
| CN | 204015832 U | 12/2014 | | |
| CN | 204105618 U | 1/2015 | | |
| CN | 104545306 A | 4/2015 | | |
| CN | 204291083 U | 4/2015 | | |
| CN | 204500194 U | 4/2015 | | |
| CN | 105996687 A | 10/2016 | | |
| CN | 106438659 A | 2/2017 | | |
| CN | 206060860 U | 3/2017 | | |
| CN | 207334187 U | 5/2018 | | |
| DE | 3742636 | 1/1989 | | |
| EP | 1649788 | 4/2006 | | |
| EP | 1964723 A2 * | 9/2008 | | B60R 11/00 |
| GB | 1534235 A | 11/1978 | | |
| JP | S4929371 U | 3/1974 | | |
| JP | H05187430 A | 7/1993 | | |
| JP | H0685924 U | 12/1994 | | |
| JP | 2000104724 A | 4/2000 | | |
| JP | 2003501315 | 1/2003 | | |
| JP | 2004160079 | 10/2004 | | |
| JP | 2006314739 | 11/2006 | | |
| JP | 2014173709 A | 9/2014 | | |
| KR | 20210104241 A | 8/2021 | | |
| WO | WO2012008942 | 1/2012 | | |
| WO | WO-2019097212 A1 * | 5/2019 | | A47G 19/10 |

* cited by examiner

LOCKABLE VALVE-ACTUATED SUCTION APPARATUS

BACKGROUND

1. Field

The present disclosure relates to suction apparatus that can be releasably secured to surfaces. More particularly, the disclosure concerns suction apparatus with anchor members that adhere to surfaces by way of differential pressure when flexed. Still more particularly, the disclosure pertains to suction apparatus having robust adherence capability.

2. Description of the Prior Art

By way of background, suction apparatus that operate by way of differential pressure are known. Such apparatus often utilize resilient anchor members such as suction cups and suction seal stabilizers. A suction cup typically includes a flexible base seal member configured as an elastomeric dome-shaped structure having a concave lower side and a relatively soft peripheral rim. In order to adhere the suction cup to a reference surface, the base seal member must be affirmatively flexed by pressing it against the reference surface with enough force to temporarily flatten the concave lower side so that air is expelled outside the peripheral rim. When the pressing force is released, the base seal member has a natural tendency to return to its initial dome shape. As this rebounding occurs, the volumetric cavity that lies inside the peripheral rim between the base seal member's lower side and the reference surface begins to enlarge. This in turn causes the air pressure in the volumetric cavity to proportionally decrease in accordance with Boyle's Law. A pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the base seal member to its initial concave configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the base seal member's peripheral rim and the reference surface.

A suction seal stabilizer includes a base seal member that operates somewhat similarly to a suction cup's base seal member, but is typically less concave, or even flat, and usually made from a softer more resilient material. Alternatively, the base seal member of a suction seal stabilizer may be constructed with the same shape and material as a suction cup base seal member, but may be thinner and more flexible than its suction cup counterpart. When a properly designed suction seal stabilizer is placed on a reference surface, no pushing force needs to be applied to flatten the base seal member apart from the weight of the stabilizer itself and any items or materials that it carries. Such devices are thus generally self-sealing (self-anchoring) in a manner that is not noticeable to the user. Because the base seal member is usually highly flexible and may have little or no concavity, its elastic rebound forces may be relatively weak and generally insufficient to overcome the opposing gravitational forces bearing down on the suction seal stabilizer. If the base seal member remains substantially flat against the reference surface with little or no rebound occurring, the suction forces will be negligible or non-existent. In some designs, the suction seal stabilizer may even be capable of being moved laterally over the reference surface with little apparent resistance. On the other hand, large suction forces will be generated when an attempt is made to pull the suction seal stabilizer away from the reference surface, or tilt the stabilizer, such as by applying a side load against a suction apparatus that incorporates the stabilizer. This property of suction seal stabilizers is advantageous for certain applications, such as when the stabilizer is used in a suction apparatus designed to secure an object or material to a substantially horizontal reference surface. In that case, the suction apparatus can be moved laterally if a side load is applied sufficiently close to the reference surface, but will resist tipping when a side load or acceleration force is applied at higher elevations.

Some suction cups and suction seal stabilizers are designed so that they can only be removed from a reference surface by applying sufficient brute lifting force to break the seal formed by the base seal member's peripheral rim, or by peeling up the rim to create a small opening that vents the volumetric cavity. Other suction cups and suction seal stabilizers are designed with a vent port and are used with a mechanical stopper made of rigid material. The stopper is manually actuated into engagement with the vent port when it is desired to maintain suction, and is manually actuated out of engagement with the vent port when it is desired to break the suction. Existing stoppers for suction cups and suction cup stabilizers have associated disadvantages, including but not limited to design complexity, tendency toward inadvertent dislodgement resulting in base seal member detachment, and inability to vent unless completely separated from the vent port.

It is to improvements in the design of suction apparatus having anchor members embodied as suction cups or suction seal stabilizers that the present disclosure is directed.

SUMMARY

A lockable valve-actuated suction apparatus includes an anchor member comprising a non-porous resilient material, the anchor member having an inner side arranged to seal against a surface, and an outer side. The anchor member includes a vent port extending between the inner and outer sides of the anchor member. A movable member is slidably movable relative to the anchor member between a sealing position wherein the movable member blocks the vent port and a venting position wherein the movable member unblocks the vent port. A twist-to-lock coupling connection is provided between the movable member and the anchor member. The twist-to-lock coupling connection is operable by rotating the movable member relative to the anchor member between a locking state and an unlocking state. The locking state of the twist-to-lock coupling connection is characterized by the movable member being locked against the slidable movement relative to the anchor member. The unlocking state of the twist-to-lock coupling connection is characterized by the movable member being unlocked against the slidable movement relative to the anchor member, thereby allowing the movable member to be moved between its sealing position and its venting position.

In another aspect, a method of using a lockable valve-actuated suction apparatus, as summarized above, includes (1) positioning the suction apparatus so that the anchor member is in contact with the reference surface, the movable member being in the unlocking state and either the sealing position or the venting position, (2) maneuvering the suction apparatus so as to cause the movable member to assume or maintain the sealing position, and (3) rotating the movable member from the unlocking state to the locking state.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1:
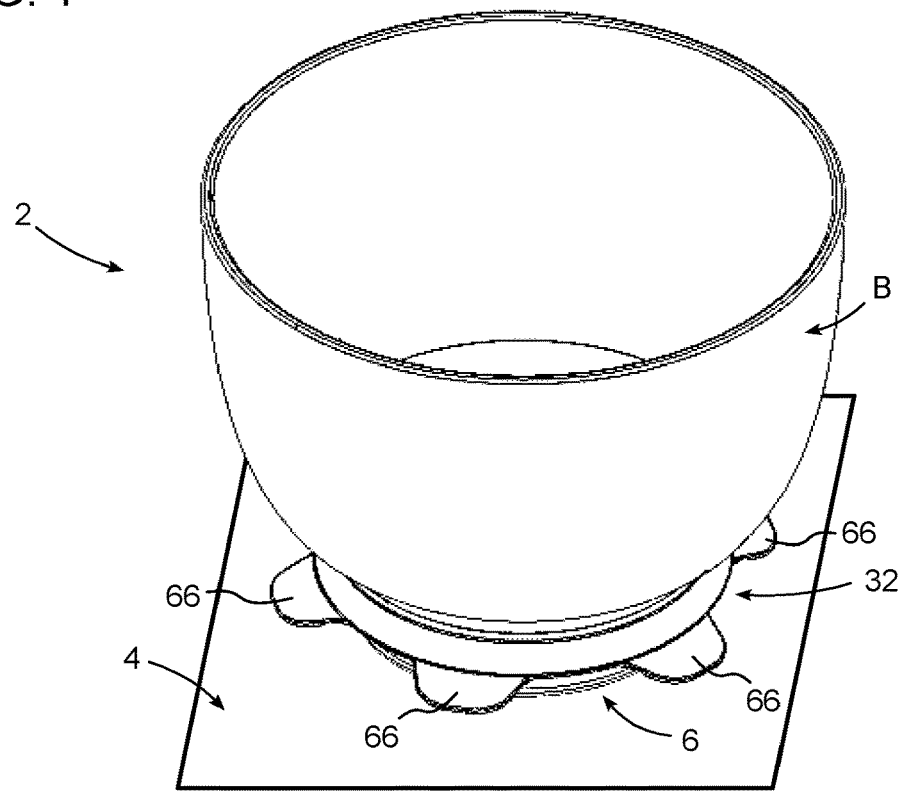
FIG. 1 is an upper perspective view showing a lockable valve-actuated suction apparatus according to an example embodiment, with the suction apparatus attached to a reference surface.
Figure 2:
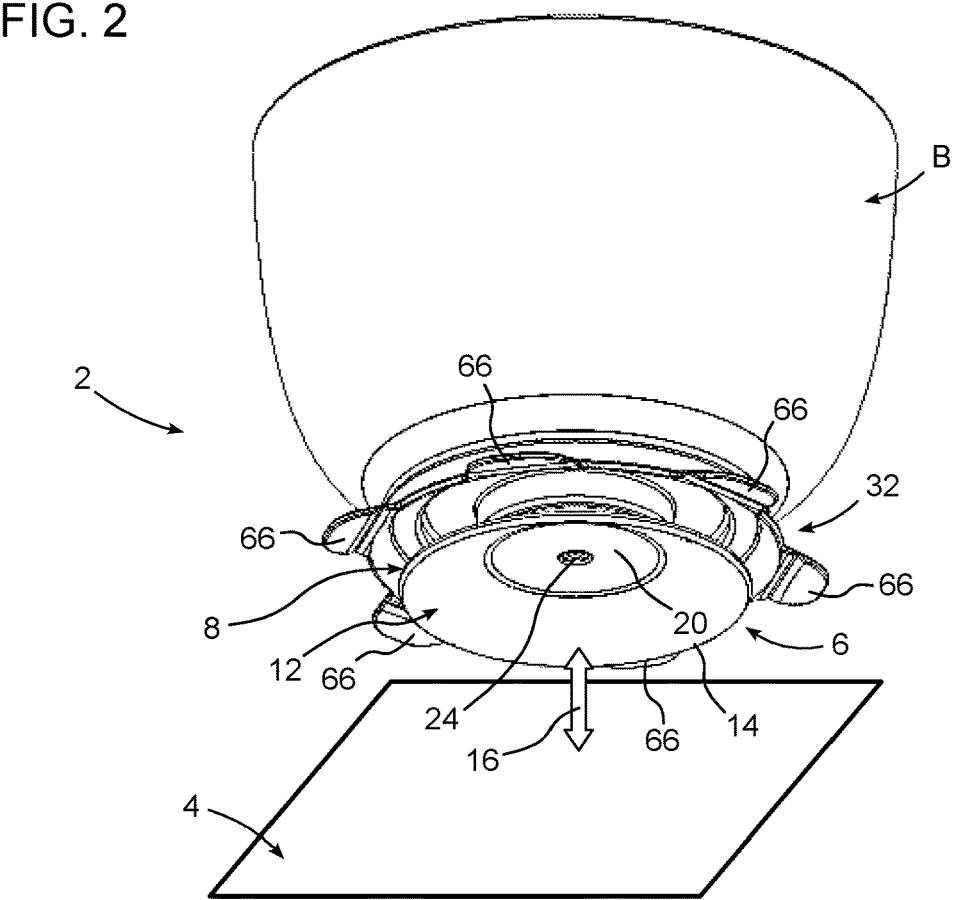
FIG. 2 is a lower perspective view showing the FIG. 1 suction apparatus detached from the reference surface.

Turning now to the drawing figures, in which like reference numbers illustrate like structure in all of the several views, FIGS. 1-2 illustrate one possible embodiment a lockable valve-actuated suction apparatus 2 that may be constructed in accordance with the present disclosure. The suction apparatus 2 may be used for various applications, including to hold or carry one or more items or materials. By way of example only, the illustrated embodiment depicts the suction apparatus 2 as embodying a food preparation bowl "B" that may be used for mixing food ingredients or for other purposes. Advantageously, the suction apparatus 2 provides a quick-release and attachment capability that allows the apparatus to be secured to a reference surface 4, locked against inadvertent dislodgement, and thereafter unlocked and released from the reference surface. Although the reference surface 4 is shown as being substantially horizontal, such as a table or countertop, it could also be substantially vertical (such as a wall, door, window, etc.). The reference surface 4 could also have an orientation lying somewhere between vertical and horizontal.

In the illustrated embodiment, the suction apparatus 2 includes an anchor member 6 formed of a non-porous resilient material, such as injection-molded silicone rubber having a suitable hardness and density. Depending on the application for which the suction apparatus 2 will be used, the anchor member 6 may be designed as a suction cup or a suction seal stabilizer. As discussed in the Background section above, suction cups and suction seal stabilizers operate somewhat differently from each other, and have different features and advantages.

Figure 3:
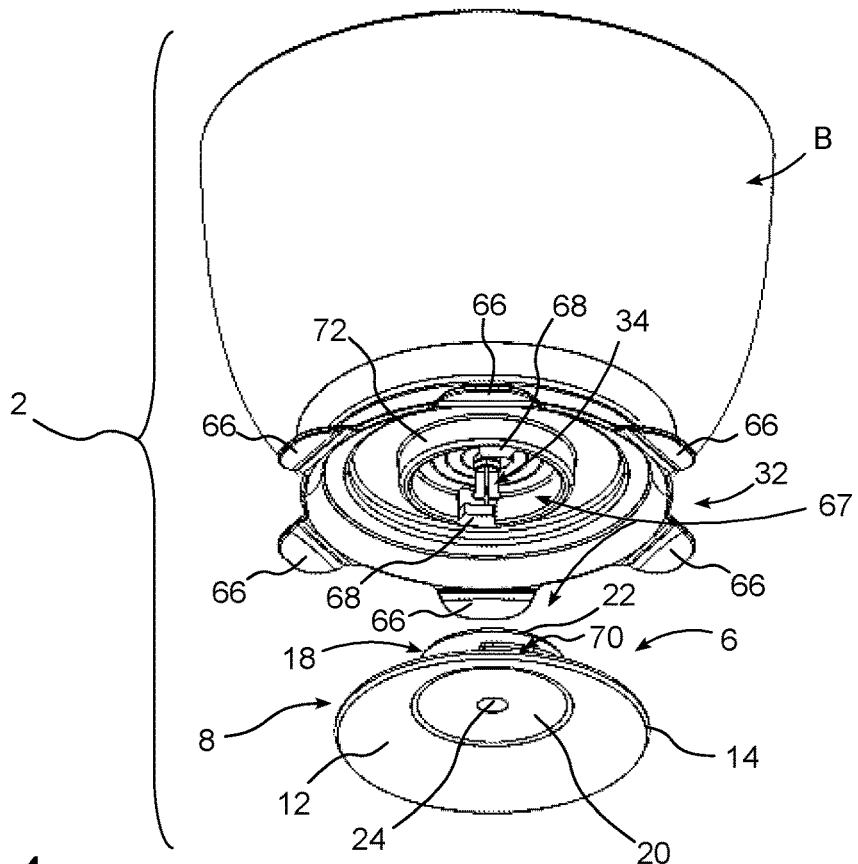
FIG. 3 is an exploded lower perspective view showing the FIG. 1 suction apparatus.
Figure 4:
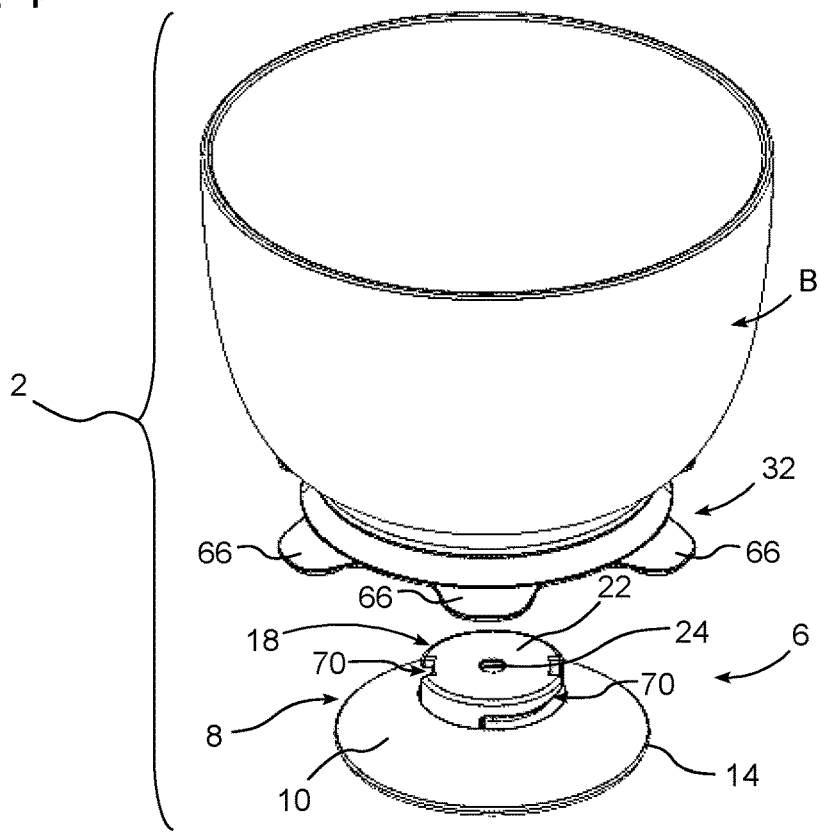
FIG. 4 is an exploded upper perspective view showing the FIG. 1 suction apparatus.
Figure 5:
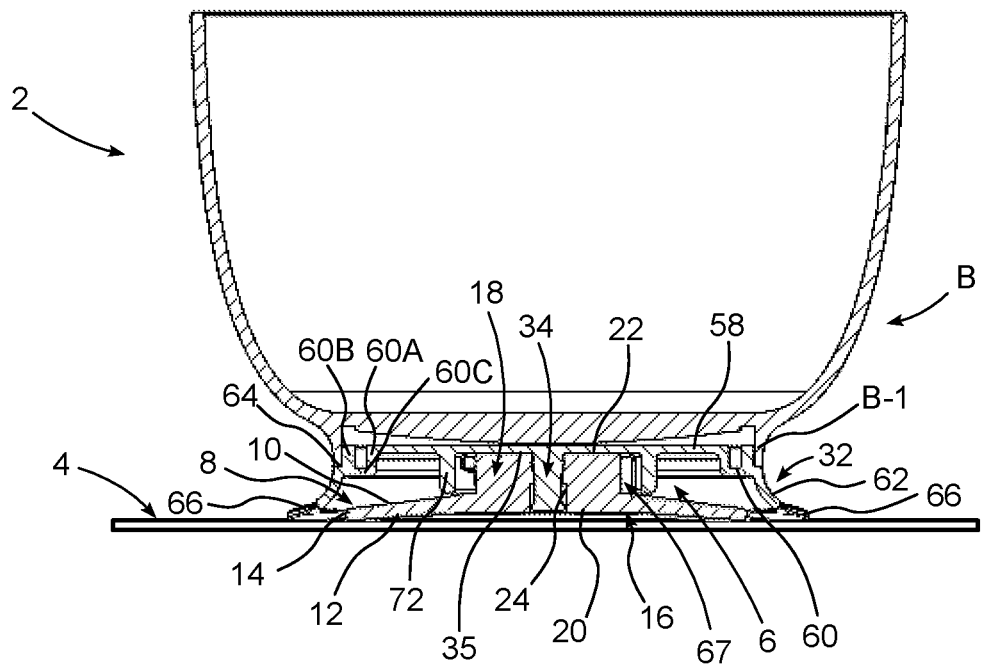
FIG. 5 is a cross-sectional centerline view of the FIG. 1 suction apparatus, with a movable member thereof being in a closed sealing position.
Figure 6:
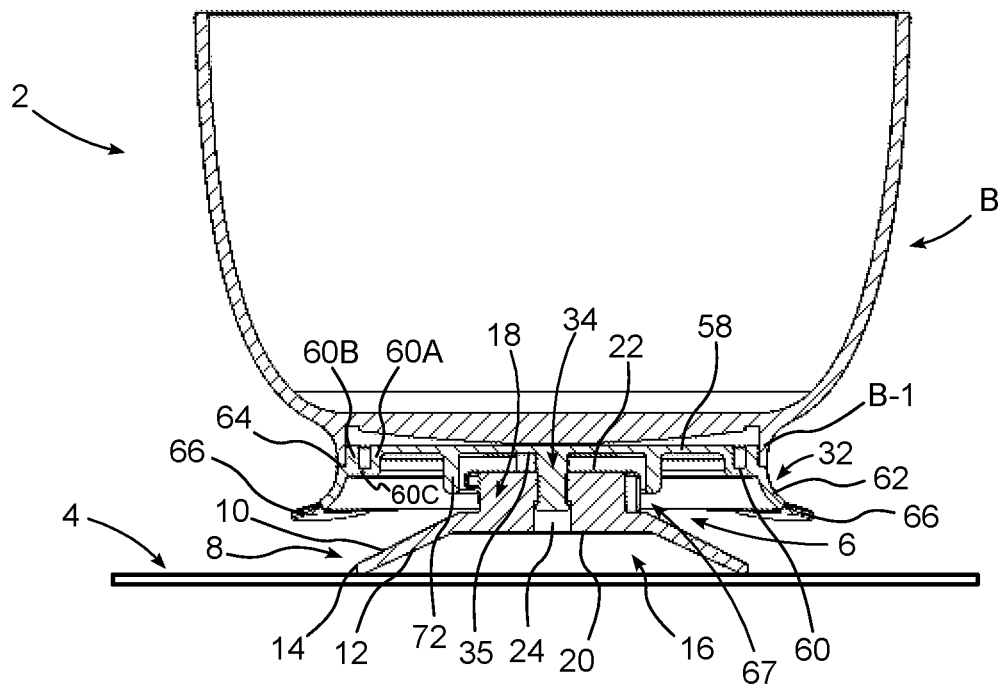
FIG. 6 is a cross-sectional centerline view of the FIG. 1 suction apparatus, with a movable member thereof being in an open venting position.

As additionally shown in FIGS. 3-4, the anchor member 6 includes a flexible (resiliently deformable) base seal member 8 having a seal member outer side 10 (FIG. 4), a seal member inner side 12 (FIG. 3), and a seal member peripheral edge 14 (FIGS. 3-4) defining an outer periphery of the seal member. In some anchor member designs, the seal member 8 may be inherently formed with a substantially non-flat, dome-like configuration wherein the seal member outer side 10 is convex and the seal member inner side 12 is concave. In such designs, engaging the seal member peripheral edge 14 against the reference surface 4 with sufficient force (whether due to the inherent weight of the suction apparatus 2 or the application of additional force) will resiliently deform the seal member 8 so as to temporarily bias it into a flattened (partially or wholly) configuration. As described in more detail below, a flattened configuration of the seal member 8 is shown in FIG. 5. In other anchor member designs, the seal member 8 may be inherently formed with a substantially flat configuration, and may thus appear as shown in FIG. 6 prior to the seal member peripheral edge 14 being pressed against the reference surface, or after being pressed but with very little force being applied. Regardless of the design of the anchor member 6, the seal member inner side 12 is operable to seal against the reference surface 4 when engaged thereto with the seal member 8 being flattened or flat. This sealing engagement defines a controlled pressure zone 16 (FIGS. 5-6) that is capable of maintaining a negative pressure differential relative to the area of ambient pressure outside the controlled pressure zone. The controlled pressure zone 16 represents the region located inside the seal member peripheral edge 14, between the seal member inner side 12 and the reference surface 4.

As best shown in FIGS. 3-4, the anchor member 6 further includes an anchor member stem 18 disposed on the seal member 8. The anchor member stem 18 includes a stem base end 20 (FIG. 3) formed by a central portion of the seal member inner side 12, and a stem free end 22 (FIG. 4) spaced from the stem base end. A vent port 24 extends through the anchor member stem 18, passing through the inner side 12 and the outer side 10 of the seal member 8 as it does so. As additionally shown in FIGS. 7-12, the vent port 24 includes a first vent port section 26 and a second vent port section 28. The first vent port section 26 is disposed in relative proximity to the stem base end 20 and the second vent port section 28 is disposed in relative proximity to the stem free end 22. A vent port internal shoulder 30 is defined at an outer end of the first vent port section 26, where it meets an inner end of the second vent port section 28. The vent port internal shoulder 30 faces toward the stem base end 20.

As shown in FIGS. 1-4, the suction apparatus 2 includes a movable member 32 disposed on the anchor member stem 18. As shown in FIGS. 5-6, the movable member 32 is slidably movable relative to the anchor member 6 between a sealing position wherein the movable member blocks the vent port 24 (FIG. 5) and a venting position wherein the movable member unblocks the vent port (FIG. 6).

The movable member 32 either mounts to or forms part of the bowl "B." As can be seen in FIGS. 5-6, the illustrated embodiment utilizes a construction in which the movable member 32 and the bowl "B" are separate components that are mounted together. In other embodiments (not shown), the movable member 32 and the bowl "B" could be formed as a single integrated structure formed by a suitable manufacturing process, such as injection molding. In lieu of the movable member 32 mounting to or forming part of the bowl "B," alternative embodiments of the suction apparatus 2 may be constructed in which the movable member 32 mounts to or forms part of other types of auxiliary structures, including but not limited to different types of carriers or holders for carrying or holding various items or materials, whether solid, liquid or otherwise.

In the illustrated embodiment, the movable member 32 engages the vent port 24 by way of a plunger valve 34 that is operable to selectively seal and unseal the vent port. The plunger valve 34 may be formed from a material that is more rigid than the anchor member 6, such as injection-molded hard plastic or rubber material. As can be seen in FIGS. 5-6, the plunger valve 34 may depend downwardly from a central lower surface portion 35 of the movable member 32.

As additionally shown in FIGS. 7-12, the plunger valve 34 may be configured for disposition in the vent port 24 for linear (longitudinal) displacement and slidable movement between a closed sealing position of the plunger valve (FIGS. 7-8) wherein the vent port is sealed, and an open venting position of the plunger valve (FIGS. 9-10) wherein the vent port is unsealed. In order to disassemble the suction apparatus 2 for cleaning or the like, the plunger valve 34 may be displaced beyond the open venting position to a disassembly position (FIGS. 11-12) wherein the plunger valve is completely separated from the anchor member 6. In the illustrated embodiment, both the vent port 24 and the plunger valve 34 have a circular cross-sectional configuration. This allows the plunger valve 34 to rotate within the vent port 24.

As can be seen in each of FIGS. 7-12, the plunger valve 34 may be formed with a first plunger valve section 36 and a second plunger valve section 38. The first plunger valve section 36 includes a transverse plunger valve stabilizer 40 that may be formed at the inner end thereof. The plunger valve stabilizer 40 is configured to engage at least two opposing sidewall surfaces of the first vent port section 26 when the plunger valve 34 is in the closed sealing position. This stabilizes the plunger valve 34 against unwanted transverse rocking when the plunger valve is sealing the vent port 24. For reasons that will become apparent, such rocking could cause inadvertent venting of the controlled pressure zone 16 during use of the suction apparatus 2.

In the illustrated embodiment, the plunger valve stabilizer 40 additionally serves as a plunger valve slide control guide that limits transverse displacement of the plunger valve 34 as it displaces longitudinally between its closed and open positions. The plunger valve stabilizer 40 does this by continuously slidably engaging the at least two opposing sidewall surfaces of the first vent port section 26 along the entire length of that section. In the illustrated embodiment, all sidewall surface regions of the first vent port section 26 extend axially parallel to each other, but this is not necessarily a design requirement.

Figure 9:
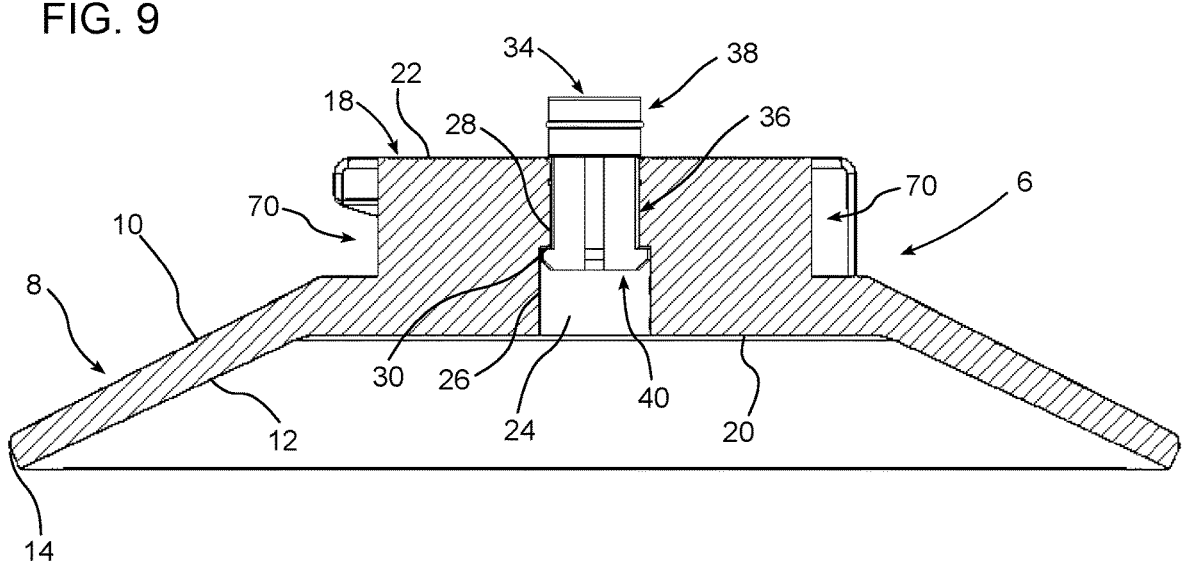
FIG. 9 is a partial cross-sectional and partial side view an anchor member and a plunger valve of the FIG. 1 suction apparatus, with an anchor member thereof being shown cross-sectionally along its central longitudinal axis and a plunger valve thereof being shown in side elevation and disposed in an open venting position.
Figure 10:
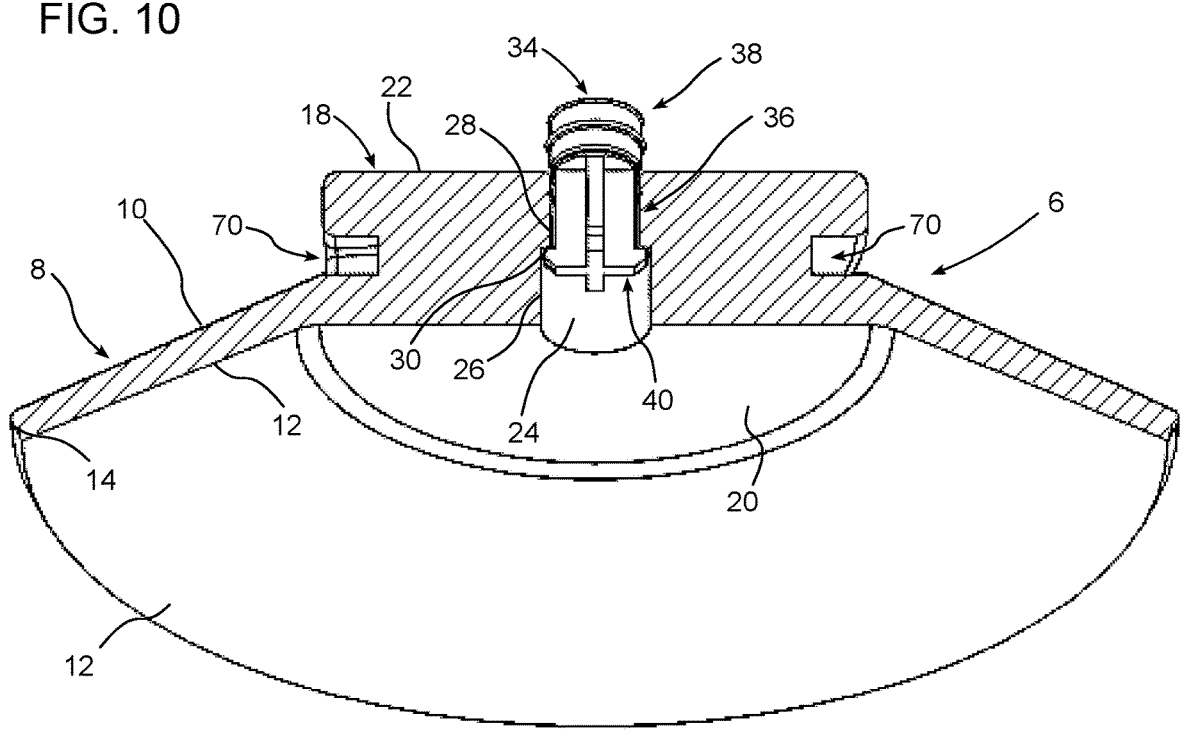
FIG. 10 is a perspective view showing the anchor member and the plunger valve of FIG. 9.
Figure 11:
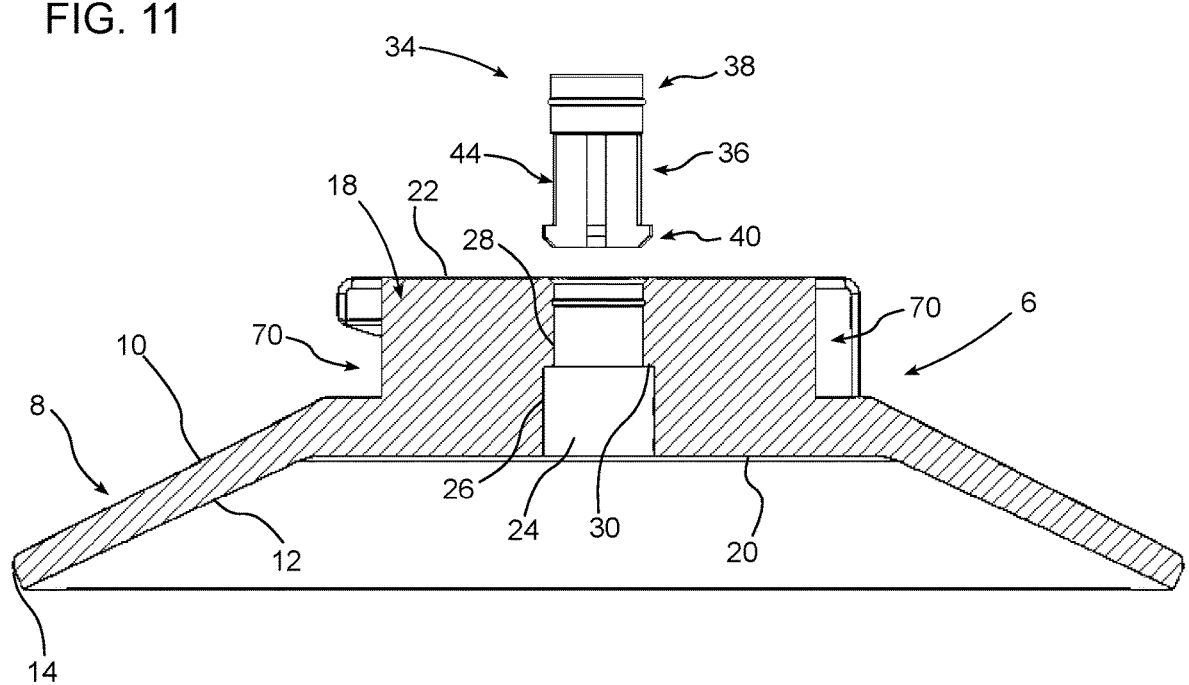
FIG. 11 is a partial cross-sectional and partial side elevation view of an anchor member and a plunger valve of the FIG. 1 suction apparatus in a disassembled state, with an anchor member thereof being shown cross-sectionally along its central longitudinal axis and a plunger valve thereof being shown in side elevation.
Figure 12:
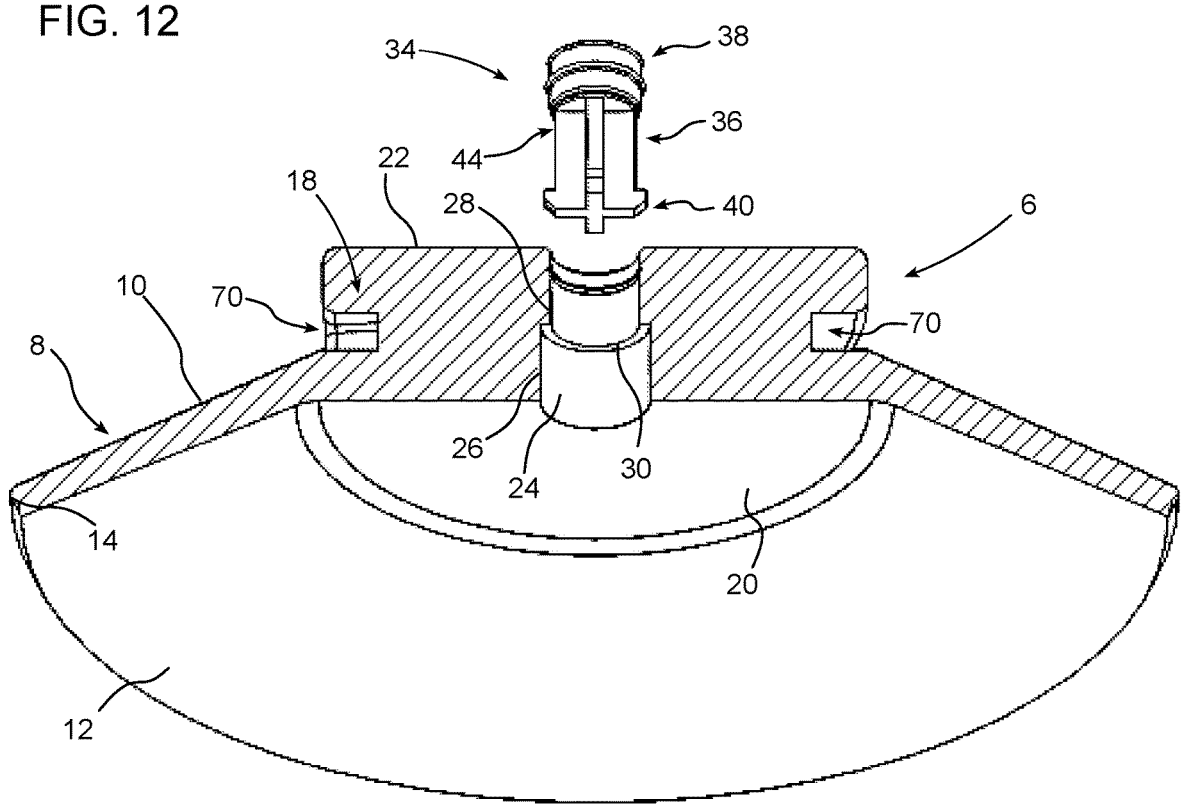
FIG. 12 is a perspective view showing the anchor member and the plunger valve of FIG. 11.

As can be seen in FIGS. 9-10, the plunger valve stabilizer 40 also blocks against the vent port internal shoulder 30 after the plunger valve 34 slides from the closed sealing position and reaches the open venting position. The plunger valve stabilizer 40 thus serves as a plunger valve longitudinal (axial) displacement limiter that prevents removal of the plunger valve 34 from the vent port 24 during normal operation of the suction apparatus 2.

Figure 13:
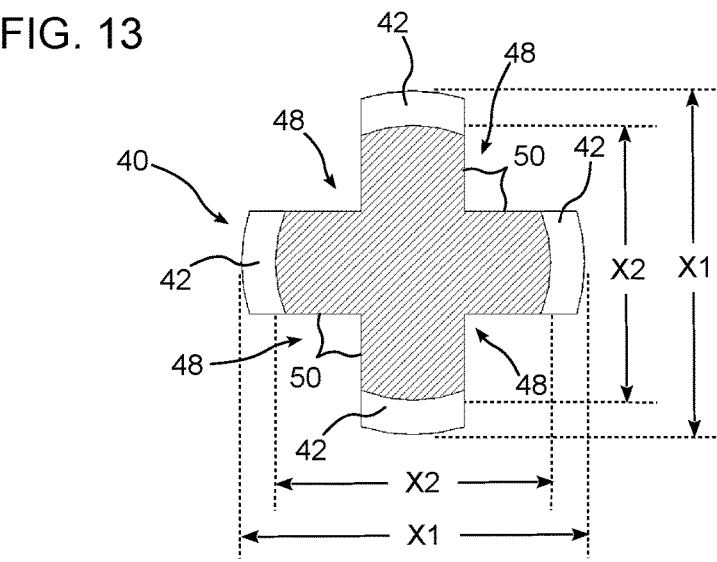
FIG. 13 is cross-sectional view of a plunger valve of the FIG. 1 suction apparatus taken along line 13-13 in FIG. 14.

As shown in FIG. 13, the plunger valve stabilizer 40 may include a set of four transversely-protruding plunger valve guide prongs 42 that are sized to lightly engage the sidewall of the first vent port section 26. The four transverse guide prongs 42 may be arranged 90 degrees apart so as to prevent plunger valve transverse rocking in two dimensions. Additional transverse guide prongs 42 may also be used in order to further stabilize the plunger valve 34 against transverse rocking. If the opposing sidewall surfaces engaged by the transverse guide prongs 42 are separated by a transverse dimension "D1" (as shown in FIG. 14), the plunger valve stabilizer 40 may have a transverse dimension "X1" across any opposing pair of transverse guide prongs 42 that is equal to or slightly less than "D1."

Figure 7:
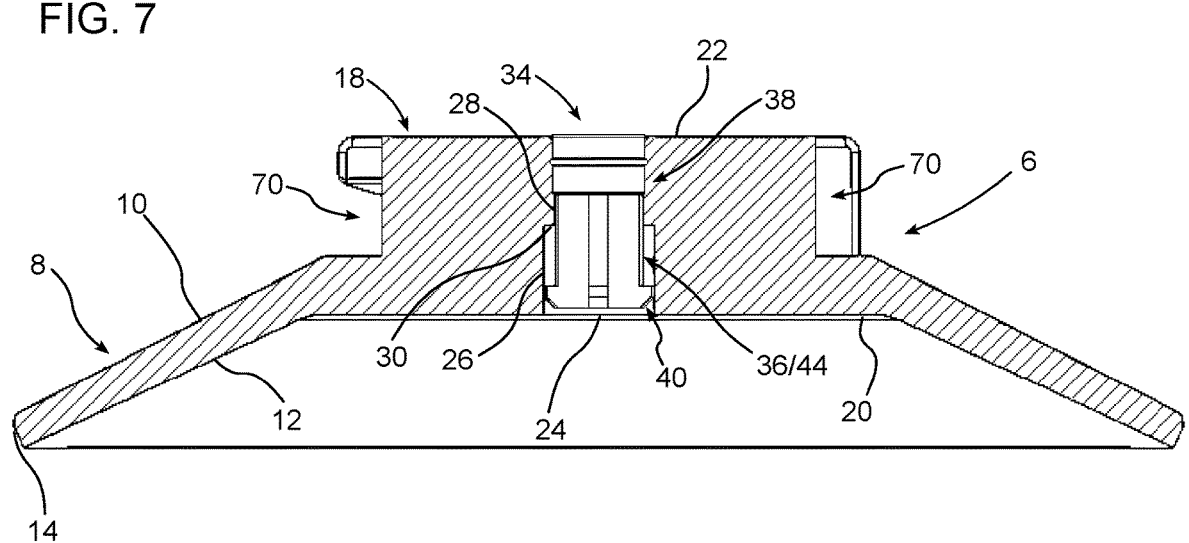
FIG. 7 is a partial cross-sectional and partial side view of an anchor member and a plunger valve of the FIG. 1 suction apparatus, with an anchor member thereof being shown cross-sectionally along its central longitudinal axis and a plunger valve thereof being shown in side elevation and disposed in a closed sealing position.
Figure 8:
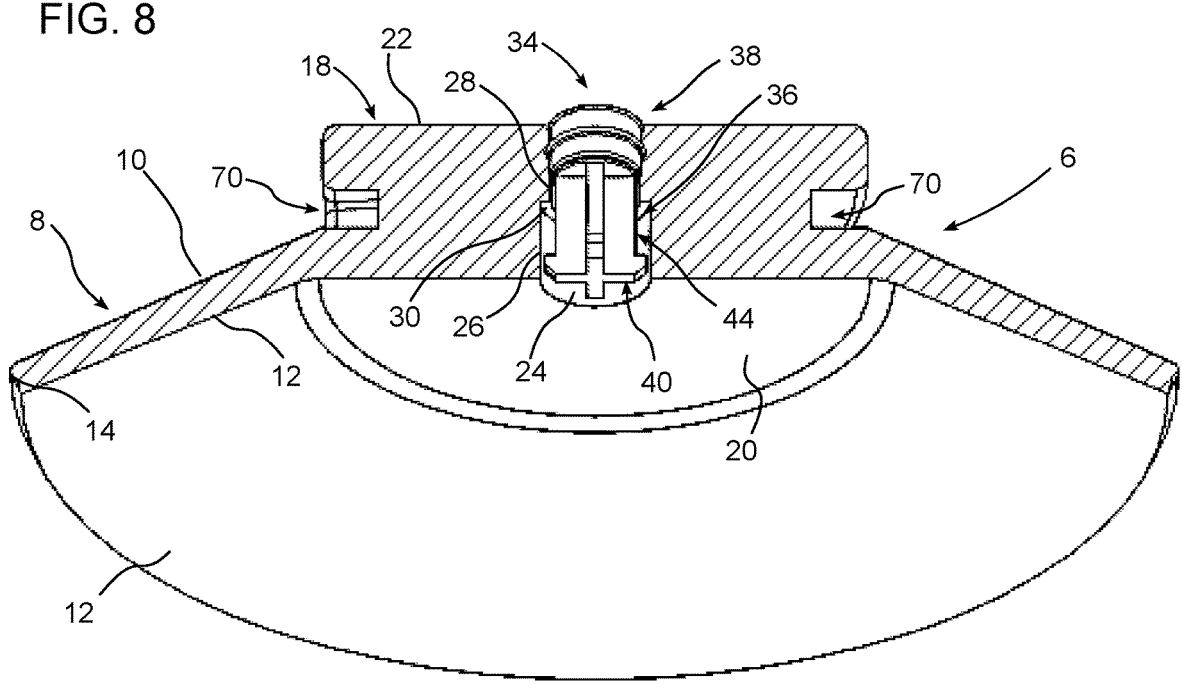
FIG. 8 is a perspective view showing the anchor member and the plunger valve of FIG. 7.
Figure 14:
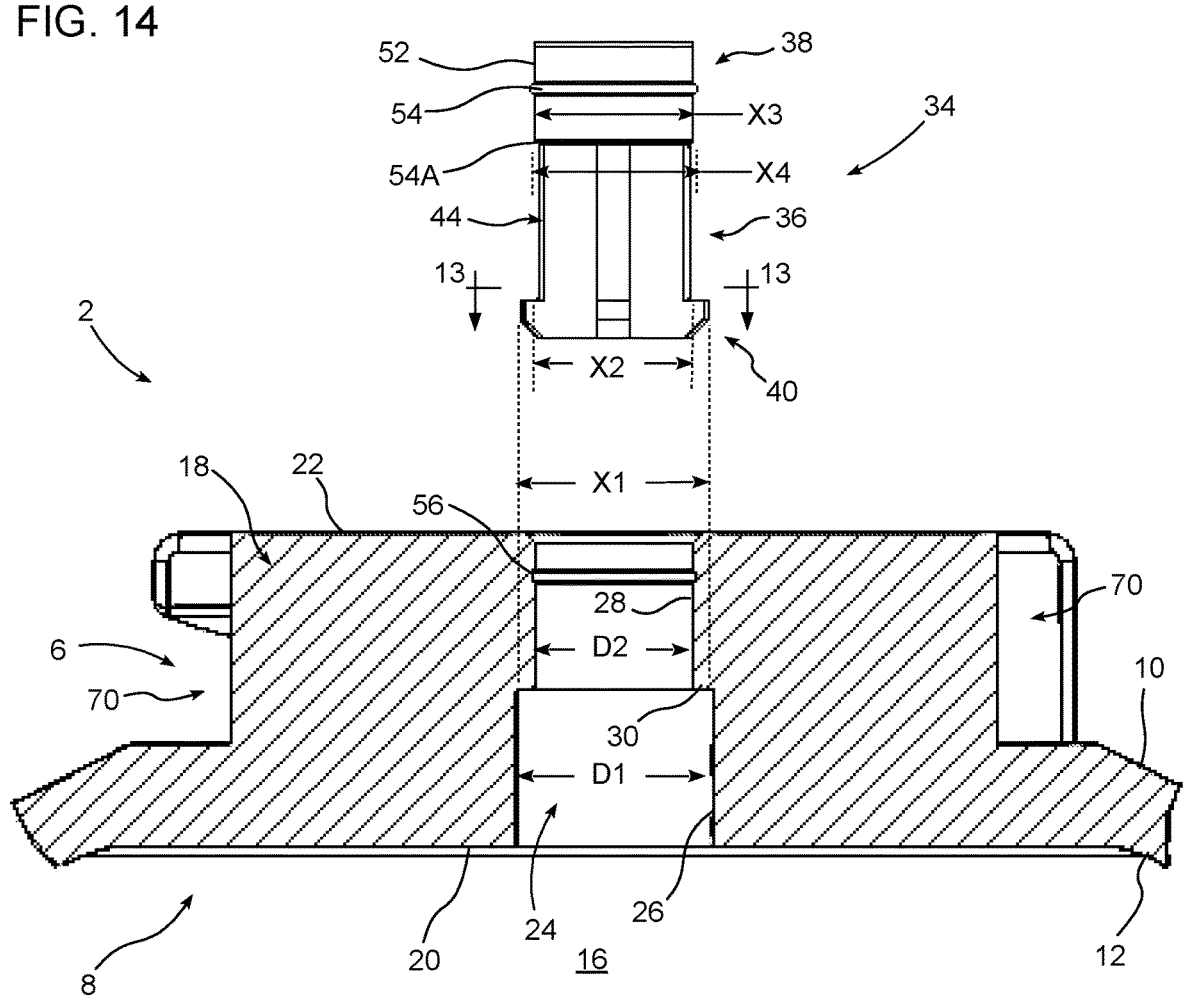
FIG. 14 is a partial cross-sectional and partial side elevation view of an anchor member and plunger valve of the FIG. 1 suction apparatus in a disassembled state, with the anchor member being shown cross-sectionally along its central longitudinal axis and the plunger valve being shown in side elevation.
Figure 15:
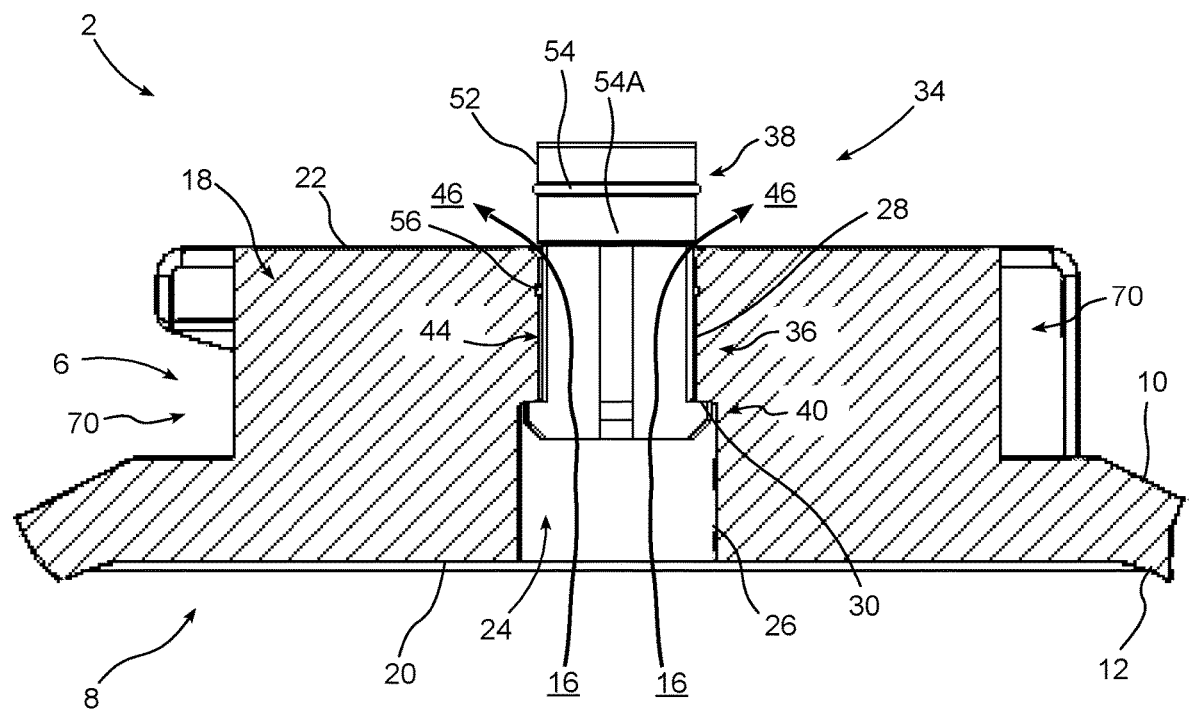
FIG. 15 is a partial cross-sectional and partial side elevation view of an anchor member and a plunger valve of the FIG. 1 suction apparatus, with the anchor member being shown cross-sectionally along its central longitudinal axis and the plunger valve being shown in side elevation and disposed in an open venting position.

As illustrated in FIG. 14, the entirety of the first plunger valve section 36 defines an air bypass neck 44. As can be seen in FIGS. 7-8, the first plunger valve section 36 (and hence the air bypass neck 44) resides at least partially in the first vent port section 26 when the plunger valve 34 is in the closed sealing position, and may also partially extend into the second vent port section 28. The first plunger valve section 36 (and hence the air bypass neck 44) passes further into the second vent port section 28 as the plunger valve 34 displaces to the open venting position. As can be seen in FIGS. 9-10, the first plunger valve section 36 (and hence the air bypass neck 44) extends completely through the second vent port section 28 when the plunger valve 34 reaches the open venting position. In the open venting position, the air bypass neck 44 is configured to slot air through the second vent port section 28 so as to vent the controlled pressure zone 16 through the vent port 24. FIG. 15 depicts air flow venting pathways extending from the controlled pressure zone 16 on the inner side 12 of the base seal member 8 to an area of ambient pressure 46 outside the suction apparatus 2.

The air bypass neck 44 may include one or more axial air flow pathways on the first plunger valve section 26. As shown in FIG. 13, the axial air flow pathways may be implemented as axial slots 48 (e.g., flutes) defined by protruding longitudinal flanges 50 on the first plunger valve section 26. By way of example, FIG. 13 depicts four longitudinal flanges 50 on the first plunger valve section 26 that define four axial slots 48 to provide the one or more axial air flow pathways of the first plunger valve section. As can also be seen in FIG. 13, the previously described transverse guide prongs 42 of the plunger valve stabilizer 40 may be formed as localized prongs that extend transversely from the longitudinal flanges 50 at the inner end of the first plunger valve section 26. If desired, the axial end faces of the transverse guide prongs 42 may be tapered to facilitate insertion of the plunger valve 34 into the vent port 24.

The longitudinal flanges 50 that define the axial slots 48 of the air bypass neck 44 will typically be spaced from the sidewall surfaces of the first vent port section 26. Although not a requirement, the longitudinal flanges 50 may also be spaced from the sidewall surfaces of the second vent port section 28. As previously described, the first vent port section 26 may have a transverse dimension "D1." As can be seen in FIG. 14, the second vent port section 28 may have a transverse dimension "D2" that is smaller than "D1." The difference between "D1" and "D2" serves define the vent port internal shoulder 30 (e.g., as an annular surface).

The air bypass neck 44 may have a transverse dimension "X2" across any opposing pair of transverse longitudinal flanges 50. In the illustrated embodiment, the dimension "X2" is less than the transverse dimension "X1" associated with the transverse guide prongs 42 of the plunger valve stabilizer 40. In the illustrated embodiment, the dimension "X2" is also less than the transverse dimension "D1" of the first vent port section 26. The dimension "X2" may likewise be less than the transverse dimension "D2" associated with the second vent port section 28. As described in more detail below, this facilitates removal of the plunger valve 34 from the vent port 24 because the longitudinal flanges 50 do not engage the sidewall surfaces of the second vent port section 28, and will therefore not create frictional resistance to plunger valve displacement. In addition, as shown in FIG. 14, sizing the longitudinal flanges 50 so that they are spaced from the sidewall surfaces of the second vent port section 28 (i.e., X2<D2) provides some measure of venting of the controlled pressure zone 16 when the plunger valve 34 reaches the open venting position. Thus, in an embodiment, the axial air flow pathways provided by the axial slots 48 of the air bypass neck 44 could be potentially eliminated or reduced in size. Doing so, however, may require that a small gap be provided between the sidewall surfaces of the first vent port section 26 and the plunger valve stabilizer 40 (i.e., such that X1<D1) so that air can easily bypass around the entirety of the plunger valve 34.

As best shown in FIG. 14, the second plunger valve section 38 may be formed as an enlarged vent port stopper 52 configured to plug and seal the second vent port section 28 when the plunger valve 34 is in the closed sealing position in order to prevent the passage of air through the vent port 24. To provide the required sealing, the vent port stopper 52 should have the same cross-sectional shape as the second vent port section 28. In order to further ensure good sealing, the vent port stopper 52 may be cross-sectionally larger than the second vent port section 28 so as to create an interference fit when the vent port stopper engages the second vent port section with the plunger valve 34 in the closed sealing position. To create the interference fit, the vent port stopper 52 may have a transverse dimension "X3" that is slightly larger than the transverse dimension "D2" of the second vent port section 28. In the illustrated embodiment, the vent port stopper 52 and the second vent port section 28 each have a circular cross-section. As such, the dimensions "X3" and "D2" are diameters, and the "X3" diameter of the vent port stopper 52 is larger than the "D2" diameter of the second vent port section 28.

One advantage of providing an interference fit between the vent port stopper 52 and the second vent port section 28 is to resist inadvertent opening of the plunger valve 34 and consequent venting of the controlled pressure zone 16. The likelihood of unwanted venting may also be reduced by forming the vent port stopper 52 with sufficient axial length to require a predetermined amount of axial displacement when opening the plunger valve 34 before the vent port stopper clears the second vent port section and vents the controlled pressure zone 16.

In addition to or in lieu of forming the vent port stopper 52 to provide an interference fit with the second vent port section 28, the vent port stopper may be formed with a protruding transverse lock flange 54 that engages a corresponding transverse lock slot 56 in the second vent port section when the plunger valve 34 is in the closed sealing position. The lock flange 54 and the lock slot 56 provide an interlock mechanism that serves to fix the plunger valve 34 in the closed sealing position. Because the vent port stopper 52 and the second vent port section 28 each have a circular cross-section in the illustrated embodiment, the transverse flange 54 may be formed as a circular ring and the transverse slot 56 may be formed as a circular groove.

Figure 14A:
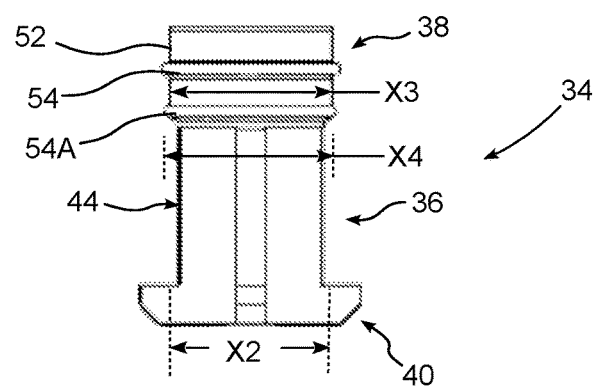
FIG. 14A is a partial side elevation view showing an alternative plunger valve that may be provided to replace the plunger valve shown in FIG. 14.

Optionally, as shown in FIG. 14A, a second transverse flange 54A may be provided on the plunger valve 34 to provide additional sealing capability. In the illustrated embodiment, the second transverse flange 54A is provided as a transverse plug flange that may be situated in spaced relation to the transverse lock flange 54 and arranged to sealably engage a separate sidewall portion of the second vent port section 28. The sidewall portion engaged by the transverse plug flange 54A may be a nominal sidewall section that is smooth and non-slotted or it may be formed with a transverse-slot (not shown) that receives the transverse plug flange 54A when the plunger valve 34 is in its closed sealing position.

The transverse plug flange 54A may be longitudinally disposed on either side of the transverse lock flange 54, at any location along the length of the vent port stopper 52. In FIG. 14A, the transverse plug flange 54A is located on the inboard side of the transverse lock flange 54 (i.e., the side closest to the seal member 8), and is thus comparatively closer to the seal member than the transverse lock flange. More particularly, the transverse plug flange 54A may be located proximate to the inboard end of the vent port stopper 52. In other embodiments, the transverse plug flange 54A could be located elsewhere, such as on the outboard side of the transverse lock flange 54 (i.e., the side farthest from the seal member 8), such that it is comparatively farther away from the seal member than the transverse lock flange.

In the embodiment shown in FIG. 14A, the transverse plug flange 54A may engage a nominal sidewall portion of the suction cup's second vent port section 28 that is non-slotted. To promote efficient vent port sealing, the plunger valve 34 may be designed so that the transverse plug flange 54A maintains an interference fit with the vent port sidewall. For example, as shown in FIG. 14A, the transverse plug flange 54A may be formed with a transverse dimension "X4" that is slightly larger than the transverse dimension "D2" of the second vent port section 28. In the illustrated embodiment, both the transverse plug flange 54A and the second vent port section 28 have circular cross-sections. As such, the dimensions "X4" and "D2" are diameters, and the "X4" diameter of the transverse plug flange 54A is larger than the "D2" diameter of the second vent port section 28.

The portions of the plunger valve's vent port stopper 52 that do not include any transverse flanges (54 or 54A) may be equal to or smaller in cross-sectional size than the second vent port section 28. Thus, the transverse dimension "X3" of the vent port stopper 52 may be equal to or slightly less than the transverse dimension "D2" of the second vent port section 28. In the illustrated embodiment wherein the vent port stopper 52 and the second vent port section 28 have a each circular cross-section, the dimensions "X3" and "D2" will be diameters, and the "D2" diameter of the second vent port section 28 may be equal to or larger than the "X3" diameter of the vent port stopper 52.

In FIG. 14A, the transverse plug flange 54A is cross-sectionally smaller than the transverse lock flange 54. However, this need not always be the case. In alternative embodiments, the transverse plug flange 54A could be the same size or even cross-sectionally larger than the transverse lock flange 54.

The plunger valve constructions shown in FIGS. 14-15 that utilize one or two transverse flanges (54 or 54A) provide robust sealing while reducing the force required to pull out the plunger valve 34 to its open venting position. If desired, one or more additional instances of the transverse lock flange 54 and/or the transverse plug flange 54A could be provided, such that the plunger valve 34 has a plurality of transverse flanges, some or all of which may engage the vent port sidewall, or a transverse slot therein.

Summarizing the foregoing discussion of the vent port stopper 52, it will be appreciated that resistance to inadvertent plunger valve opening may be provided by designing the vent port stopper so that it includes either (1) a cross-section that is larger than a cross-section of the second vent port section 28 so as to create an interference fit when the vent port stopper engages the second vent port section with the plunger valve 32 in the closed sealing position, or (2) a protruding transverse lock flange 54 that engages a corresponding transverse lock slot 56 in the second vent port section, optionally in combination with an additional plug flange 54A. Alternatively, both of features (1) and (2) may be used in the suction apparatus 2.

Figure 16:
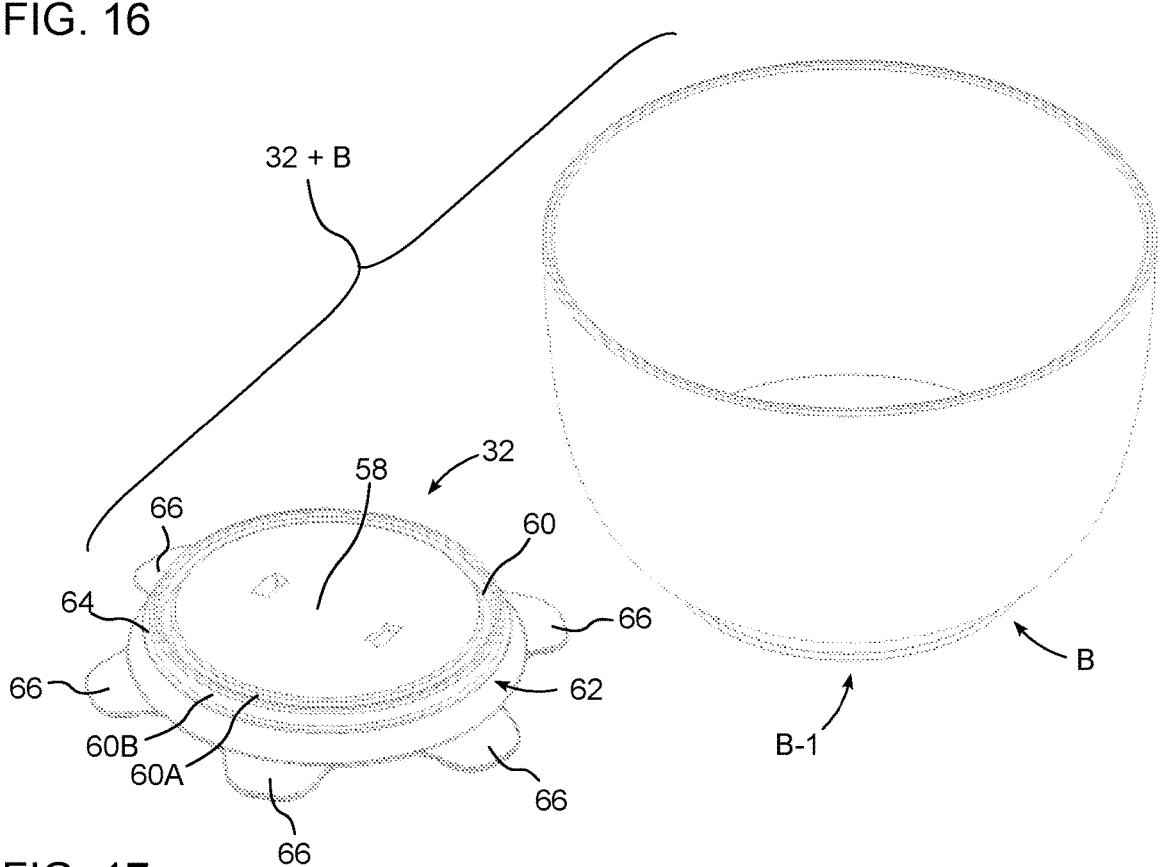
FIG. 16 is an exploded upper perspective view showing of a movable member of the FIG. 1 suction apparatus, in combination with a food preparation bowl.
Figure 17:
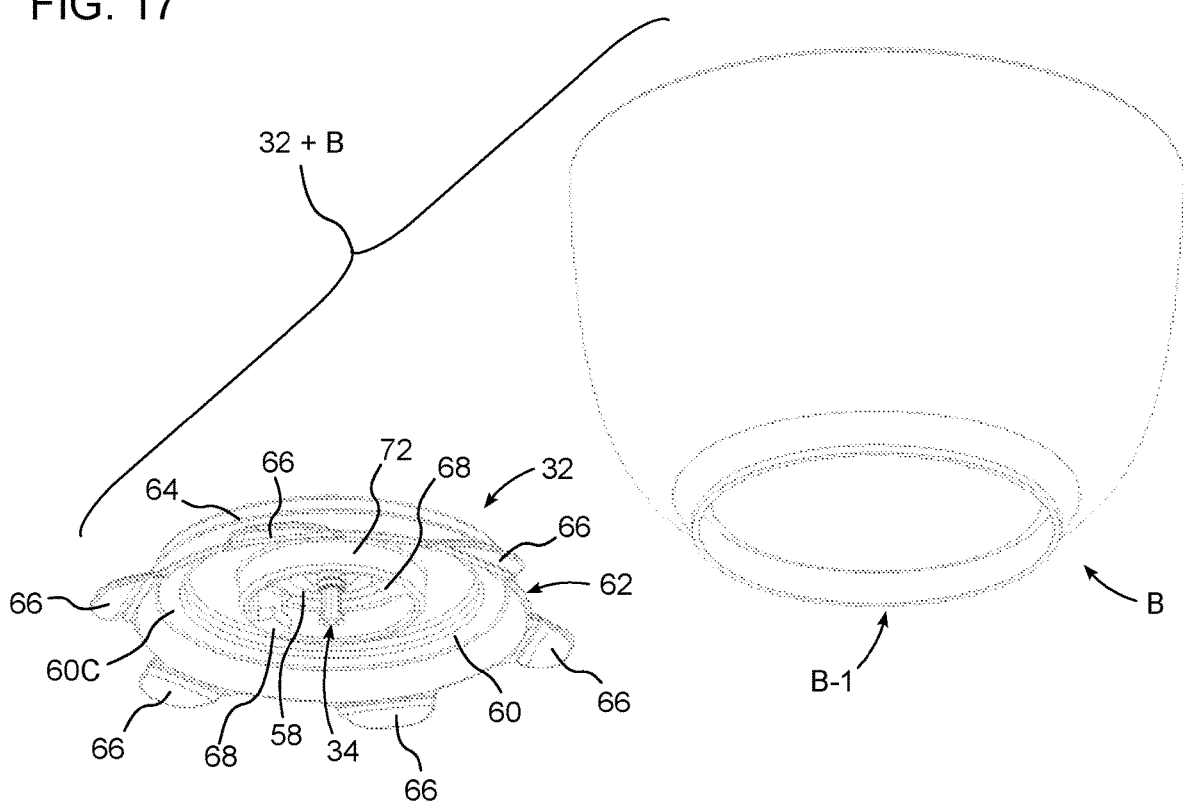
FIG. 17 is an exploded lower perspective view showing of a movable member of the FIG. 1 suction apparatus, in combination with a food preparation bowl.

As previously mentioned in connection with FIGS. 5-6, the plunger valve 34 may extend downwardly from a central lower surface portion 35 of the movable member 32. More specifically, the plunge valve 34 may extend downwardly from the underside of a main body 58 (also shown in FIGS. 5-6) of the movable member 32. As additionally shown in FIGS. 16-17, the main body 58 of the movable member 32 may form a base structure for supporting the bowl "B." In the illustrated embodiment, the movable member's main body 58 may be formed as a circular disk-like structure, with other shapes also being possible. As can be seen in FIG. 17, the plunger valve 34 may extend downwardly from the center of the main body 58. The remainder of the main body may extend radially outwardly from the plunger valve to a periphery thereof that may be formed as an out-of-plane ring flange 60 that provides structural rigidity. The ring flange 60 appears on the upper side of the movable member 32 to include an annular groove (see FIG. 16). The ring flange 60 appears on the lower side of the movable member 32 to include an annular ridge (see FIG. 17). As can be seen in FIGS. 5-6, the ring flange 60 appears in cross-section as a U-shaped formation with respective inner and outer sidewalls 60A and 60B (FIG. 16), and a base 60C (FIG. 17).

A secondary body 62 of the movable member 32 extends outwardly and downwardly from the periphery of the main body 58. More specifically, the secondary body 62 initially extends radially outwardly from the outer sidewall 60B of the ring flange 60, where it forms a shallow annular sill 64. As can can be seen in each of FIGS. 5-6 and 16-17, the sill 64 taken in combination with the outer sidewall 60B of the ring flange 60 serve as a support structure for the bowl "B." In particular, the bottom of the bowl "B" may be formed with an annular ring "B-1" whose lower surface rests on the sill 64 and whose inner surface facially engages the outer sidewall 60B.

The secondary body 62 extends downwardly and outwardly from the annular sill 64. One or more rigid or semi-rigid outboard stabilizers 66 may be integrally formed on or otherwise provided at the lower-outer periphery of the secondary body 62. By way of example only, FIGS. 16-17 depict six outboard stabilizers 66 that are shaped as rounded tabs or flaps, with other shapes being possible. It will be appreciated that although six stabilizers 66 are shown in the illustrated embodiment, other embodiments may have more or fewer outboard stabilizers. As can be seen in FIG. 6, the one or more stabilizers 66 engage the reference surface 4 when the plunger valve 32 is in its closed sealing position.

The movable member 32 acts as an external plunger valve actuating member. When combined with the bowl "B", the movable member 32 provides a graspable structure that enables a user to easily manipulate the plunger valve 34 in order to pull and push the valve between its closed and open positions. As shown in FIGS. 5 and 6, the plunger valve 32 may be formed so that the main body 58 engages the free end 22 of the anchor member stem 18 when the plunger valve is pushed into the closed sealing position. The main body 58 may thus serve as a stop that limits inward displacement of the plunger valve 32 to define the closed sealing position, just as the plunger valve stabilizer 40 (see FIGS. 7-8) limits outward displacement of the plunger valve to define the open venting position. The movable member 32 will also aid in anchoring the suction apparatus 2 by engaging the stem 18 and transferring pushing force onto the anchor member 6 in order to flatten the seal member 8 against the reference surface 4 (should it be necessary to apply such pushing force).

To help the suction apparatus 2 maintain suction engagement with the reference surface 4 (see FIG. 6), the movable member 32 may be configured to lockingly interact with the anchor member 6 when the plunger valve 34 is in its closed sealing position. In particular, as shown in FIGS. 5-6, a twist-to-lock coupling connection 67 may be provided between the movable member 32 and the anchor member 6. As will now be described, the twist-to-lock coupling connection 67 is operable by rotating the movable member 32 relative to the anchor member 6 between a locking state and an unlocking state of the twist-to-lock coupling connection.

The locking state of the twist-to-lock coupling connection 67 is characterized by the movable member 32 being locked against the slidable movement relative to the anchor member 6. The unlocking state of the twist-to-lock coupling connection 67 is characterized by the movable member 32 being unlocked against the slidable movement relative to the anchor member 6.

As will be described in more detail below, the twist-to-lock coupling connection 67 may be designed so that it is operable only while the movable member 32 is in its closed sealing position. This facilitates a two-stage seal-and-lock mode of operation in which a user first seals the suction apparatus 2 to the reference surface 4 with the movable member positioned to close the vent port 24 (and thereby seal the controlled pressure zone 16), then rotates the movable member to manipulate the twist-to-lock coupling connection 67 to its locking state to prevent inadvertent unsealing and removal of the suction apparatus from the reference surface. Conversely, a two-stage unlock-and-vent mode of operation is provided in which a user first rotates the movable member 32 to manipulate the twist-to-lock coupling connection to its unlocking state, then vents the controlled pressure zone 16 (by maneuvering the movable member to its venting position) in order to unseal and remove the suction apparatus from the reference surface 4.

Notwithstanding the foregoing advantages of requiring that the sealing position of the movable member 32 be effected before operating the twist-to-lock coupling connection 67, other embodiments may utilize a twist-to-lock coupling connection that is operable regardless whether an associated movable member is in its closed sealing position or its open venting position. In such embodiments, rotation of the movable member to transition the twist-to-lock coupling connection from its unlocking state to its locking state may also transition the movable member from it open venting position to its closed sealing position. Similarly, rotation of the movable member to transition the twist-to-lock coupling connection from its locking state to its unlocking state may also transition the movable member from it closed sealing position to its open venting position.

The twist-to-lock coupling connection 67 may be implemented in various ways. As can be seen in FIGS. 3-4, the twist-to-lock coupling connection 67 may be provided by at least one protrusion 68 that engages at least one slot 70. The at least one protrusion 68 may be associated with the movable member 32, and the at least one slot 70 may be associated with the anchor member 6. Alternatively, the at least one protrusion 68 may be associated with the anchor member 6, and the at least one slot 70 may be associated with the movable member 32. FIGS. 3-4 illustrate the first design approach, with the at least one protrusion 68 being embodied as a pair of protrusions 68 associated with the movable member 32, and the at least one slot 70 being embodied as a pair of protrusions 70 associated with the anchor member 6. As will be discussed in due course, an alternative embodiment shown in FIG. 27 utilizes the second design approach wherein at least one anchor member protrusion 368 engages at least one movable member slot 370.

As can be seen in FIG. 3, the protrusions 68 may extend inwardly from an inside sidewall of a central annular cup 72 formed on the lower side of the movable member's main body 58. As additionally shown in FIGS. 5-6, the annular cup 72 concentrically surrounds the plunger valve 34, and is sized diametrically to fit over the anchor member stem 18 with its inner sidewall being situated in opposing relationship with the outside sidewall of the anchor member stem. The slots 70 are formed on the outside sidewall of the anchor member stem 18, which slidably extends inside the annular cup 72 of the movable member 32.

Figure 18A:
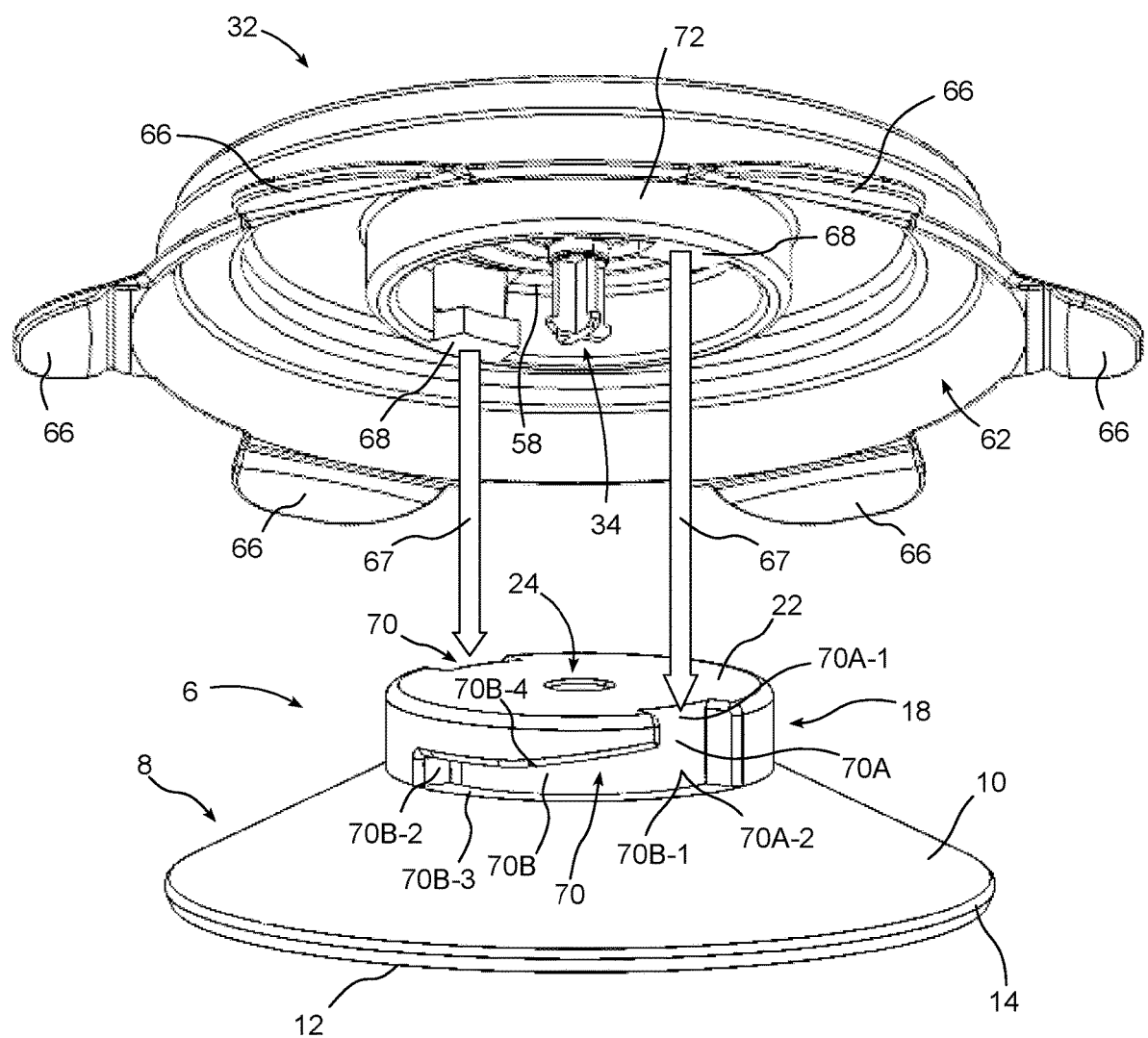
FIG. 18A is an exploded perspective view showing a movable member and an anchor member of the FIG. 1 suction apparatus, and illustrating example projections on the movable member that engage slot components on the anchor member to provide a twist-to-lock coupling connection of the suction apparatus according to an example embodiment, with the movable member being in a rotational position that is characteristic of an unlocking state of the twist-to-lock coupling connection.
Figure 18B:
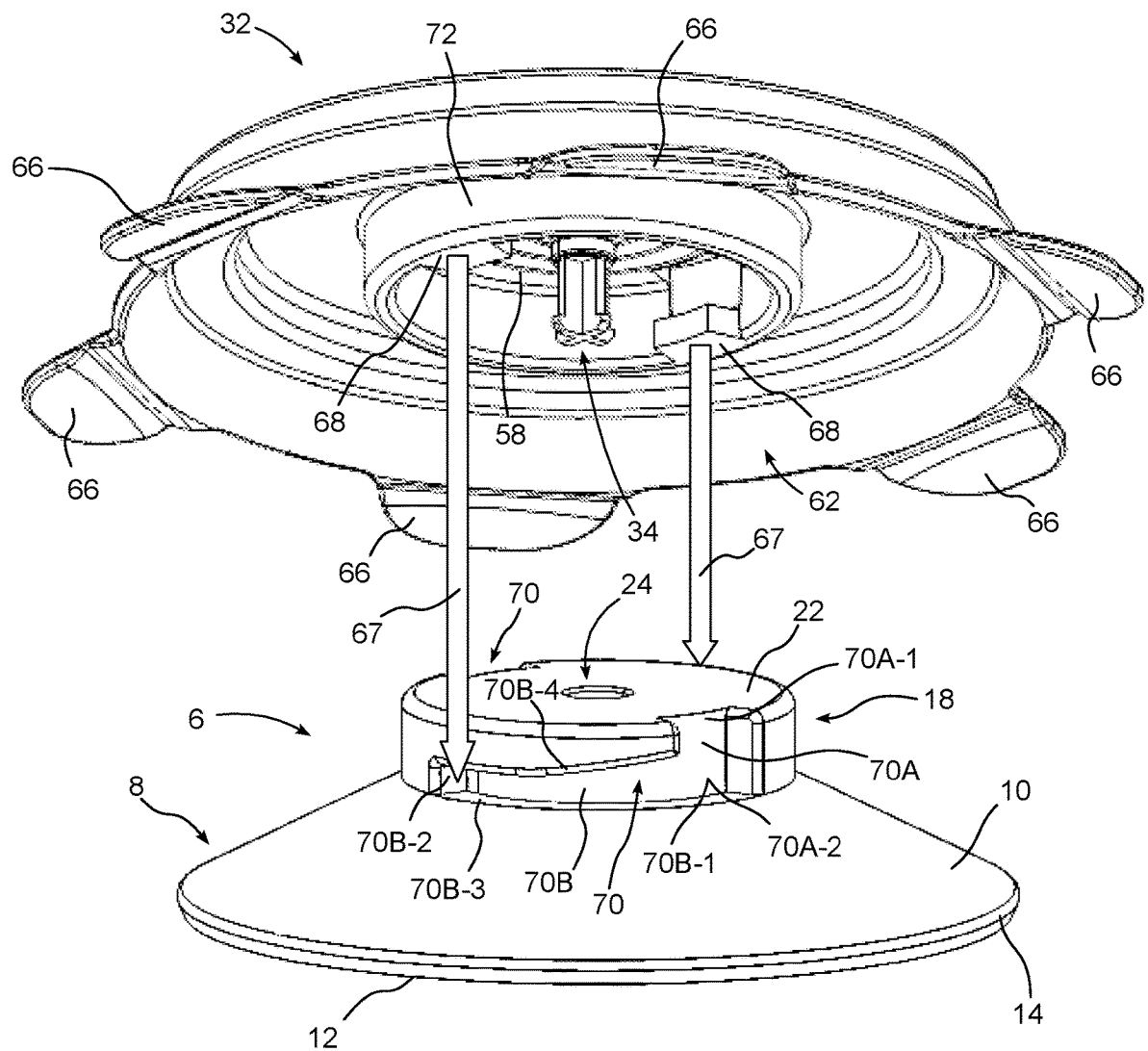
FIG. 18B is an exploded view showing the twist-to-lock coupling connection of FIG. 18A, with the movable member being in a rotational position that is characteristic of a locking state of the twist-to-lock coupling connection.
Figure 20A:
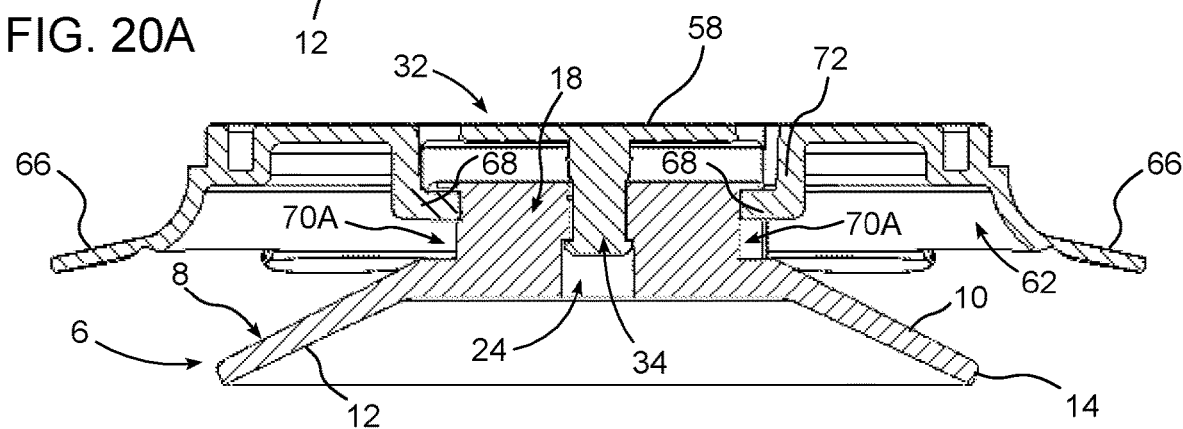
FIG. 20A is a cross-sectional centerline view showing the anchor member and the movable member of FIGS. 18A-18B, with slot portions of the anchor member engaging projection portions of the movable member when the movable member is in an open venting position and the twist-to-lock coupling connection of FIGS. 18A-18B is in an unlocking state.

Turning now to FIGS. 18A-18B, FIG. 18A depicts the movable member 32 in a rotational position that is characteristic of an unlocking state of the twist-to-lock coupling connection. FIG. 18B depicts the movable member 32 in a rotational position that is characteristic of a locking state of the twist-to-lock coupling connection. As can be seen, the amount of movable member rotation required to change from the unlocking state to the locking state (and visa versa) is 90 degrees. In other embodiments, the amount of required rotation could be more or less than 90 degrees. A twist-to-lock coupling connection that does not require more than than 360 degrees of rotation will be suitable for many applications. That said, a twist-to-lock coupling connection that requires more than 360 degrees of rotation may provided if so desired.

As can be seen in FIGS. 18A and 18B, the slots 70 may be formed as L-shaped structures formed diametrically in the sidewall of the anchor member stem 18. The L-shaped configuration of each slot 70 is provided by a longitudinal slot leg 70A interconnected with a transverse slot leg 70B to form a continuous slot pathway that allows a corresponding one of the protrusions 68 to traverse both slot legs. The longitudinal slot leg 70A may be oriented substantially parallel to a longitudinal axis of the anchor member stem 18, which is itself parallel to the sliding direction of the movable member 32 as it moves between its sealing and venting positions without any required rotation (although rotation may be permitted if so desired). The longitudinal slot leg 70A may extend from an open terminal end 70A-1 located at the free end 22 of the anchor member stem 18 to a closed base end 70A-2 located at or proximate to the outer side 10 of the seal member 8. The transverse slot leg 70B may be substantially orthogonal (i.e., 90 degrees) to the longitudinal slot leg 70A to guide a corresponding one of the protrusions as the movable member 32 moves between the unlocking and locking states of the twist-to-lock coupling connection 67. The transverse slot leg 70B may extend from a closed base end 70B-1 located at the base end 70A-2 of the longitudinal slot leg 70A to a closed terminal end 70B-2 that is transversely spaced from the longitudinal leg. A lower side 70B-3 of the transverse slot leg 70B may follow the line of intersection between the outer sidewall of the anchor member stem 18 and the outer side 10 of the seal member 8. An upper side 70B-4 of the transverse slot leg 70B may be configured as a cam surface that slants downwardly from it point of intersection with the longitudinal slot leg 70A to a location that is proximate to the closed terminal end of the transverse slot leg, at which point, the upper side may run parallel to the lower side of the transverse slot leg.

Turning now to FIGS. 19-20, FIGS. 19A and 20A depict an arrangement of components when the movable member in its open venting position and the twist-to-lock coupling connection 67 is in its unlocking state. Each protrusion 68 of the movable member 32 is situated in engagement with a longitudinal slot leg 70A of the anchor member 6, at the open terminal end 70A-1 thereof.

Figure 19A:
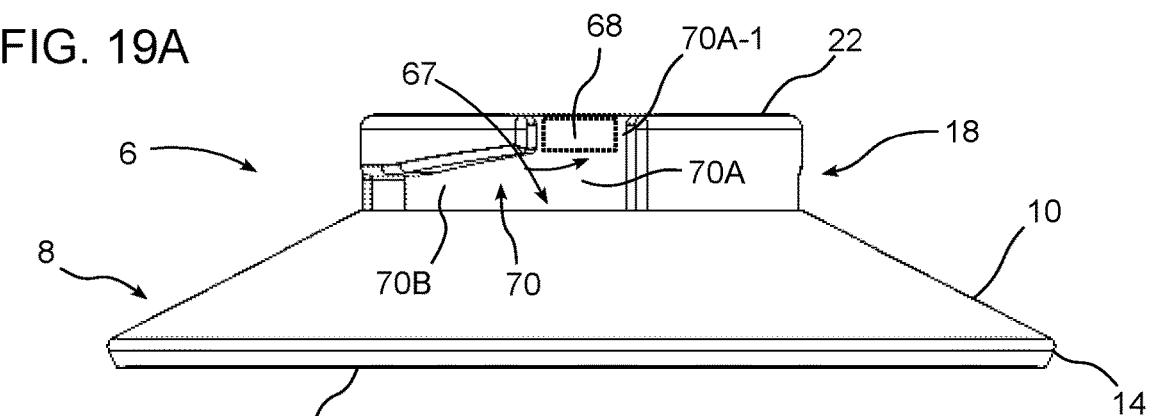
FIG. 19A is a side elevation view of the anchor member of FIGS. 18A-18B, with a slot portion of the anchor member engaging a projection portion of the movable member of FIGS. 18A-18B when the movable member is in an open venting position and the twist-to-lock coupling connection of FIGS. 18A-18B is in an unlocking state.
Figure 19B:
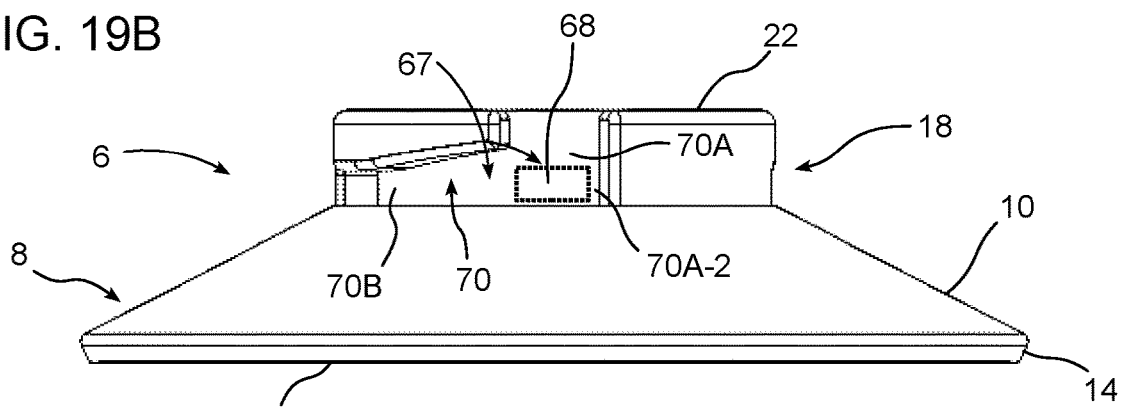
FIG. 19B is a side elevation view of an anchor member of FIGS. 18A-18B, with a slot portion of the anchor member engaging a projection portion of the movable member of FIGS. 18A-18B when the movable member is in a closed sealing position and the twist-to-lock coupling connection of FIGS. 18A-18B is in an unlocking state.
Figure 20B:
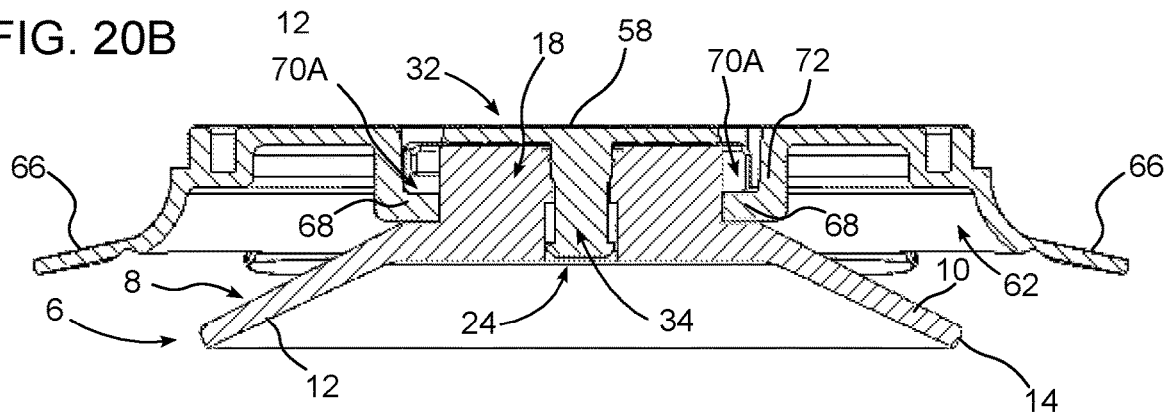
FIG. 20B is a cross-sectional centerline view showing the anchor member and the movable member of FIGS. 18A-18B, with slot portions of the anchor member engaging projection portions of the movable member when the movable member is in a closed sealing position and the twist-to-lock coupling connection of FIGS. 18A-18B is in an unlocking state.

FIGS. 19B and 20B depict an arrangement of components when the movable member is in its closed sealing position and the twist-to-lock coupling connection 67 is in its unlocking state. Each protrusion 68 of the movable member 32 has traversed the longitudinal slot leg 70A from its open terminal end 70A-1 to its closed base end 70A-2 as the movable member slides without rotation relative to anchor member 6 from the movable member's open venting position to its closed sealing position.

Figure 19C:
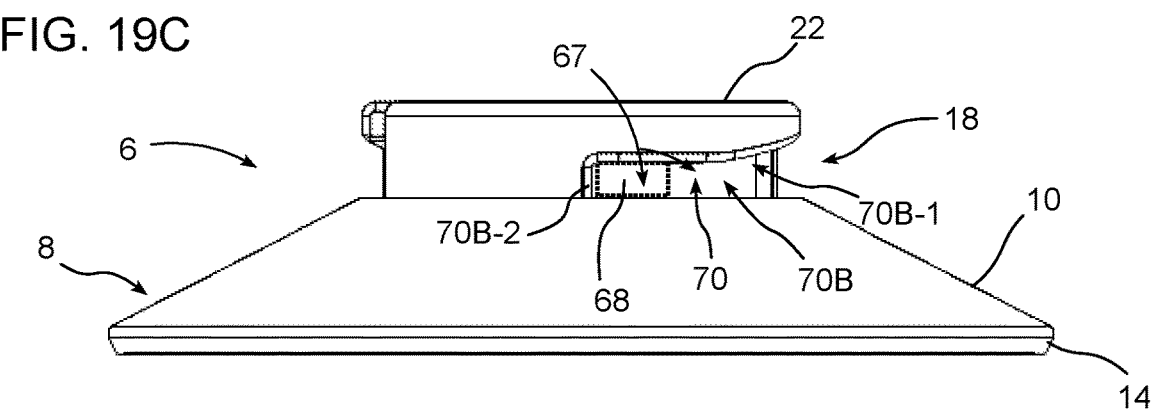
FIG. 19C is a side elevation view of an anchor member of FIGS. 18A-18B, with a slot portion of the anchor member engaging a projection portion of the movable member of FIGS. 18A-18B when the movable member is in a closed sealing position and the twist-to-lock coupling connection of FIGS. 18A-18B is in a locking state.
Figure 20C:
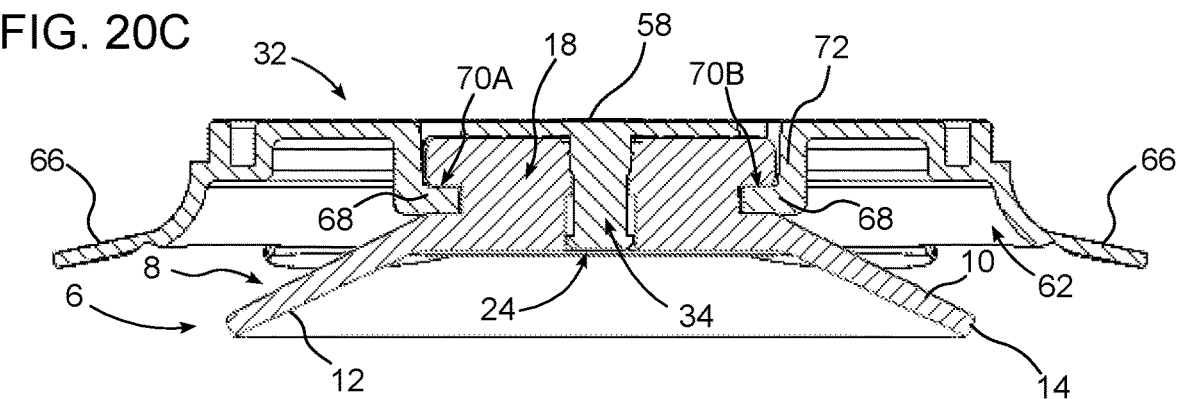
FIG. 20C is a cross-sectional centerline view showing the anchor member and the movable member of FIGS. 18A-18B, with slot portions of the anchor member engaging projection portions of the movable member when the movable member is in a closed sealing position and the twist-to-lock coupling connection of FIGS. 18A-18B is in a locking state.

FIGS. 19C and 20C depict an arrangement of components when the movable member is in its closed sealing position and the twist-to-lock coupling connection 67 is in its locking state. Each protrusion 68 of the movable member 32 has traversed the transverse slot leg 70B from its closed base end end 70B-1 to its closed terminal end 70B-2 as the movable member rotates without sliding relative to anchor member 6, thereby maneuvering the twist-to-lock coupling connection 67 from its unlocking state to its locking state.

Turning now to FIGS. 21A-21D, an example method for using the suction apparatus 2 will now be described. The method is described as a series of operations that need not be performed in any particular order. According to the method operations, when it is desired to attach the suction apparatus 2 to the reference surface 4, the suction apparatus may be positioned so that the inner side 12 of the seal member 8 is in contact with the reference surface. The plunger valve 34 may be in either the open venting position (FIG. 21A) or the closed sealing position (FIG. 22B). In both FIG. 21A and FIG. 21B, the movable member 34 is rotated to that the twist-to-lock coupling connection 67 is in its unlocking state.

Figure 21A:
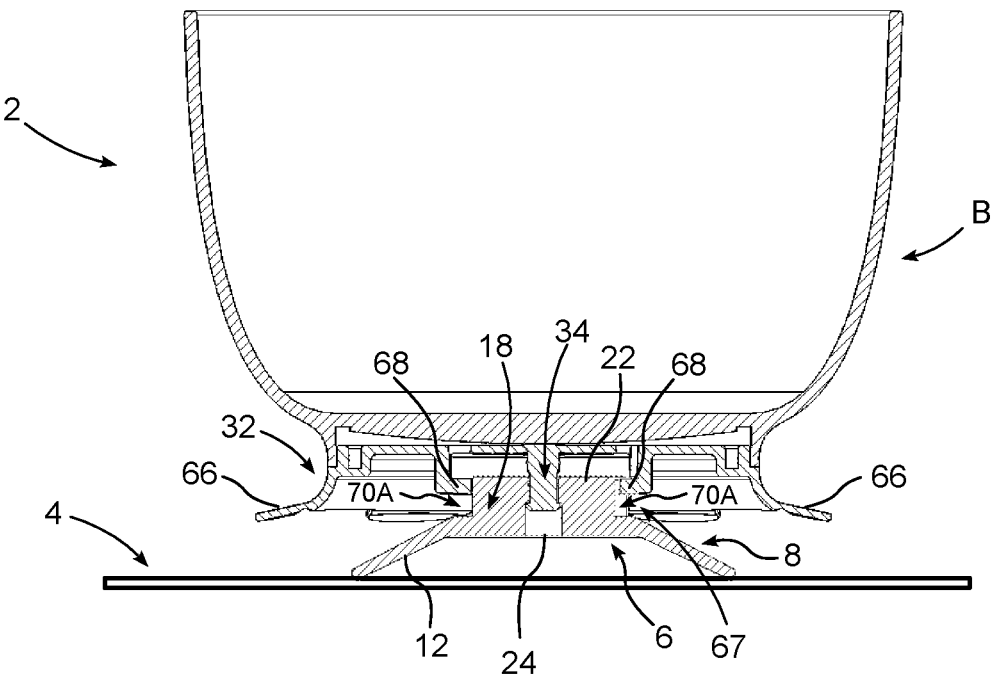
FIG. 21A is a cross-sectional view of the FIG. 1 suction apparatus, with an anchor member thereof contacting a reference surface, a movable member thereof in an open venting position, and the movable member being rotated to a position that is characteristic of a locking state of the twist-to-lock coupling connection of FIGS. 18A-18B.
Figure 21B:
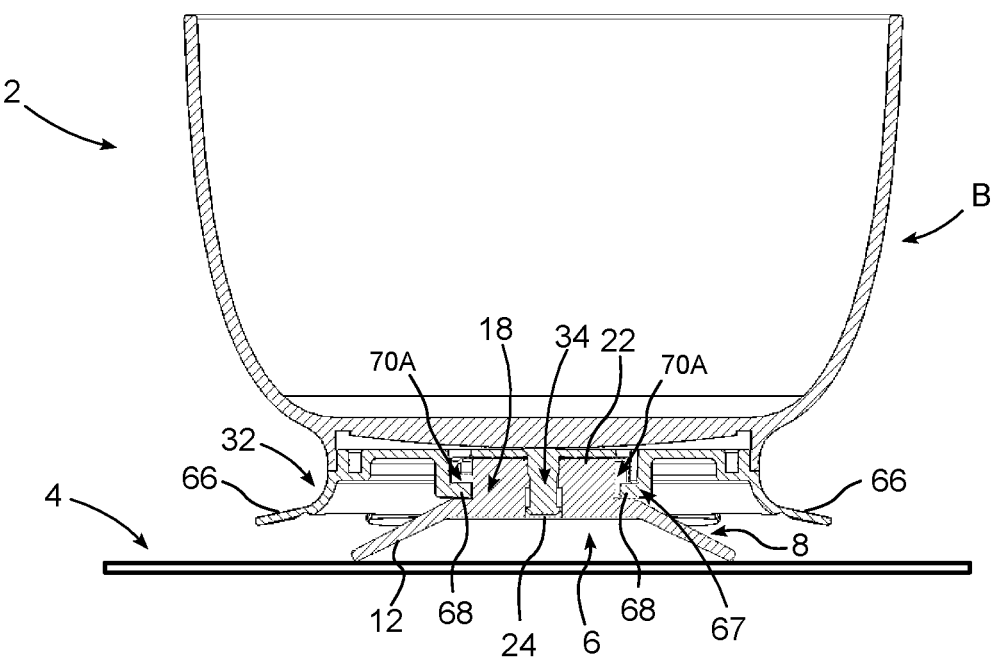
FIG. 21B is a cross-sectional view of the FIG. 1 suction apparatus, with an anchor member thereof contacting a reference surface, a movable member thereof in a closed sealing position in spaced relationship with the reference surface, and the movable member being rotated to a position that is characteristic of a locking state of the twist-to-lock coupling connection of FIGS. 18A-18B.

As noted, FIG. 21A depicts the suction apparatus 2 with the movable member 32 in open venting position. The movable member 32 is slidably positioned on the anchor member stem 18 so that each projection 68 of the movable member is situated at the terminal end 70A-1 of its corresponding longitudinal slot leg 70A. FIG. 21B depicts the suction apparatus 2 having been maneuvered so as to cause the movable member 32 to assume or maintain its sealing position. The movable member 32 is situated in a lowermost position on the anchor member stem 18, with each projection 68 of the movable member having traversed down its corresponding longitudinal slot leg 70A, from the terminal end 70A-1 to the base end 70A-2 thereof.

Figure 21C:
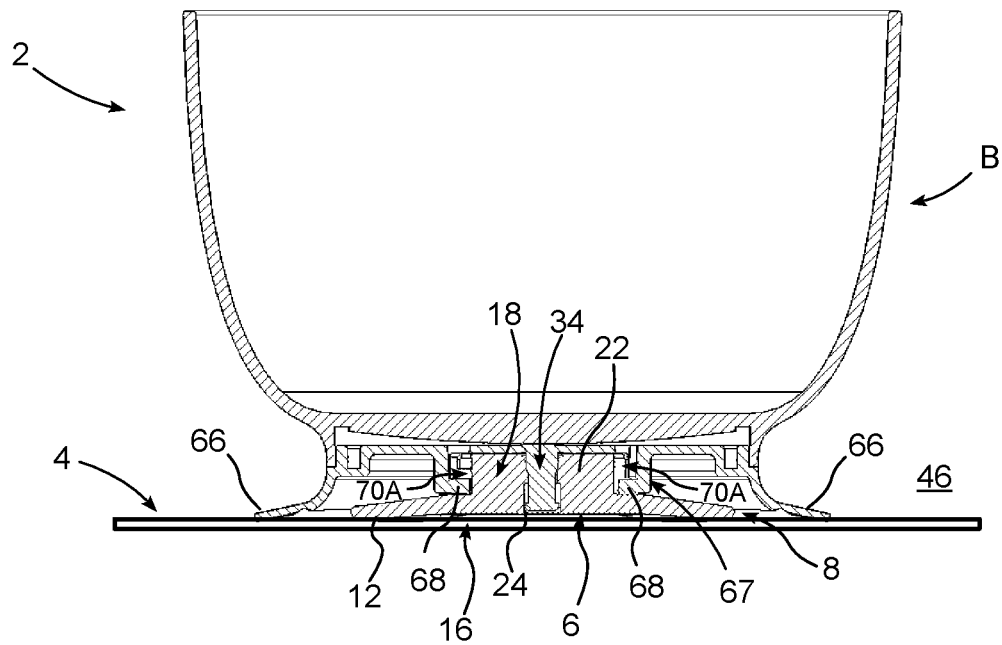
FIG. 21C is a cross-sectional view of the FIG. 1 suction apparatus, with an anchor member thereof contacting a reference surface, a movable member thereof in a closed sealing position in contact with the reference surface, and the movable member being rotated to a position that is characteristic of a locking state of the twist-to-lock coupling connection of FIGS. 18A-18B.

When it is desired to seal the suction apparatus 2 to the reference surface 4, the suction apparatus may be manipulated by the user so that the movable member 32 is urged toward the reference surface, such as by pushing down on the bowl "B" or by releasing the bowl and allowing the weight of the suction apparatus to do so. As shown in FIG. 21C, this will result in the plunger valve 32 assuming or maintaining the closed sealing position while flattening the base seal member 8 (as necessary according to the seal member's configuration) against the reference surface 4. As such seal member flattening takes place, the outboard stabilizers 66 of the movable member 32 will affirmatively engage the reference surface 4. The vent port 24 will be closed so as to establish and seal the controlled pressure zone 16, thereby rendering it airtight in order to maintain a negative pressure differential relative to the area of ambient pressure 46 outside the controlled pressure zone.

Figure 21D:
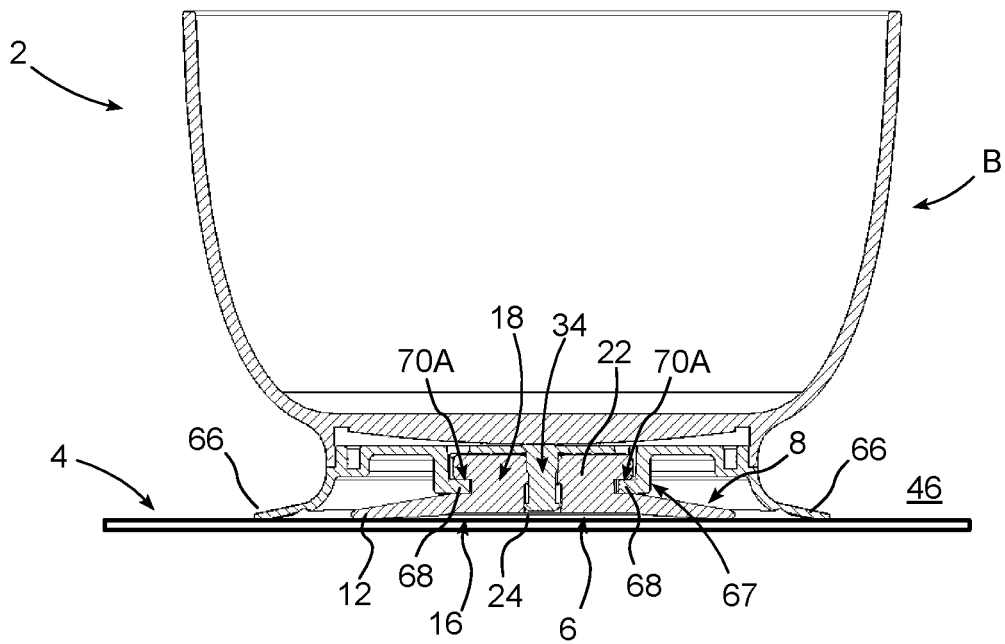
FIG. 21D is a cross-sectional view of the FIG. 1 suction apparatus, with an anchor member thereof contacting a reference surface, a movable member thereof in a closed sealing position in contact with the reference surface, and the movable member being rotated to a position that is characteristic of a locking state of the twist-to-lock coupling connection of FIGS. 18A-18B.

In FIG. 21D, the movable member 32, while in its closed sealing position, has been rotated from the unlocking state to the locking state of the twist-to-lock coupling connection 67. Each projection 68 of the movable member has traversed across its corresponding transverse slot leg 70B, from the base end 70B-1 to the terminal end 70B-2 thereof. During such traversal, the outboard stabilizers 66 remain affirmatively engaged with the reference surface 4.

When it is desired to detach the suction apparatus 2 from the reference surface 4, the movable member 32 may be rotated to manipulate the twist-to-lock coupling connection 67 from its locking state to its unlocking state. The plunger valve 32 may then be actuated from its closed sealing position to its open venting position by exerting an opening force on the movable member 32, such as by lifting the bowl "B." This will vent the controlled pressure zone 16 and release the negative pressure differential relative to the area of ambient pressure 46 outside the controlled pressure zone. As shown in FIG. 21A, the suction apparatus 2 may then be easily separated from the reference surface 4.

Figure 22A:
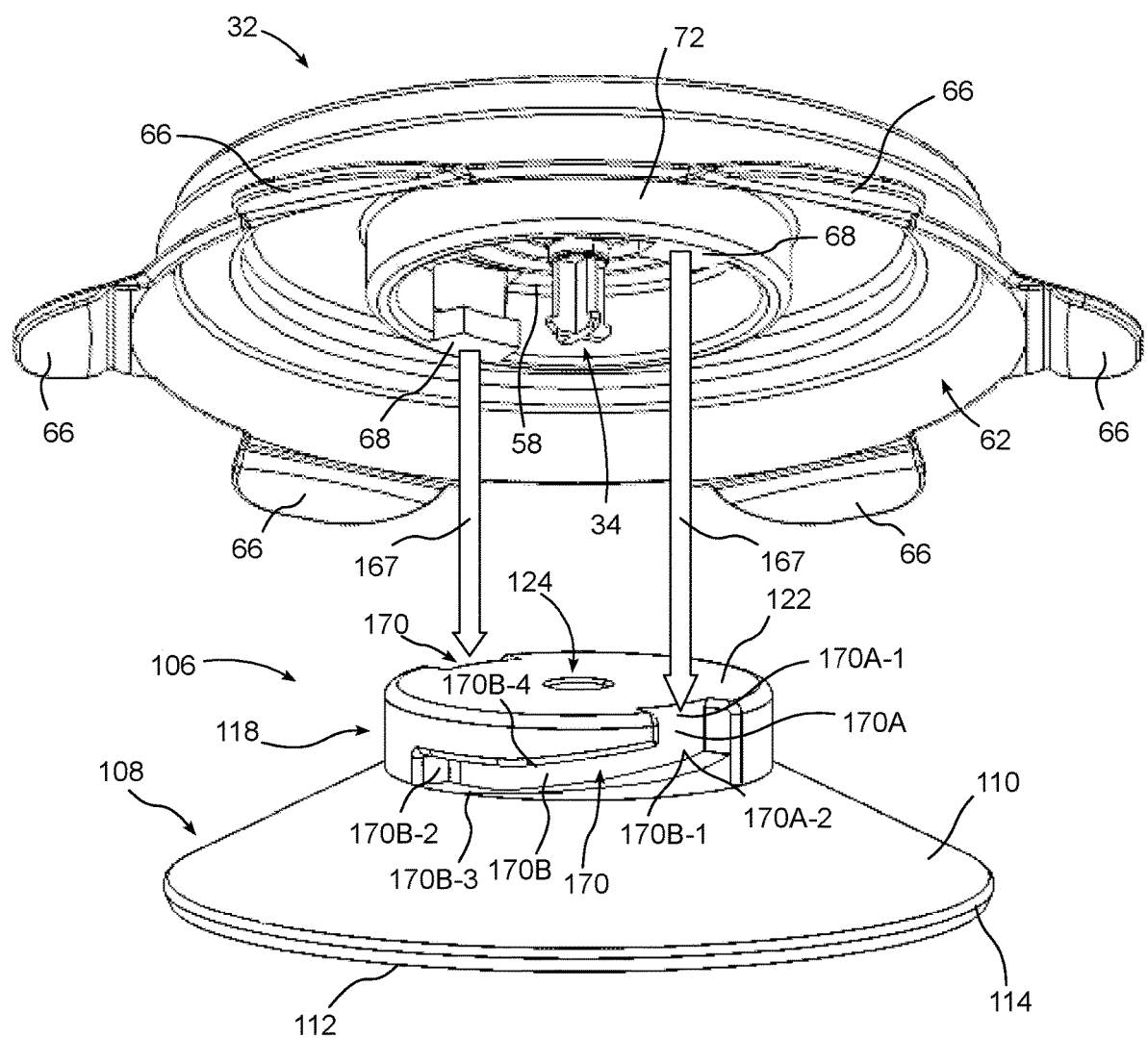
FIG. 22A is an exploded perspective view showing a movable member of the FIG. 1 suction apparatus and a modified anchor member that provides a lockable valve-actuated suction apparatus according to another embodiment, and illustrating example projections on the movable member that engage modified slot components on the anchor member to provide a twist-to-lock coupling connection of the suction apparatus, with the movable member being in a rotational position that is characteristic of an unlocking state of the twist-to-lock coupling connection.
Figure 22B:
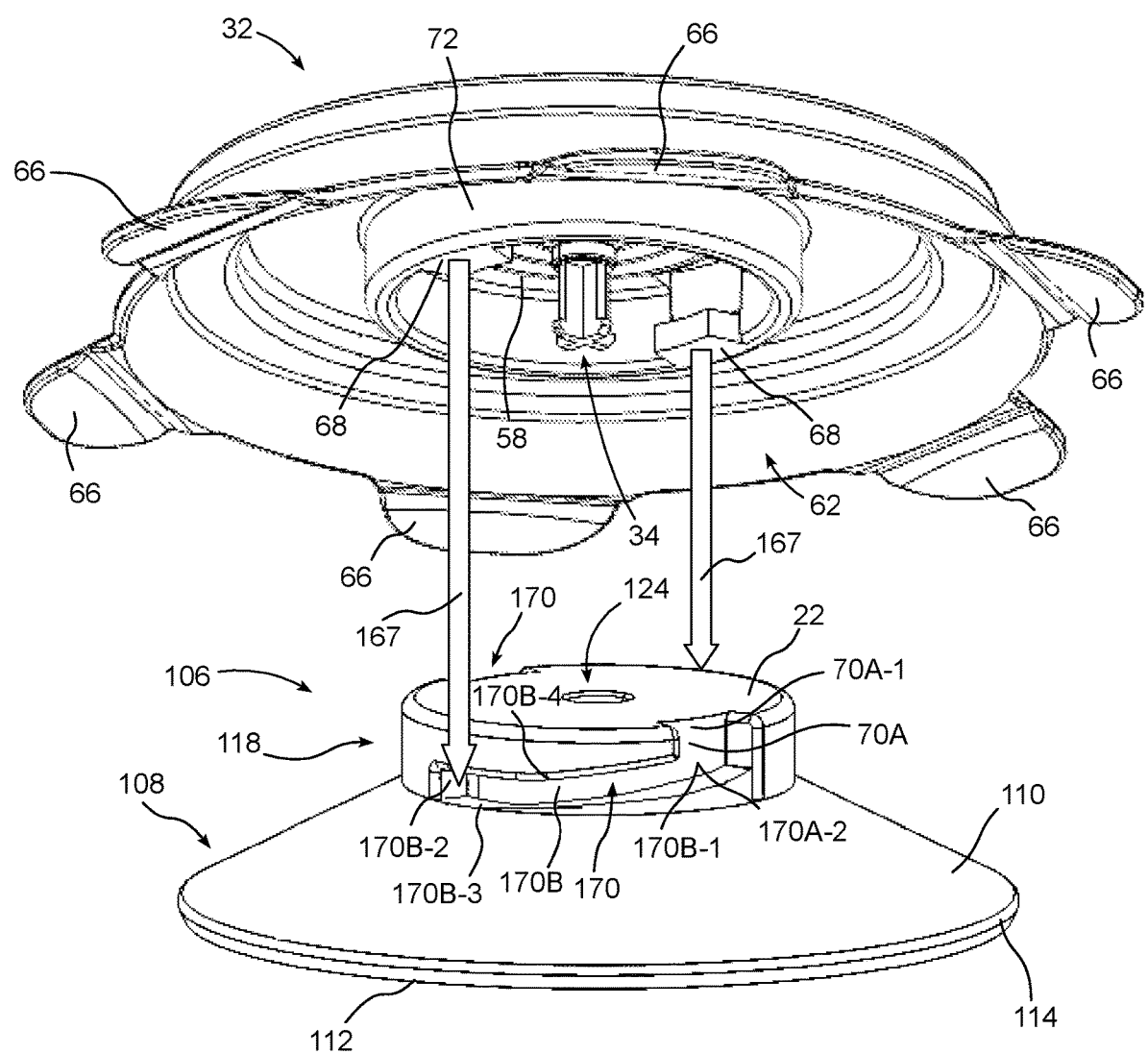
FIG. 22B is an exploded view showing a twist-to-lock coupling connection of FIG. 22A, with the movable member being in a rotational position that is characteristic of a locking state of the twist-to-lock coupling connection.
Figure 24A:
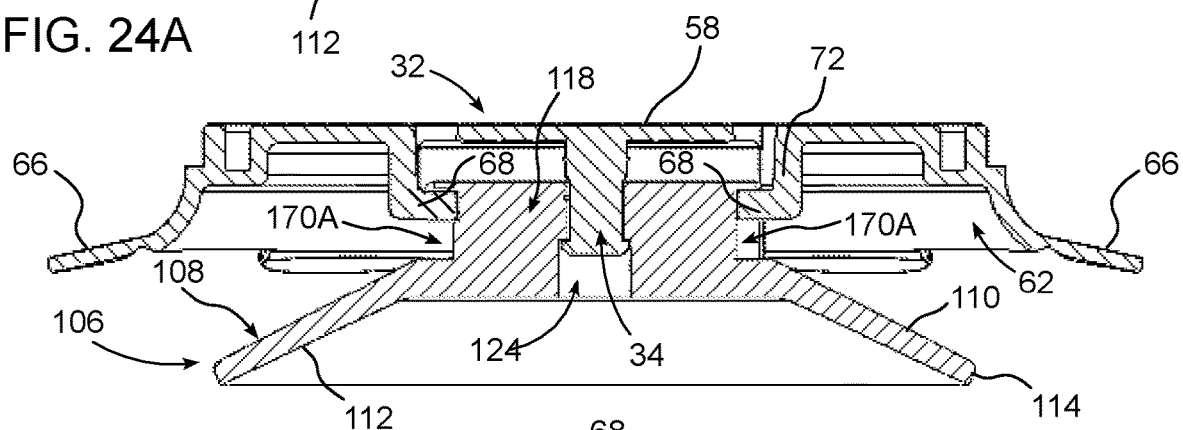
FIG. 24A is a cross-sectional centerline view showing the modified anchor member and the movable member of FIGS. 22A-22B, with slot portions of the anchor member engaging projection portions of a movable member when the movable member is in an open venting position and the twist-to-lock coupling connection of FIGS. 22A-22B is in an unlocking state.

Turning now to FIGS. 22A-22B, an alternative embodiment of the suction apparatus 2 is shown that utilizes a modified anchor member 106. The modified anchor member 106 is similar to the anchor member 6 described above, and corresponding features are identified by corresponding reference numbers incremented by "100." Where the modified anchor member 106 differs from the anchor member 6 is in the design of the slots 170 formed on the anchor member stem 118. In particular, a modified twist-to-lock coupling connection 167 is provided in which the transverse slot leg 170B is angled obliquely relative to the longitudinal slot leg 170A (instead of being orthogonal thereto as in the previous embodiment). The oblique angle may be somewhat greater than 90 degrees, and may be formed by downwardly slanting the lower face 170B-3 of the transverse slot leg 170B so that it is oriented parallel to the upper face 170B-4 of the transverse slot leg, which is also downwardly slanted. The term "downward" in this instance means downward moving from the closed base end 170B-1 to the closed terminal end 170B-2 of the transverse slot leg 170B. In the illustrated embodiment, the transverse slot leg 170B forms a downwardly slanting, partial thread that draws the movable member 32 toward the reference surface 4 as the protrusion 68 traverses the transverse slot leg 170B away from the longitudinal slot leg 170A (i.e., from the closed base end 170B-1 to the closed terminal end 170B-2 of the transverse slot leg 170).

A further characteristic of the modified twist-to-lock coupling connection 167 is that the length of the longitudinal slot leg 170A is shortened due to the closed base end 170A-2 thereof being disposed further away from the seal member 108 in order to provide the downward slant of the transverse slot leg 170B. This shortening can be seen by comparing the longitudinal slot leg 170A of FIGS. 22A-22B to the longitudinal slot leg 70A of FIGS. 18A-18B.

In combination, the foregoing characteristics of the twist-to-lock coupling connection 167 serve to draw the outboard stabilizers 66 of the movable member 32 into affirmative engaging contact with the reference surface 4 as the twist-to-lock coupling connection is actuated from it unlocking state to its locking state. This may increase the stability of the bowl "B" carried by the movable member 32 once the twist-to-lock coupling connection is locked and the suction apparatus is ready for use. With the outboard stabilizers 66 affirmatively engaged against the reference surface 4, there is no possibility that the bowl "B" will rock, and much less possibility that the movable member 32 will pivot enough to disrupt the seal between the plunger valve 34 and the anchor member 106.

FIGS. 23 and 24 illustrate the positions of the movable member 32 and its projections 68 relative to the modified anchor member 106 during various stages of operation of the twist-to-lock coupling connection 167. FIGS. 23A and 24A depict an arrangement of components when the movable member 132 in its open venting position and the twist-to-lock coupling connection 167 is in its unlocking state. Each protrusion 68 of the movable member 32 is situated in engagement with a longitudinal slot leg 170A of the modified anchor member 106, at the open terminal end 170A-1 thereof.

Figure 23A:
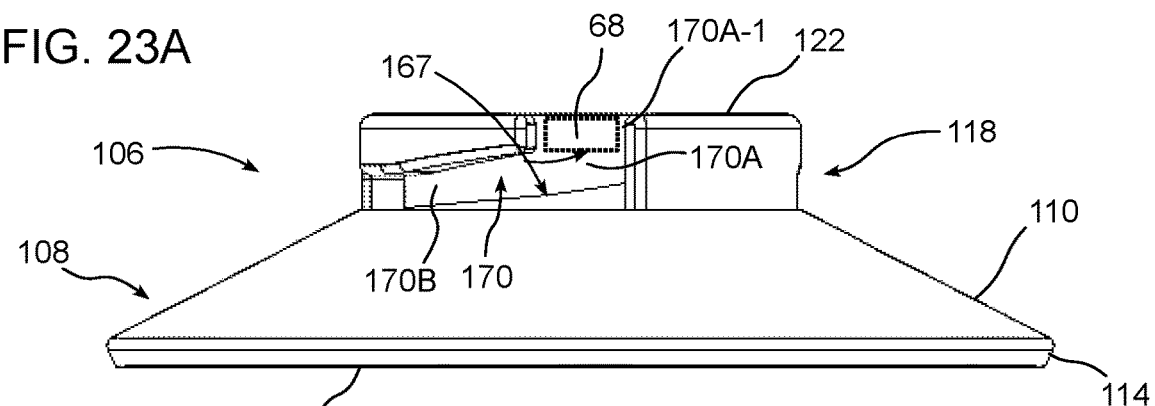
FIG. 23A is a side elevation view of the modified anchor member of FIGS. 22A-22B, with a slot portion of the anchor member engaging a projection portion of the movable member of FIGS. 22A-22B when the movable member is in an open venting position and the twist-to-lock coupling connection of FIGS. 22A-22B is in an unlocking state.
Figure 23B:
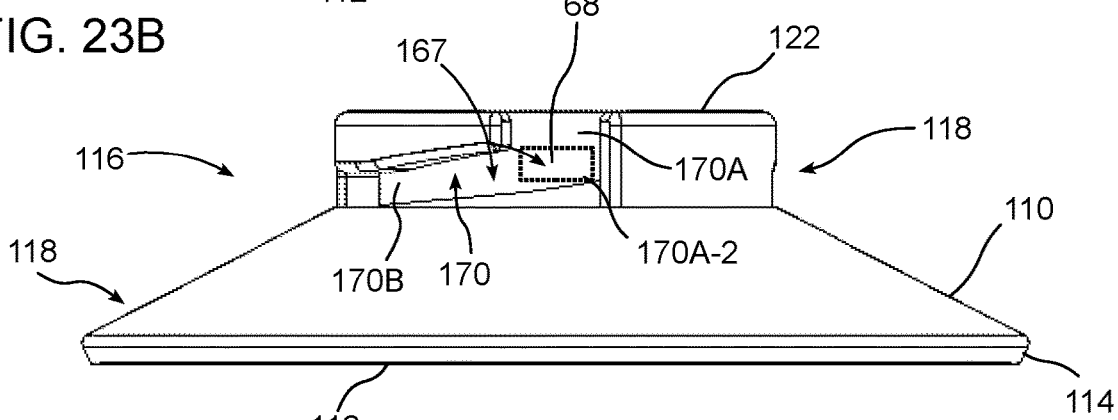
FIG. 23B is a side elevation view of the modified anchor member of FIGS. 22A-22B, with a slot portion of the anchor member engaging a projection portion of the movable member of FIGS. 22A-22B when the movable member is in a closed sealing position and the twist-to-lock coupling connection of FIGS. 22A-22B is in an unlocking state.
Figure 24B:
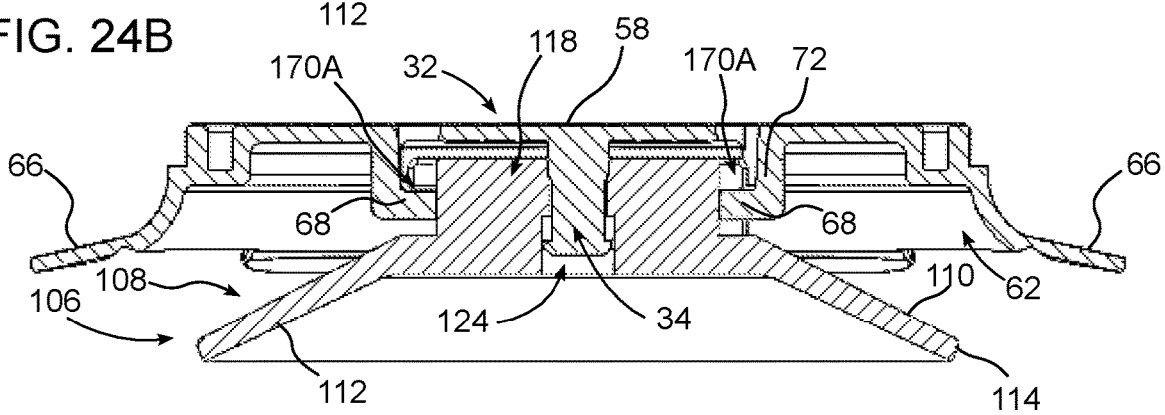
FIG. 24B is a cross-sectional centerline view showing the modified anchor member and the movable member of FIGS. 22A-22B, with slot portions of the anchor member engaging projection portions of a movable member when the movable member is in a closed sealing position and the twist-to-lock coupling connection of FIGS. 22A-22B is in an unlocking state.

FIGS. 23B and 24B depict an arrangement of components when the movable member 32 is in its closed sealing position and the twist-to-lock coupling connection 167 is in its unlocking state. Each protrusion 68 of the movable member 32 has traversed the longitudinal slot leg 170A from its open terminal end 170A-1 to its closed base end 170A-2 as the movable member slides without rotation relative to modified anchor member 106 from the movable member's venting position to its sealing position.

Figure 23C:
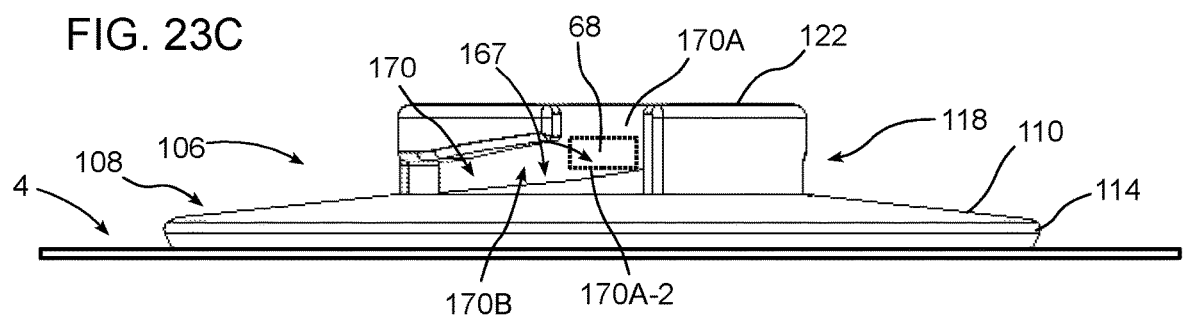
FIG. 23C is a side elevation view of the modified anchor member of FIGS. 22A-22B, with the anchor member flattened against a reference surface, and with a slot portion of the anchor member engaging a projection portion of the movable member of FIGS. 22A-22B when the movable member is in a closed sealing position and the twist-to-lock coupling connection of FIGS. 22A-22B is in an unlocking state.
Figure 24C:
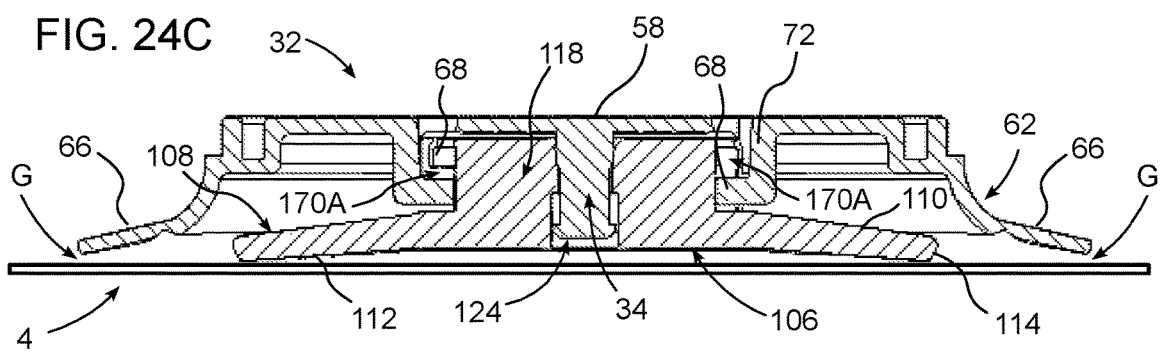
FIG. 24C is a cross-sectional centerline view showing the modified anchor member and the movable member of FIGS. 22A-22B, with the anchor member flattened against a reference surface, and with slot portions of the anchor member engaging projection portions of a movable member when the movable member is in a closed sealing position and the twist-to-lock coupling connection of FIGS. 22A-22B is in an unlocking state.

FIGS. 23C and 24C depict an arrangement of components when the twist-to-lock coupling connection 167 in the unlocking state of FIGS. 23B and 24B, but the modified anchor member 106 has been collapsed to a flattened state on the reference surface 4. As previously mentioned, the longitudinal slot leg 170A is shorter than the longitudinal slot leg 70A of the coupling connection 67 of the previous embodiment. As a result, the projections 68 of the movable member 32 come to rest further away from the reference surface 4. As can be seen in FIG. 24C, this may result in the outboard stabilizers 66 being spaced from the reference surface 4 by a separation gap "G" when the seal member 108 is in its collapsed state.

Figure 23D:
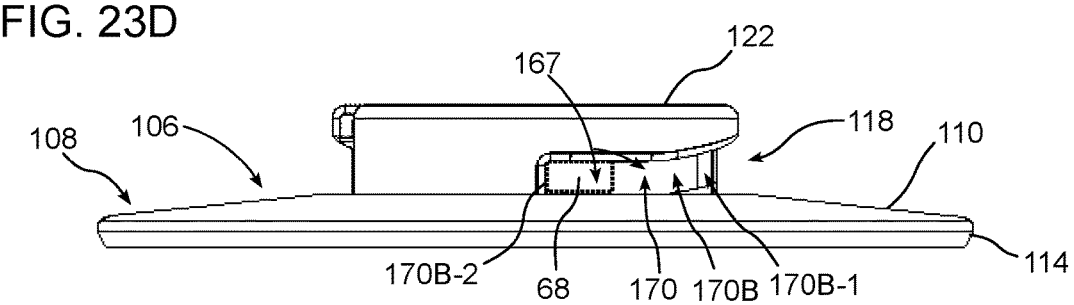
FIG. 23D is a side elevation view of the modified anchor member of FIGS. 22A-22B, with the anchor member flattened against a reference surface, and with a slot portion of the anchor member engaging a projection portion of the movable member of FIGS. 22A-22B when the movable member is in a closed sealing position and the twist-to-lock coupling connection of FIGS. 22A-22B is in a locking state.
Figure 24D:
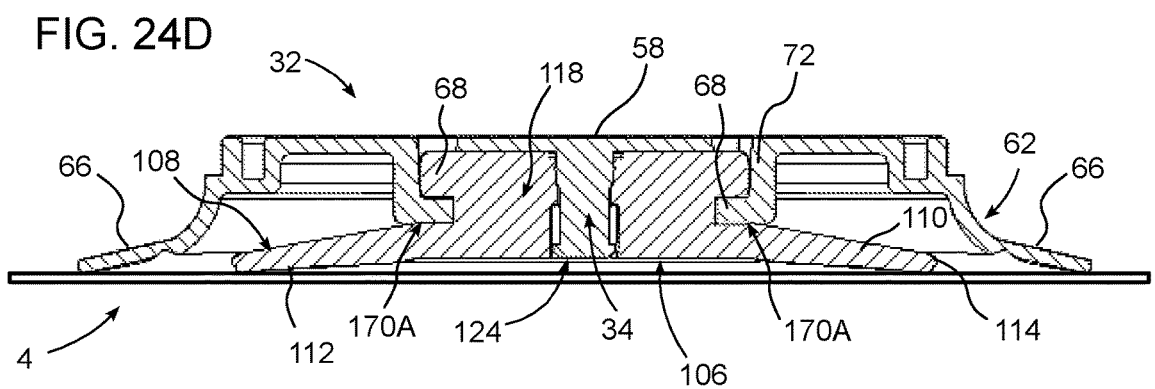
FIG. 24D is a cross-sectional centerline view showing the modified anchor member and the movable member of FIGS. 22A-22B, with the anchor member flattened against a reference surface, and with slot portions of the anchor member engaging projection portions of a movable member when the movable member is in a closed sealing position and the twist-to-lock coupling connection of FIGS. 22A-22B is in a locking state.

FIGS. 23D and 24D depict an arrangement of components when the movable member 32 is in its closed sealing position and the twist-to-lock coupling connection 167 is in its locking state. Each protrusion 68 of the movable member 32 has traversed the transverse slot leg 170B from its closed base end end 170B-1 to its closed terminal end 170B-2 as the movable member rotates without sliding relative to anchor member 6, thereby maneuvering the twist-to-lock coupling connection 67 from its unlocking state to its locking state. It will also be seen that the projections 68 are now closer to the seal member 108, and the movable member 32 has been drawn toward the reference surface 4. As can be seen in FIG. 24D, this may result in the outboard stabilizers 66 being drawn into affirmative engaging contact with the reference surface 4 when the protrusion 68 reaches (or nears) the closed base end 170B-2 of the transverse slot leg 170B.

Figure 25A:
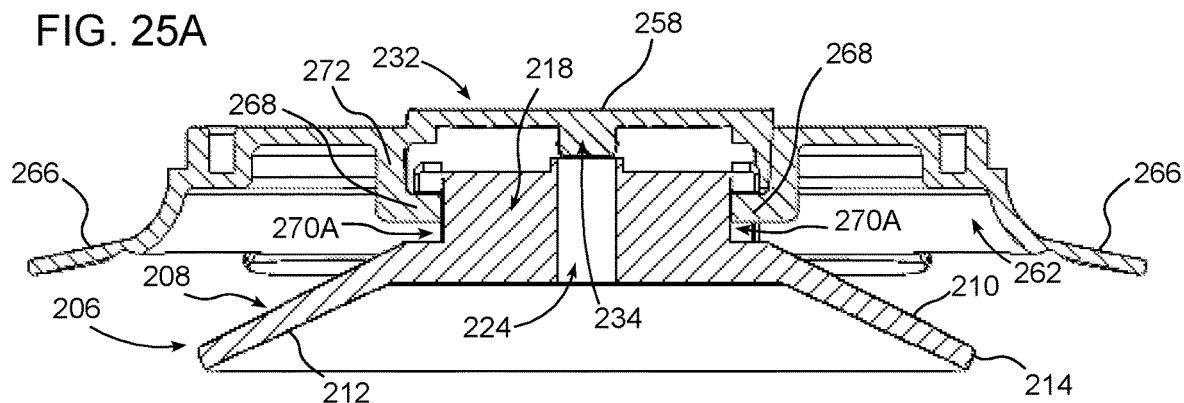
FIG. 25A is a cross-sectional centerline view showing a modified anchor member and a modified movable member providing a lockable valve-actuated suction apparatus according to another example embodiment, with slot portions of the anchor member engaging projection portions of the movable member when the movable member is in an open venting position and a twist-to-lock coupling connection of the suction apparatus is in an unlocking state.
Figure 26A:
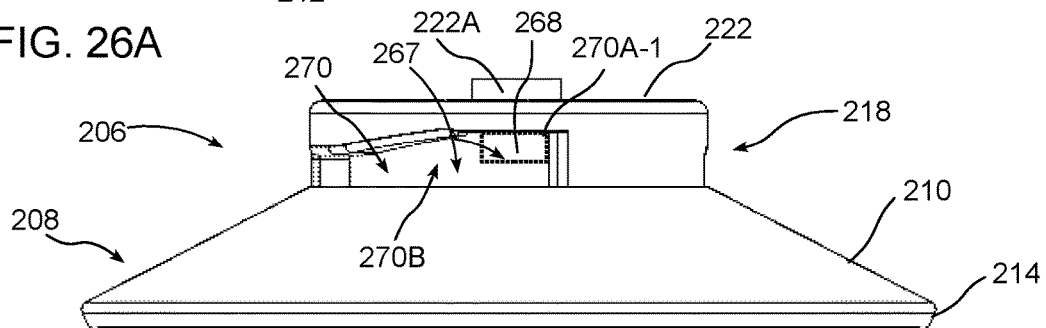
FIG. 26A is an enlarged side elevation view of the modified anchor member of FIG. 25A, with a slot portion of the anchor member engaging a projection portion of the modified movable member when the movable member is in an open venting position and a twist-to-lock coupling connection of the suction apparatus is in an unlocking state.
Figure 25B:
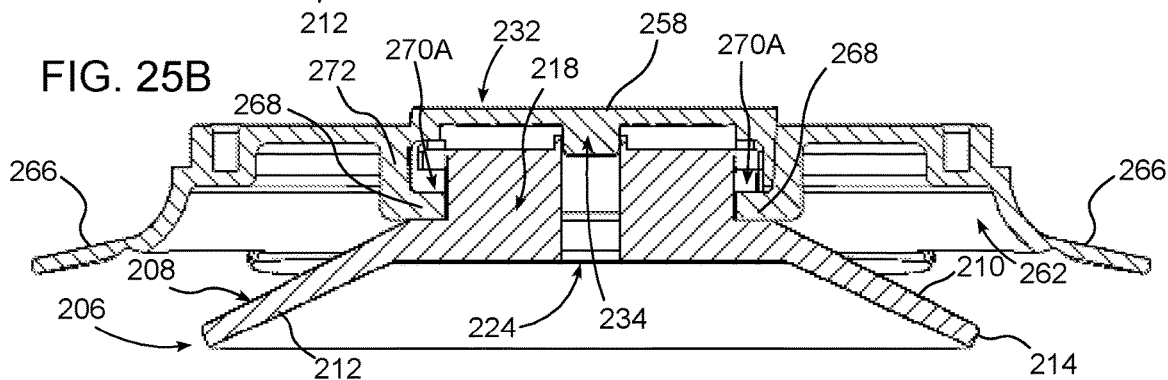
FIG. 25B is a cross-sectional centerline view showing the modified anchor member and the modified movable member of FIGS. 25A, with slot portions of the anchor member engaging projection portions of a movable member when the movable member is in a closed sealing position and a twist-to-lock coupling connection of the suction apparatus is in an unlocking state.
Figure 26B:
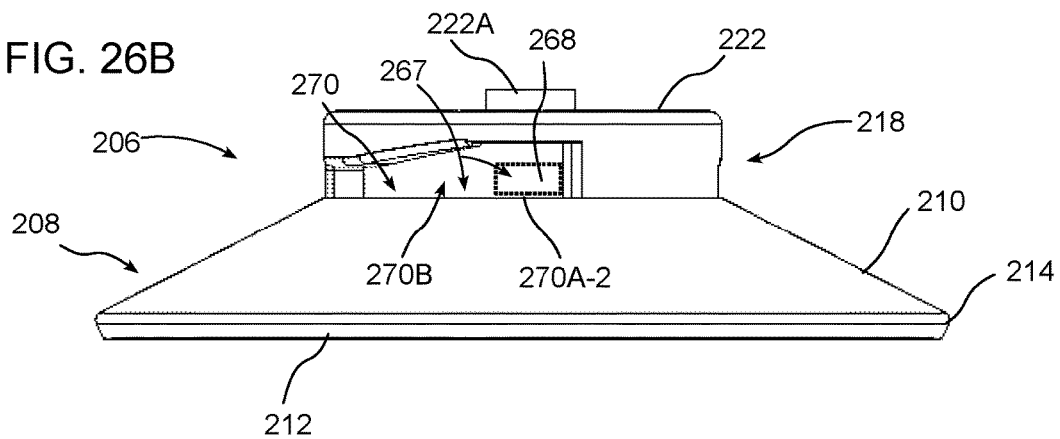
FIG. 26B is an enlarged side elevation view of the modified anchor member of FIG. 25A, with a slot portion of the anchor member engaging a projection portion of the modified movable member when the movable member is in a closed sealing position and the twist-to-lock coupling connection of the suction apparatus is in an unlocking state.
Figure 25C:
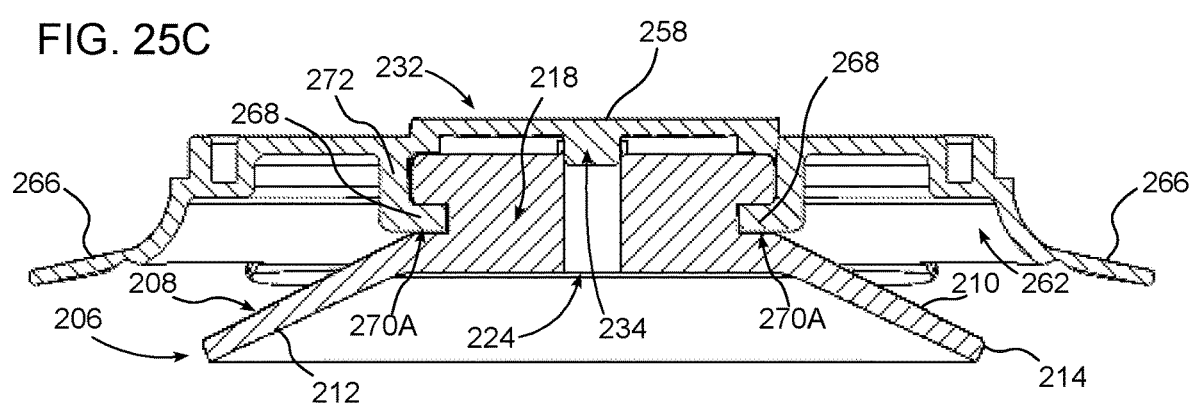
FIG. 25C is a cross-sectional centerline view showing the modified anchor member and the modified movable member of FIGS. 25A, with slot portions of the anchor member engaging projection portions of a movable member when the movable member is in a closed sealing position and a twist-to-lock coupling connection of the suction apparatus is in a locking state.
Figure 26C:
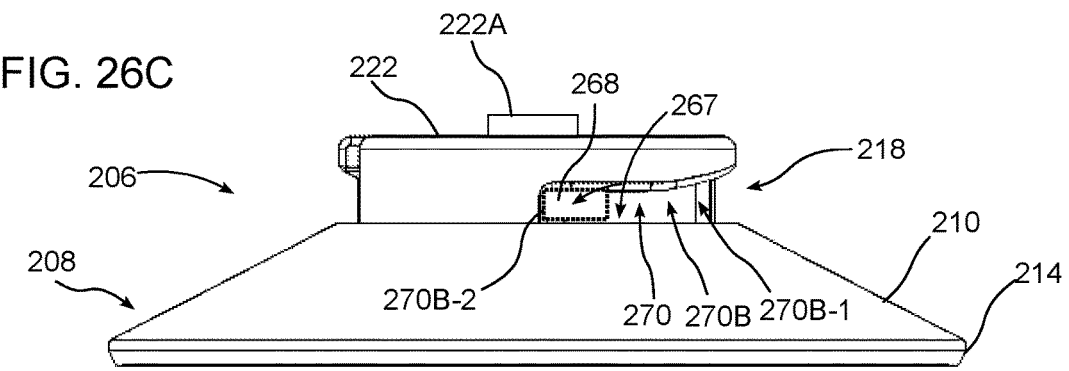
FIG. 26C is an enlarged side elevation view of the modified anchor member of FIG. 25A, with a slot portion of the anchor member engaging a projection portion of the modified movable member when the movable member is in a closed sealing position and the twist-to-lock coupling connection of the suction apparatus is in a locking state.

Turning now to FIGS. 25-26, another alternative embodiment of the suction apparatus 2 is shown that utilizes a modified anchor member 206 and a modified movable member 232. The modified anchor member 206 and the modified movable member 232 are similar, respectively, to the anchor member 6 and the movable member 32 described above. Corresponding features are identified by corresponding reference numbers incremented by "200."

Where the modified anchor member 206 differs from the anchor member 6 is in the design of the anchor member stem 218. In particular, the free end 222 of the stem 218 is formed with a free end tubule 222A that forms an extension of the vent port 224. The free end tubule 222A of the modified anchor member 206 may be formed as a thin-walled tube made of the same non-porous resilient material as the remainder of the modified anchor member 206. The inside diameter of the free end tubule 222A may be coextensive with the inside diameter of the vent port 224, which may itself be of constant size throughout the entire length of the vent port. The inside wall of the free end tubule 222A thus forms a longitudinal extension of the inside wall of the vent port. The outside diameter of the free end tubule 222A may be selected so that the tubule wall is thick enough to withstand normal usage without tearing, while at the same time being sufficiently flexible to receive (and be expanded by) the plunger valve 234.

As noted, the vent port 224 is a straight bore of constant diameter, with no vent port internal shoulder. In the previously-described anchor member 6, the vent port 24 was formed with a first vent port section 26 and a second vent port section 28 of different size, and an intermediate internal shoulder that served as a longitudinal stop to engage the plunger valve 34 of the movable member 32 in order to prevent separation of the movable member from the anchor member. In the modified anchor member 206, removal of the modified movable member 232 is prevented in a different manner, namely, by forming the longitudinal leg 270A of the each slot 270 with a closed terminal end 270A-1 that captures the corresponding projections 268 on the modified movable member. This slot configuration change can be seen in FIGS. 26A and 26B, and results in a slightly-modified twist-to-lock coupling connection 267.

Where the modified movable member 232 differs from the previously-described movable member 32 is in the design of the plunger valve 234. In particular, the plunger valve 234 is shorter than the plunger valve 34 of the movable member 32 because it only needs to plug the free end tubule 222A. Unlike the plunger valve 34, the plunger valve 234 does not need to enter the remainder of the vent port 224 that lies below the free end tubule 222A. Nor does the plunger valve 234 require the two-section construction of the plunger valve 34 of the movable member 32 that includes a first plunger valve section 36 and a second plunger valve section 38, with a transverse plunger valve stabilizer 40 being provided on the first plunger valve section to retain the plunger valve in the vent port 24.

As noted above, the modified movable member 232 is retained on the modified anchor member 206 by way of the projections 268 engaging the closed terminal end 270A-1 of the longitudinal slot leg 270A. Thus, the plunger valve 234 may be constructed as a relatively short, constant diameter plug that is sized to plug only the free end tubule 222A. As noted above, the plunger valve 234 may be sized to expand the free end tubule 222A, such that an interference fit is created. Due to the thin-walled flexibility of free end tubule 222A, the amount of interference may be more than the interference between the vent port stopper 52 of the plunger valve 34 and the vent port 24, as previously described in connection with FIGS. 14-15. This enhanced interference may result in a correspondingly enhanced degree of sealing. At the same time, withdrawal of the plunger valve 234 from the free end tubule 222A will not be unduly hindered due to the tubule's thin-walled configuration.

FIGS. 25A and 26A depict an arrangement of components when the modified movable member 232 in its open venting position and the twist-to-lock coupling connection 267 is in its unlocking state. The plunger valve 234 of the modified movable member 232 is poised above the entrance to the free end tubule 222A of the modified anchor member 206, such that the vent port 224 is open and vented. Each protrusion 268 of the modified movable member 232 is situated in engagement with a longitudinal slot leg 270A of the modified anchor member 206, at the closed terminal end 270A-1 thereof.

FIGS. 25B and 25B depict an arrangement of components when the modified movable member 232 is in its closed sealing position and the twist-to-lock coupling connection 267 is in its unlocking state. The plunger valve 234 of the modified movable member 232 now plugs the free end tubule 222A of the modified anchor member 206, such that the vent port 224 is closed and sealed. Each protrusion 268 of the modified movable member 232 has traversed the longitudinal slot leg 270A from its closed terminal end 270A-1 to its closed base end 270A-2 as the movable member slides without (required) rotation relative to modified anchor member 206 from the movable member's venting position to its sealing position.

FIGS. 25C and 25C depict an arrangement of components when the modified movable member 232 is in its closed sealing position and the twist-to-lock coupling connection 267 is in its locking state. Each protrusion 268 of the modified movable member 232 has traversed the transverse slot leg 270B from its closed base end end 270B-1 to its closed terminal end 270B-2 as the modified movable member rotates without sliding relative to modified anchor member 206, thereby maneuvering the twist-to-lock coupling connection 267 from its unlocking state to its locking state.

Figure 27:
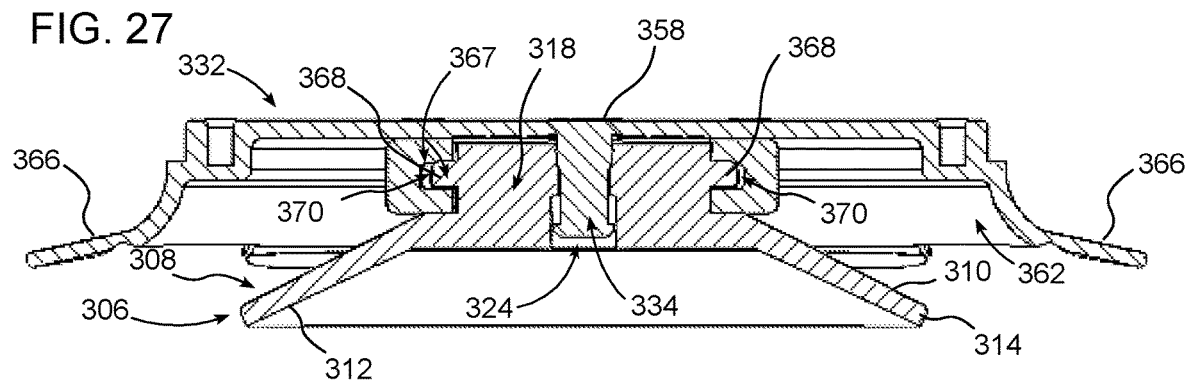
FIG. 27 is a cross-sectional centerline view showing a modified anchor member and a modified movable member providing a lockable suction apparatus according to another example embodiment, with projection portions of the anchor member engaging slot portions of the movable member when the movable member is in a closed sealing position and a twist-to-lock coupling connection of the suction apparatus is in a locking state.

Turning now to FIG. 27, another embodiment of the suction apparatus 2 is shown that utilizes a modified anchor member 306 and a modified movable member 332. The modified anchor member 306 and the modified movable member 332 are similar to the anchor member 6 and the movable member 32 described above, respectively. Corresponding features are identified by corresponding reference numbers incremented by "300."

Where the modified anchor member 306 and the modified movable member 332 differ from their counterpart components 6 and 32 is in the design of the twist-to-lock coupling connection 367. In particular, instead of the projections 368 being on the modified movable member, they are on the stem 318 of the modified anchor member 306. Likewise, instead of the slots 370 being on the stem 318 of the modified anchor member 306, they are on the inside of the central annular cup 372 of the modified movable member 332. Although not shown, the projections 368 may have the same configuration as the previously-described projections 68, except that they extend radially outwardly rather than radially inwardly. Similarly, the slots 370 may have the same configuration as the previously-described slots 70, each including a longitudinal slot leg 70A and a transverse slot leg 70B, except that the open radially inwardly rather than radially outwardly. Moreover, the slots 370 will be inverted, such that transverse slot legs are at the top of the longitudinal slot legs in order to engage the projections 368 for locking and unlocking when the movable member is lowered to its closed sealing position.

Figure 28:
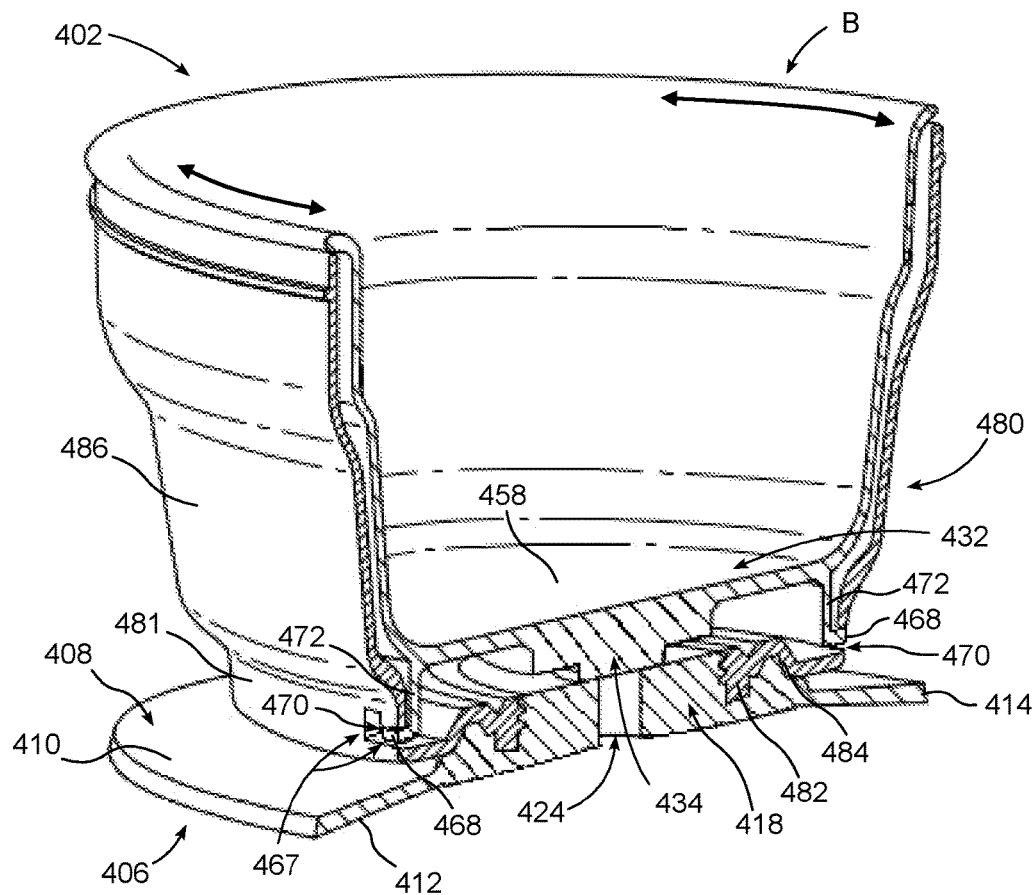
FIG. 28 is a cross-sectional centerline perspective view showing a lockable suction apparatus according to another example embodiment that includes an anchor member, a movable member, an intermediate member disposed between the anchor member and the movable member, and a twist-to-lock connection between the movable member and the intermediate member.

Turning now to FIG. 28, a lockable valve-actuated suction apparatus 402 according to a further embodiment is shown. The suction apparatus 402 is similar to the suction apparatus 2 described in connection with previous embodiments. Corresponding features are identified by corresponding reference numbers incremented by "400." Where the suction apparatus 402 differs from the suction apparatus 2 is in the design of the twist-to-lock coupling connection 467, and in the design of the plunger valve 434.

Whereas the twist-to-lock coupling connection 67 of the suction apparatus 2 is provided directly between the movable member 32 and the anchor member 6, the twist-to-lock coupling connection 467 of the suction apparatus 402 is provided indirectly between the movable member 432 and the anchor member 406 via an intermediate member 480. In particular, a pair of projections 468 extend radially outwardly from a central annular cup 472 located on the bottom of the movable member 432 to engage a pair of L-shaped slots 470 formed in a lower side section 481 of the intermediate member 480. The slots 470 may extend entirely through the lower side section 481 (as illustrated in FIG. 28) or they may only extend partially though the lower side section (e.g., so as to be formed as inside wall channels). One advantage of extending the slots 470 entirely through the lower side section 481 is that the projections 468 will be visible on the outside of the suction apparatus 402, thereby a visual indication of the locking/unlocking state of the twist-to-lock coupling connection 467. If desired, the projections 468 and/or the slots 470 may be appropriately color-coded (e.g. red for the locking position, green for the unlocking position) or otherwise visually enhanced to assist the user verify the locking/unlocking state.

The intermediate member 480 may be formed from any suitable rigid material, such as injection-molded hard plastic or rubber material, and can be fixedly mounted to the anchor member 406 in any suitable manner. In the illustrated embodiment, the intermediate member 480 is formed with a central hub 482 that is attached to the anchor member stem 418, such as by way of adhesively bonded threads, mechanical fasteners, or other means. A bottom section 484 of the intermediate member 480 extends radially outwardly from the hub 482, across the top side of a central inner portion of the seal member 408, to the lower side section 481 of the intermediate member.

An upper side section 486 of the intermediate member 480 may be provided that extends upwardly from the lower side section 481 and envelops some or all of the movable member 432. In the illustrated embodiment, the upper side section 486 of the intermediate member 480 extends upwardly to the top of a bowel "B," which itself may be integrally formed on the movable member 432 instead of being attached thereto as in previous embodiments. In other embodiments, the upper side section 486 of the intermediate member 480 could terminate closer to the lower side section 481, or could be dispensed with entirely.

Figure 29A:
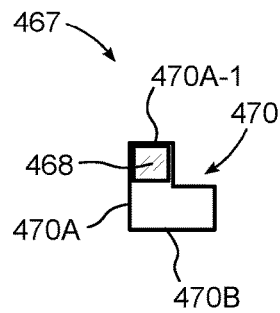
FIG. 29A is a diagrammatic illustration of a twist-to-lock coupling connection of the FIG. 28 suction apparatus that includes an L-shaped slot and a projection that moves up and down in a longitudinal leg of the slot and laterally in a transverse leg of the slot, with the projection being depicted at an upper terminal end of the longitudinal slot leg.
Figure 29B:
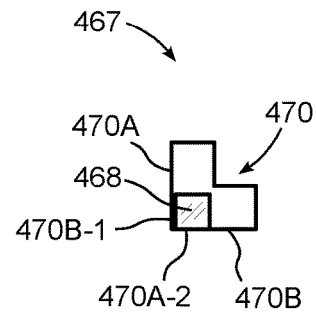
FIG. 29B is a diagrammatic illustration of the twist-to-lock coupling connection of FIG. 29A, with the projection being depicted at a lower base end of the longitudinal slot leg and a closed base end of the transverse slot leg.
Figure 29C:
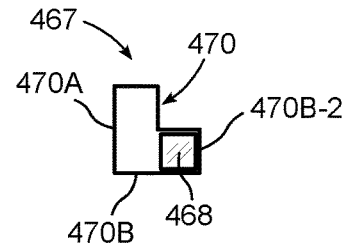
FIG. 29C is a diagrammatic illustration of the twist-to-lock coupling connection of FIG. 29A, with the projection being depicted at a closed terminal end of the transverse slot leg.
Figure 31A:
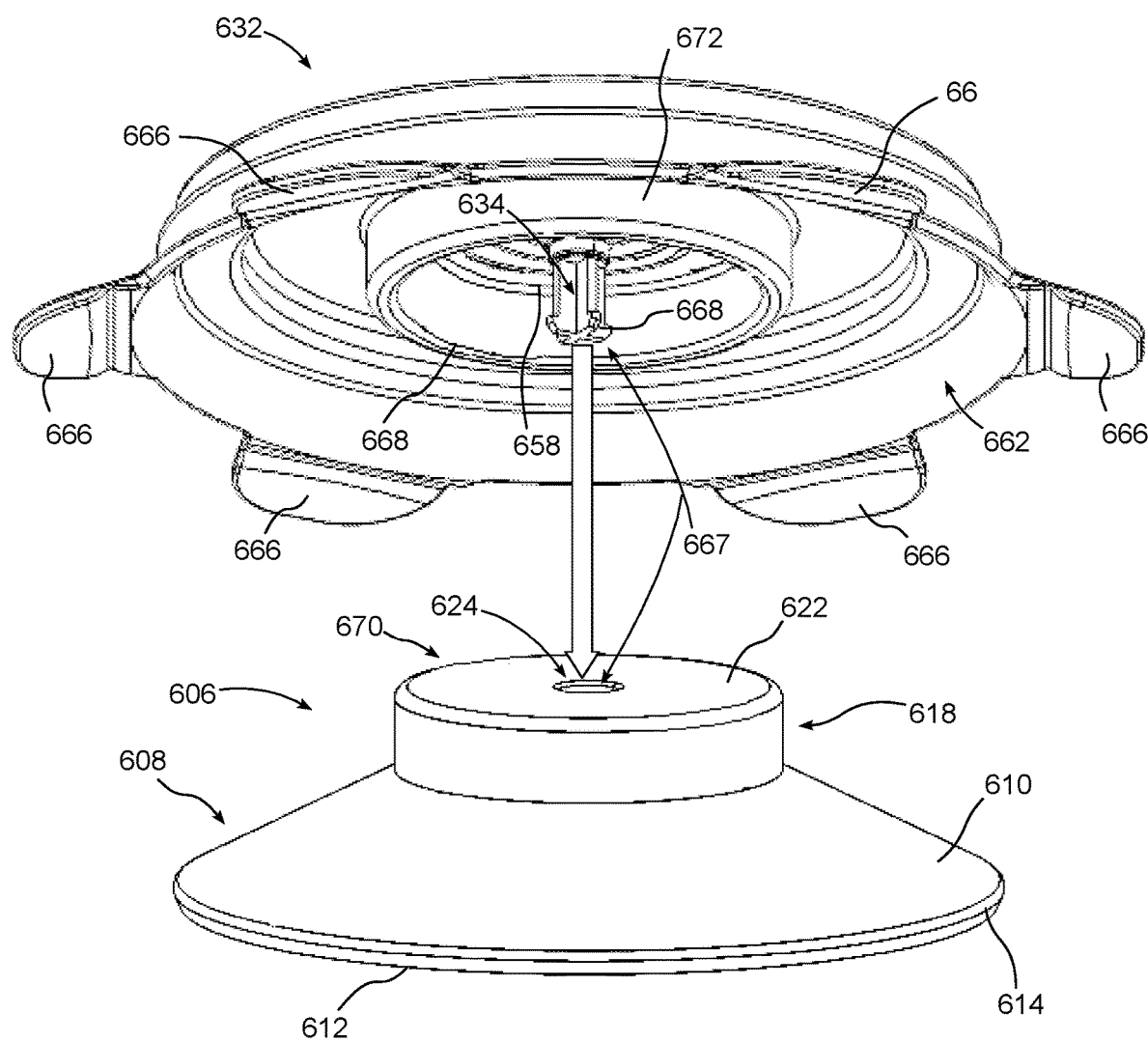
FIG. 31A is an exploded perspective view showing a modified movable member and a modified anchor member that provides a lockable valve-actuated suction apparatus according to another embodiment, and illustrating example projections on a plunger valve of the movable member that engage slot components within a vent port of the anchor member to provide a twist-to-lock coupling connection of the suction apparatus, with the movable member being in a rotational position that is characteristic of an unlocking state of the twist-to-lock coupling connection.
Figure 31B:
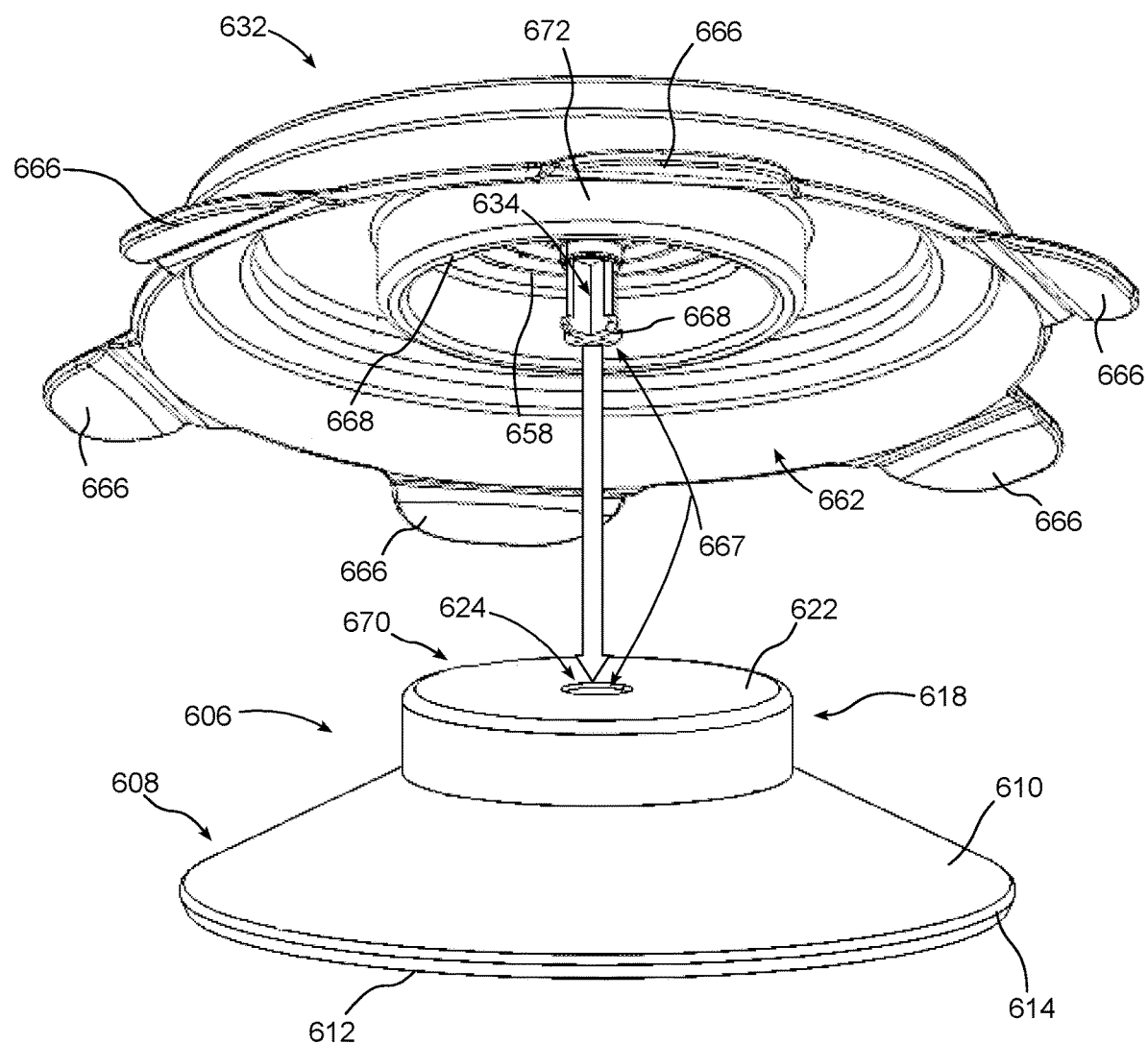
FIG. 31B is an exploded view showing a twist-to-lock coupling connection of FIG. 31A, with the movable member being in a rotational position that is characteristic of a locking state of the twist-to-lock coupling connection.

With additional reference now to FIGS. 29A-29C, the operation of the twist-to-lock coupling connection 467 is the same as the operation of the twist-to-lock coupling connection 67 of the suction apparatus 2. Starting from the open venting position of the movable member 432, in which each projection 468 is situated at the upper terminal end 470A-1 of a longitudinal slot leg 470A (FIG. 29A), the movable member is urged downwardly to its closed sealing position in which the projections traverse the longitudinal slot legs 470A to a closed base end 470A-2 thereof (FIG. 29B). During this operation, the twist-to-lock coupling connection 467 is in its unlocking state. Locking and unlocking of the twist-to-lock coupling connection 467 is effected by rotating the movable member 432 in the direction of the arrows shown near the top of FIG. 28.

When it is desired to lock the suction apparatus 402 to a reference surface, the movable member 432 is rotated (counterclockwise in FIG. 28) while in its closed sealing position so that each projection 468 traverses a transverse slot leg 470B from a closed base end 470B-1 thereof (FIG. 29B) to a closed terminal end 470B-2 thereof (FIG. 29C), thereby transitioning the twist-to-lock coupling connection 467 from it unlocking state to its locking state. A reverse operation is used to unlock and unseal the suction apparatus 402. In the illustrated embodiment, the upper terminal end of each longitudinal slot leg 470A is closed to provide a mechanical coupling that prevents the movable member 432 from separating from the intermediate member 480 when the movable member is lifted.

As noted above, a further difference between the suction apparatus 402 of FIG. 28 and the suction apparatus 2 of previous embodiments is in the design of the plunger valve 434. In particular, whereas the plunger valve 34 of the suction apparatus 2 inserts into the vent port 24 in the closed sealing position of the movable member 6, the plunger valve 434 of the suction apparatus 402 does not enter the vent port 424. Instead, the plunger valve 434 closes the top of the vent port 424 by covering it to form a blanket seal. Notwithstanding this blanket seal design of the plunger valve 434, it will be appreciated that the plunger valve could be configured to insert into the vent port 424 if so desired.

Figure 30:
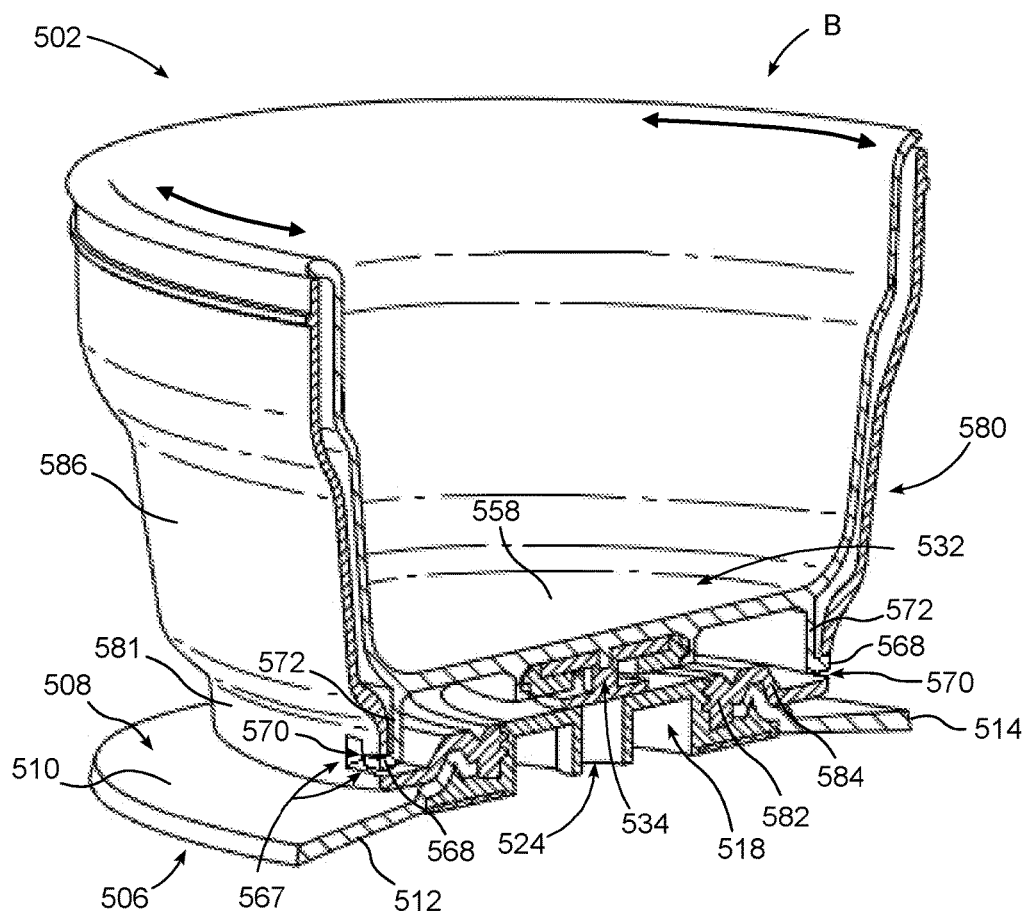
FIG. 30 is a cross-sectional centerline perspective view showing a lockable suction apparatus according to another example embodiment that includes an anchor member, a movable member, an intermediate member disposed between the anchor member and the movable member, and a twist-to-lock connection between the movable member and the intermediate member.

Turning now to FIG. 30, a lockable valve-actuated suction apparatus 502 is shown according to a further embodiment that represents a variation of the suction apparatus 402 of FIG. 28. The suction apparatus 502 is identical in all respects to the suction apparatus 402 (as shown by the use of corresponding reference number incremented by "100"), with the exception of certain modifications made to the anchor member 502 and the movable member 532. In the suction apparatus 502, the anchor member 502 is implemented as a composite structure in which the seal member 508 and the anchor member stem 518 are separate components. The seal member 508 is formed from a non-porous resilient material, such as injection-molded silicone rubber having a suitable hardness and density. The anchor member stem 518 is formed from a suitable rigid material, such as injection-molded hard plastic or rubber material. The anchor member stem 518, which may incorporate the vent port 524, is constructed to function as a seal retainer that attaches the seal member 508 to the intermediate member 580, such as by sandwiching a central interior portion of the seal member against the underside of the intermediate member's bottom section 584. The anchor member stem/seal retainer 518 may be attached to the intermediate member 580 in any suitable manner, such as by way of adhesively bonded threads, mechanical fasteners, or other means.

In the suction apparatus 502, the movable member 532 may also be a composite structure in which the plunger valve 534 and the remainder of the movable member are separate components. The plunger valve 534 may be formed from a non-porous resilient material, such as injection-molded silicone rubber having a suitable hardness and density, that is mounted to the underside of the movable member's main body 558. The main body 558, together with the remainder of the movable member 532, may be formed from a suitable rigid material, such as injection-molded hard plastic or rubber material. The resilient plunger valve 534 may be configured as a blanket seal that covers and seals the top of the vent port 524 when the movable member 532 is in its closed sealing position. Alternatively, the resilient plunger valve 534 could be designed to insert into the vent port 524 in order to seal it.

In the suction apparatus 502, the construction and operation of the twist-to-lock coupling connection 567 is the same as the operation of the twist-to-lock coupling connection 467 of the suction apparatus 402. As such, reference can be made to the discussion of FIGS. 28 and 29A-29C for further details.

Turning now to FIGS. 31A-31B, 32 and 33, an alternative embodiment of the suction apparatus 2 is shown that utilizes a modified anchor member 606 and a modified movable member 632. The modified anchor member 606 and the modified movable member 632 are similar to their counterparts in the suction apparatus 2 described above (i.e., the anchor member 6 and the movable member 32), and corresponding features are identified by corresponding reference numbers incremented by "600." Where these components differ is in the design of the twist-to-lock coupling connection 667. In particular, the twist-to-lock coupling connection 667 is provided by a set of projections 668 formed on the plunger valve 634 of the movable member 632, and by a set of slots 670 (FIGS. 32-33) formed within the vent port 624 (on the sidewall thereof) that extends through the stem 618 of the anchor member stem 606. Alternatively, although not shown, projections could be formed within the vent port 624 and slots could be formed on the plunger valve 634.

Figure 32:
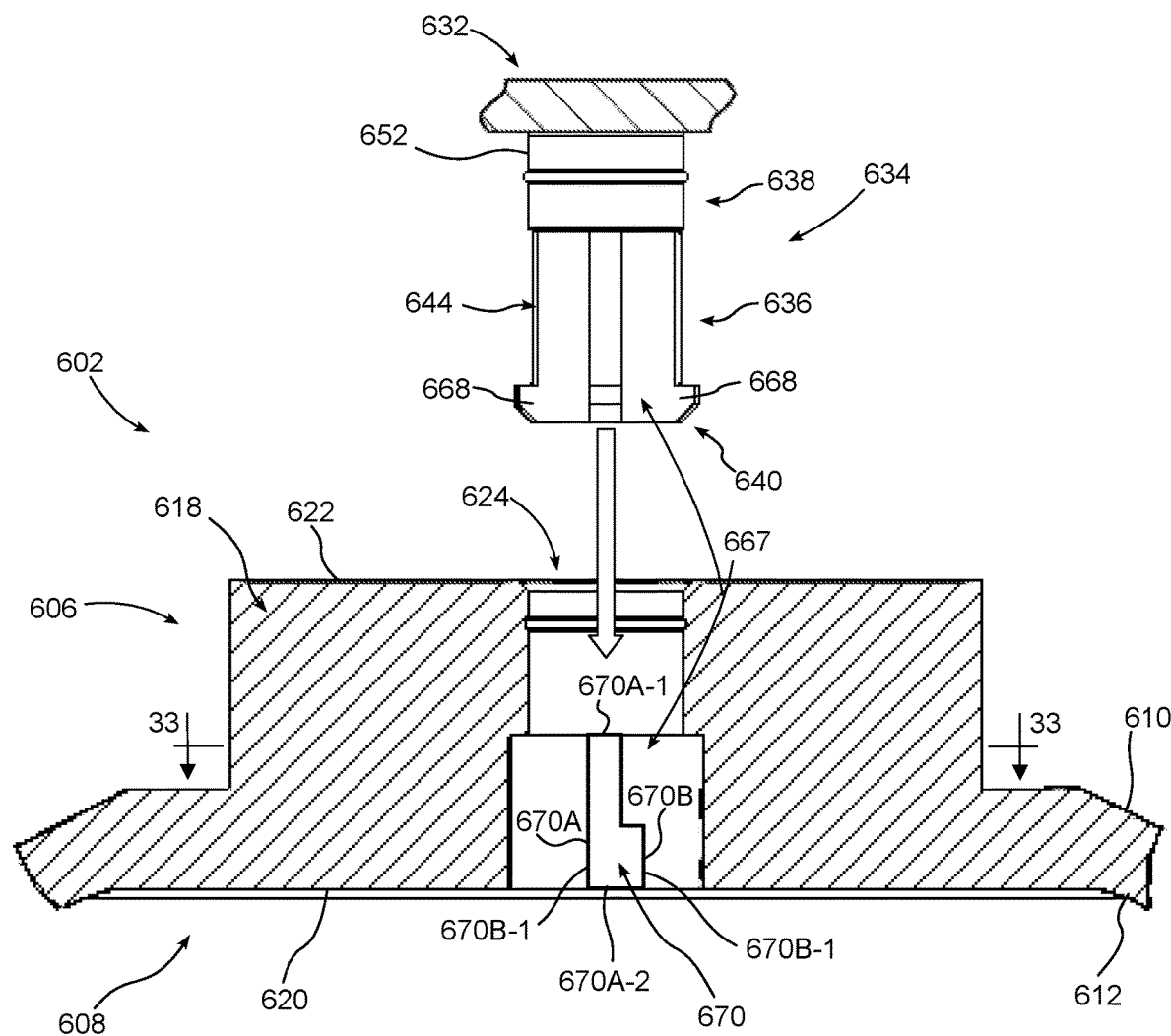
FIG. 32 is a partial cross-sectional and partial side elevation view of an anchor member, a movable member, and a plunger valve of the FIGS. 31A-31B suction apparatus in a disassembled state, with the anchor member and the movable member being shown cross-sectionally along a central longitudinal axis thereof, and the plunger valve being shown in side elevation.
Figure 33:
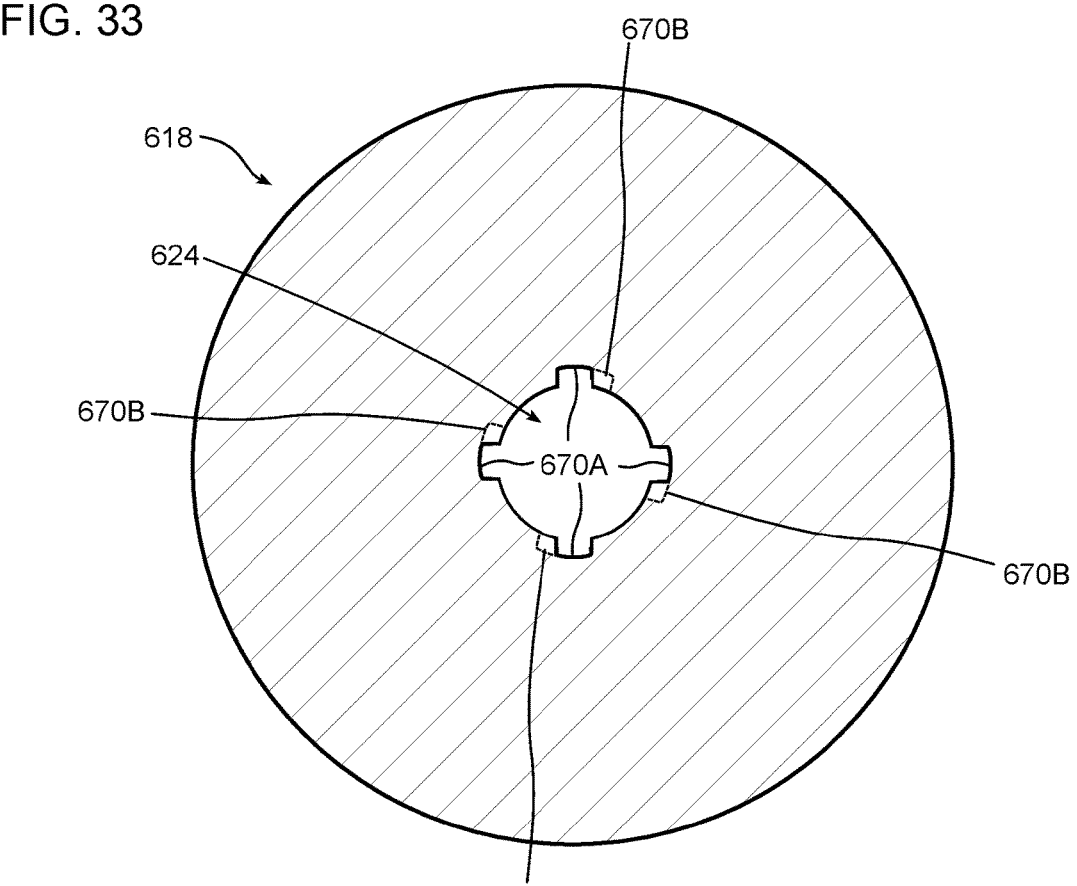
FIG. 33 is a cross-sectional view taken along line 33-33 in FIG. 32.

As can be seen in FIGS. 32-33, the projections 668 may be provided by the transverse guide prongs that define the transverse plunger valve stabilizer 640. The slots 670 may be formed as L-shaped channels, with each slot including a longitudinal slot leg 670A and a transverse slot leg 670B. Each longitudinal slot leg 670A is formed with an upper terminal end 670A-1 and a lower base end 670A-2. It will be appreciated that the upper terminal end 670A-1 of each longitudinal slot leg 670A may be closed to provide a mechanical coupling that prevents the movable member 632 from separating from the anchor member 606 when the movable member is lifted. These slot closures defines intermediate internal shoulders that serve as longitudinal stops to engage the plunger valve 634 of the movable member 632 in order to prevent separation of the movable member from the anchor member. The lower base end 670A-2 of each longitudinal slot let 670A may be either open or closed. Each transverse slot leg 670B is formed with a closed base end 670B-1 and a closed terminal end 670B-2. In the illustrated embodiment, there are four projections 668 engaging four slots 670, but this is for purposes of example only. Other embodiments could have more or fewer projections 668 and slots 670.

Figure 34A:
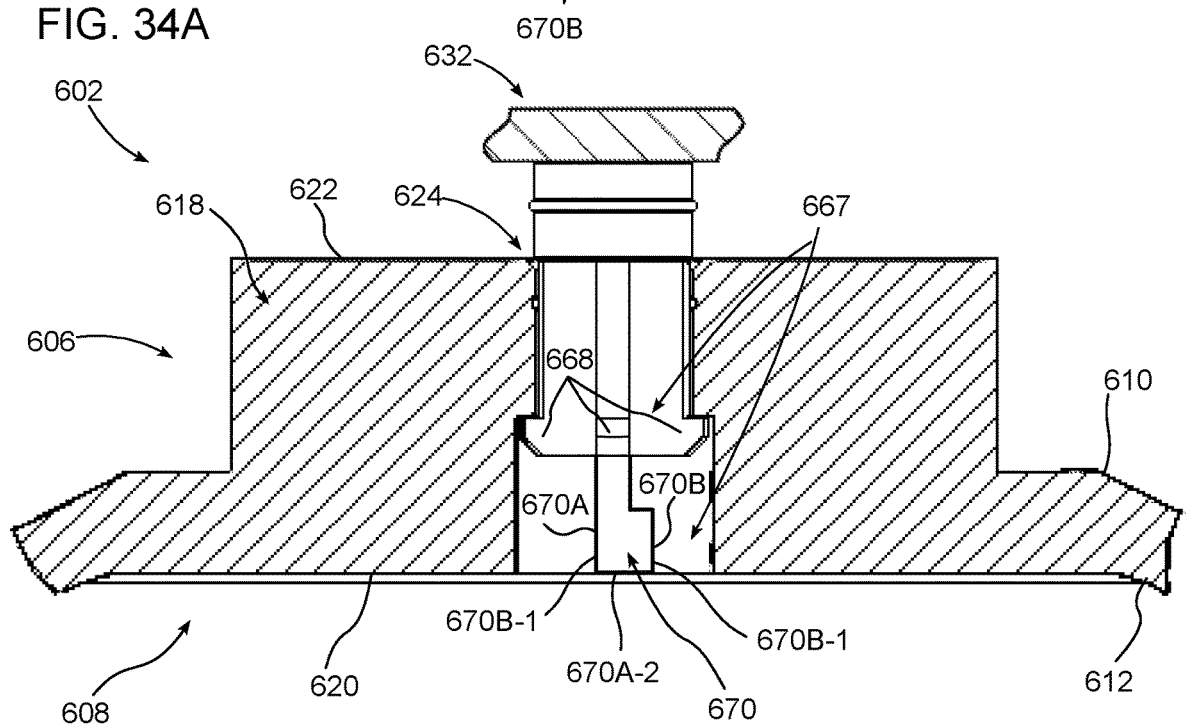
FIG. 34A is a partial cross-sectional and partial side elevation view of the anchor member, movable member and plunger valve of the FIGS. 31A-31B suction apparatus, with the anchor member and the movable being shown cross-sectionally along a central longitudinal axis thereof, and the plunger valve being shown in side elevation and disposed in an open venting position.
Figure 34B:
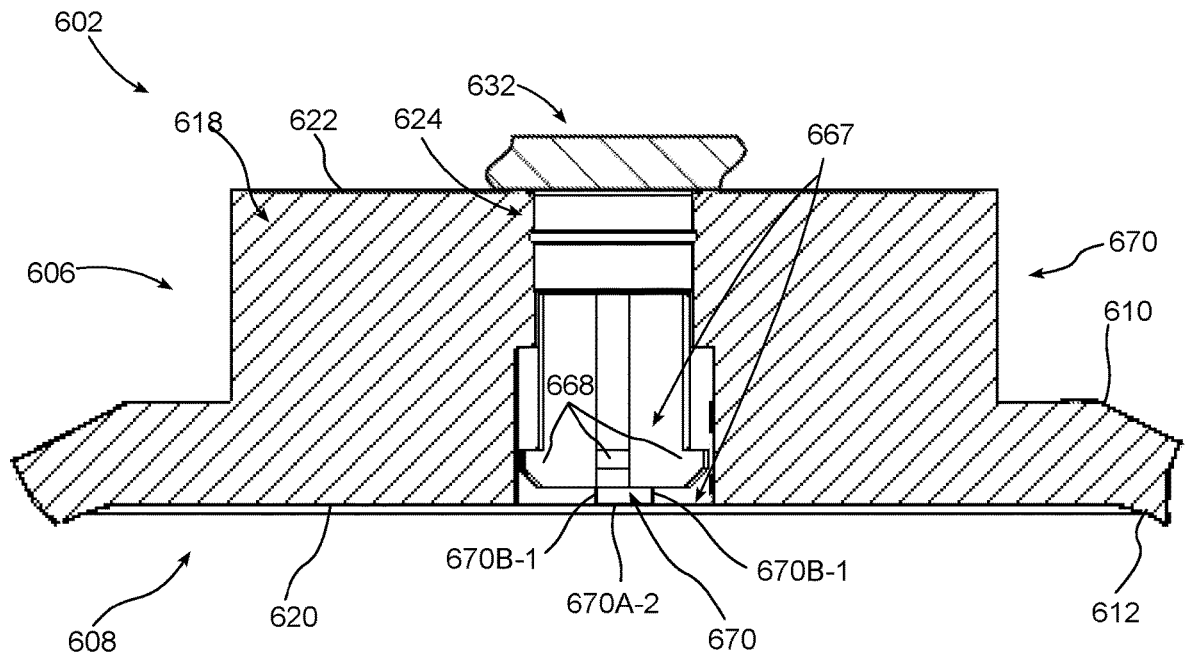
FIG. 34B is a partial cross-sectional and partial side elevation view of the anchor member, movable member and plunger valve of the FIGS. 31A-31B suction apparatus, with the anchor member and the movable member being shown cross-sectionally along a central longitudinal axis thereof, and the plunger valve being shown in side elevation and disposed in an closed sealing position, with the plunger valve being in a rotational position that is characteristic of an unlocking state of a twist-to-lock coupling connection of the suction apparatus.
Figure 34C:
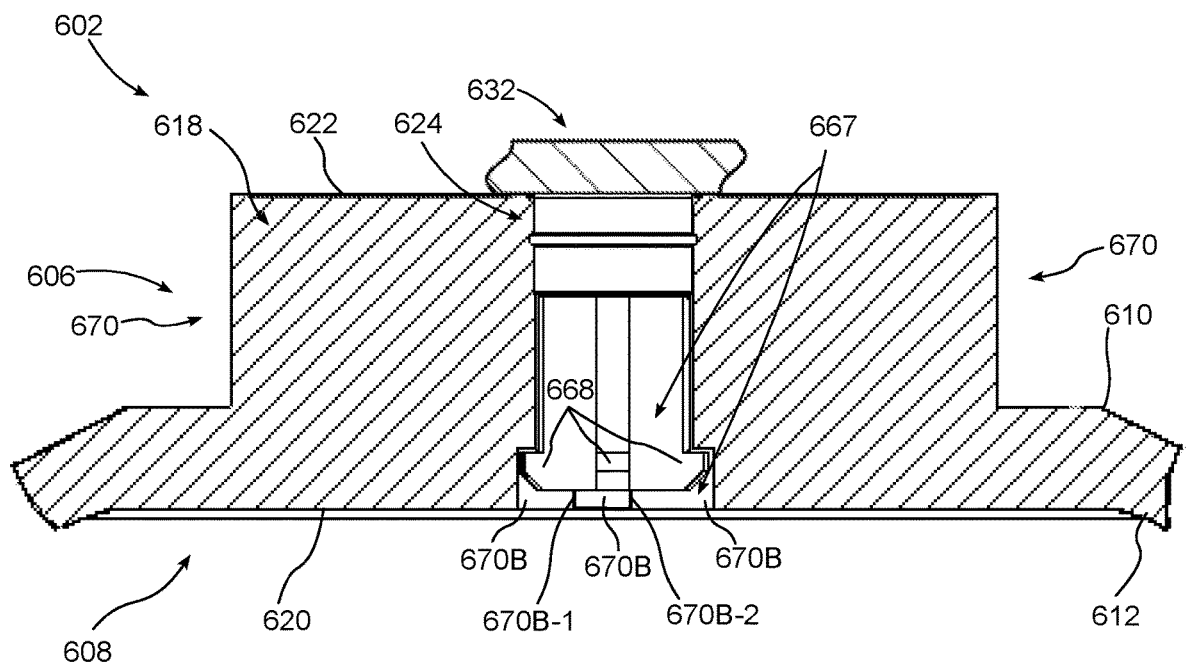
FIG. 34C is a partial cross-sectional and partial side elevation view of the anchor member, movable member and plunger valve of the FIGS. 31A-31B suction apparatus, with the anchor member and the movable member being shown cross-sectionally along central longitudinal axis thereof, and the plunger valve being shown in side elevation and disposed in an closed sealing position, with the movable member plunger valve being in a rotational position that is characteristic of a locking state of a twist-to-lock coupling connection of the suction apparatus.

With additional reference now to FIGS. 34A-34C, the operation of the twist-to-lock coupling connection 667 is the essentially the same as the operation of the twist-to-lock coupling connection 67 of the suction apparatus 2. Starting from the open venting position of the movable member 632, in which each projection 668 is situated at or near the upper terminal end 670A-1 of a longitudinal slot leg 670A (FIG. 34A), the movable member is urged downwardly to its closed sealing position in which the projections traverse the longitudinal slot legs 670A to a location proximate to the closed base end 670A-2 thereof (FIG. 34B). During this operation, the twist-to-lock coupling connection 667 is in its unlocking state. Locking and unlocking of the twist-to-lock coupling connection 667 is effected by rotating the movable member 632 in the clockwise/counterclockwise direction viewed from the perspective of the anchor member stem cross-section shown in FIG. 33.

When it is desired to lock the suction apparatus 602 to a reference surface, the movable member 632 is rotated (clockwise in FIG. 33) while in its closed sealing position so that the projections 668 traverse the transverse slot legs 670B from the closed base end 670B-1 thereof (FIG. 34B) to the closed terminal end 670B-2 thereof (FIG. 34C), thereby transitioning the twist-to-lock coupling connection 667 from it unlocking state to its locking state. A reverse operation is used to unlock and unseal the suction apparatus 602.

Accordingly, a lockable valve-actuated suction apparatus has been disclosed. Although the suction apparatus has been described and shown in the context of certain example embodiments, it should be apparent that variations and alternative embodiments could be implemented in accordance with the present disclosure. The disclosed suction apparatus may be embodied in many different shapes and sizes to operate with many different types of auxiliary structures, including but not limited to bowls, buckets, cans, vases, urns, tanks, or other apparatus whose function is to hold or carry an object or material. Alternatively, the auxiliary structures may themselves represent objects or materials to be anchored instead of being holders or carriers for other objects or materials. Examples of such auxiliary structures include tools, implements, devices, equipment or other articles that could be integrated with, attached to, mounted on, or formed with the disclosed suction apparatus. Broadly speaking, the disclosed suction apparatus may be used for anything imaginable that a user might wish to anchor to a reference surface. Alternatively, it should be understood that the disclosed suction apparatus may be used for applications that do not involve auxiliary structures or the anchoring of object or materials other than the suction apparatus itself. Examples include medical applications such as therapeutic massage cupping, lifting applications such as sheet glass installation, and novelty/amusement applications.

Reference in the present disclosure to an "embodiment" means that a particular feature, structure or characteristic described in connection with the embodiment may be included in at least one embodiment of the disclosed apparatus. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples may be given throughout this description. These examples are merely descriptions of specific embodiments of the invention. The scope of the invention is not limited to the examples given.

As used in this application, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

It is understood, therefore, that the invention is not to be in any way limited except in accordance with the spirit of the appended claims and their equivalents.

What is claimed is:

1. A lockable valve-actuated suction apparatus, comprising:
    an anchor member comprising a non-porous resilient material;
    the anchor member comprising a seal member having an inner side arranged to seal against a reference surface, and an outer side;
    the anchor member comprising a vent port extending between the inner and outer sides of the seal member;
    a movable member that is slidably movable without rotation relative to the anchor member between a sealing position wherein the movable member blocks the vent port and a venting position wherein the movable member unblocks the vent port;
    a twist-to-lock coupling connection between the movable member and the anchor member;
    the twist-to-lock coupling connection being operable only while the movable member is in its sealing position by rotating the movable member relative to the anchor member between a locking state and an unlocking state;
    the locking state of the twist-to-lock coupling connection comprising the movable member being locked against the slidable movement relative to the anchor member; and
    the unlocking state of the twist-to-lock coupling connection comprising the movable member being unlocked against the slidable movement relative to the anchor member.

2. The apparatus of claim 1, wherein the twist-to-lock coupling connection comprises at least one protrusion that engages at least one slot.

3. The apparatus of claim 2, wherein the twist-to-lock coupling connection comprises either (1) the at least one protrusion being formed on the movable member and the at least one slot being formed on the anchor member, or (2) the at least one protrusion being formed on the anchor member and the at least one slot being formed on the movable member.

4. The apparatus of claim 2, wherein:
    the at least one slot of the twist-to-lock coupling connection comprises a longitudinal slot leg interconnected with a transverse slot leg to form a continuous slot pathway that allows the at least one protrusion to traverse both slot legs;
    the at least one protrusion traverses the longitudinal slot leg as the movable member slidably moves without rotation relative to the anchor member between the movable member's sealing and venting positions; and
    the at least one protrusion traverses the transverse slot leg as the movable member moves between the unlocking and locking states of the twist-to-lock coupling connection.

5. The apparatus of claim 4, wherein the longitudinal slot leg is substantially parallel to a sliding direction of the movable member.

6. The apparatus of claim 4, wherein the transverse slot leg is substantially orthogonal to the longitudinal slot leg.

7. The apparatus of claim 6, wherein the movable member is configured to engage the reference surface when the at least one protrusion traverses the transverse slot leg.

8. The apparatus of claim 4, wherein the transverse slot leg is angled obliquely relative to the longitudinal slot leg to provide a partial thread that draws the movable member toward the reference surface as the at least one protrusion traverses the transverse slot leg away from the longitudinal slot leg.

9. The apparatus of claim 8, wherein the transverse slot leg is angled and sized so that the moving member comes into engaging contact with the reference surface when the at least one protrusion reaches an end of the transverse slot leg that is furthest away from the longitudinal slot leg.

10. The apparatus of claim 4, wherein the anchor member vent port extends through an anchor member stem that slidably mounts the movable member.

11. The apparatus of claim 10, wherein the movable member comprises a plunger valve that slidably engages the anchor member vent port.

12. The apparatus of claim 11, wherein the plunger valve comprises an air bypass neck that is configured to pass air through the vent port when the movable member is in the venting position, and wherein the plunger valve comprises a vent port stopper configured to plug the vent port when the movable member is in the sealing position.

13. The apparatus of claim 12, wherein the plunger valve comprises a valve stem stabilizer configured to block against a vent port internal shoulder when the movable member reaches its venting position in order to prevent removal of the plunger valve from the vent port during operation of the suction apparatus.

14. The apparatus of claim 11, wherein the vent port comprises a free end tubule formed on a free end of the anchor member stem, and wherein the plunger valve engages the free end tubule when the movable member is in its sealing position.

15. The apparatus of claim 14, wherein the longitudinal slot leg is closed at an end thereof that is furthest away from the transverse slot leg, and wherein the at least one protrusion engages the the closed end of the longitudinal slot leg when the movable member reaches its venting position in order to prevent removal of the plunger valve from the free end tubule when the movable member is in its venting position.

16. The apparatus of claim 11, wherein the twist-to-lock coupling connection is disposed on the vent port and the plunger valve.

17. The apparatus of claim 1, wherein the twist-to-lock coupling connection is provided either directly between the movable member and the anchor member, or indirectly between the movable member and the anchor member via one or more intermediate members.

18. The apparatus of claim 1, wherein the twist-to-lock coupling connection is configured to require not more than 360 degrees of movable member rotation between the locking and unlocking states.

19. A lockable valve-actuated suction apparatus, comprising:
  an anchor member comprising a non-porous resilient material;
  the anchor member comprising a seal member having an inner side arranged to seal against a reference surface, and an outer side;
  the anchor member comprising a vent port extending between the inner and outer sides of the seal member;
  a movable member that is slidably movable relative to the anchor member between a sealing position wherein the movable member blocks the vent port and a venting position wherein the movable member unblocks the vent port;
  a twist-to-lock coupling connection between the movable member and the anchor member;
  the twist-to-lock coupling connection being operable by rotating the movable member relative to the anchor member between a locking state and an unlocking state;
  the locking state of the twist-to-lock coupling connection comprising the movable member being locked against the slidable movement relative to the anchor member;
  the unlocking state of the twist-to-lock coupling connection comprising the movable member being unlocked against the slidable movement relative to the anchor member;
  the twist-to-lock coupling connection comprising at least one protrusion that engages at least one slot; and
  the twist-to-lock coupling connection being configured to require not more than 360 degrees of movable member rotation between the locking and unlocking states.

20. A method of using the lockable valve-actuated suction apparatus of claim 1, comprising:
  positioning the suction apparatus so that the anchor member is in contact with the reference surface, the twist-to-lock coupling connection being in the unlocking state and the movable member being in either the sealing position or the venting position;
  maneuvering the suction apparatus so as to cause the movable member to assume or maintain the sealing position; and
  rotating the movable member from the unlocking state to the locking state of the twist-to-lock coupling connection.

* * * * *